US012624808B2

(12) United States Patent
Smith et al.

(10) Patent No.: US 12,624,808 B2
(45) Date of Patent: May 12, 2026

(54) APPARATUS, METHOD, AND SYSTEM FOR HANGING LIGHTS ALONG A SUSPENSION WIRE OF A BRIDGE

(71) Applicant: Musco Corporation, Oskaloosa, IA (US)

(72) Inventors: Matthew F. Smith, Leighton, IA (US); Brady L. Dieleman, Pella, IA (US); Alex K. Bryan, University Park, IA (US); Joel D. DeBoef, New Sharon, IA (US); Chris P. Lickiss, Newton, IA (US); Thomas M. Halloran, Waukee, IA (US); Luke C. McKee, Oskaloosa, IA (US)

( * ) Notice: Subject to any disclaimer, the term of this patent is extended or adjusted under 35 U.S.C. 154(b) by 0 days.

(21) Appl. No.: 19/247,161

(22) Filed: Jun. 24, 2025

(65) Prior Publication Data

US 2026/0009508 A1 Jan. 8, 2026

Related U.S. Application Data

(63) Continuation-in-part of application No. 18/839,606, filed as application No. PCT/US2023/080636 on Nov. 21, 2023.

(60) Provisional application No. 63/384,680, filed on Nov. 22, 2022.

(51) Int. Cl.

| | |
|---|---|
| ***F21S 4/20*** | (2016.01) |
| ***F21V 5/04*** | (2006.01) |
| ***F21V 17/12*** | (2006.01) |
| ***F21V 17/16*** | (2006.01) |
| ***F21V 23/00*** | (2015.01) |
| ***F21V 31/00*** | (2006.01) |
| ***F21Y 103/10*** | (2016.01) |
| ***F21Y 115/10*** | (2016.01) |

(52) U.S. Cl.

CPC ................ *F21S 4/20* (2016.01); *F21V 5/041* (2013.01); *F21V 17/12* (2013.01); *F21V 17/164* (2013.01); *F21V 23/002* (2013.01); *F21V 31/005* (2013.01); *F21Y 2103/10* (2016.08); *F21Y 2115/10* (2016.08)

(58) Field of Classification Search

CPC ........ F21S 4/00; F21S 4/10; F21S 4/20; F21S 4/28; F21V 31/00; F21V 31/005

See application file for complete search history.

(56) References Cited

U.S. PATENT DOCUMENTS

| | | | |
|---|---|---|---|
| 7,429,186 | B2 | 9/2008 | Mrakovich et al. |
| 7,635,279 | B1 | 12/2009 | Wong et al. |
| 8,348,469 | B2 | 1/2013 | Mrakovich et al. |
| 8,465,175 | B2 | 6/2013 | Nall et al. |
| 8,756,801 | B2 | 6/2014 | Nall et al. |
| 9,057,498 | B2 | 6/2015 | Nall et al. |
| 9,464,780 | B2 | 10/2016 | Hung et al. |

(Continued)

FOREIGN PATENT DOCUMENTS

| | | |
|---|---|---|
| CN | 102748719 A | 10/2012 |
| CN | 203797477 U | 8/2014 |

(Continued)

*Primary Examiner* — Alexander K Garlen

(74) *Attorney, Agent, or Firm* — Kurt J. Fugman

(57) ABSTRACT

An LED module includes a lens, a split housing, and a cradle. The cradle defines a central opening, and includes a plurality of upwardly extending flanges, a plurality of downwardly extending flanges, and a pair of mounting cars.

21 Claims, 47 Drawing Sheets

(56) References Cited

U.S. PATENT DOCUMENTS

| | | | | |
|---|---|---|---|---|
| 9,585,239 | B2 | 2/2017 | Nall et al. | |
| 10,091,867 | B2 | 10/2018 | Nall et al. | |
| 11,397,001 | B2 | 7/2022 | Mertens et al. | |
| 2005/0139850 | A1 | 6/2005 | Ikeda | |
| 2011/0194292 | A1* | 8/2011 | Tsai | F21S 4/10 362/231 |
| 2013/0049048 | A1* | 2/2013 | Takeda | F21V 23/002 257/E33.059 |
| 2013/0182434 | A1* | 7/2013 | He | F21S 8/032 362/267 |
| 2013/0183779 | A1* | 7/2013 | Pachler | F21V 15/01 362/249.02 |
| 2014/0328057 | A1* | 11/2014 | Pearson | F21V 21/34 362/235 |
| 2016/0178186 | A1* | 6/2016 | Kusunoki | H10H 20/854 362/373 |
| 2018/0224103 | A1* | 8/2018 | Crandell | F21V 23/008 |
| 2018/0253949 | A1 | 9/2018 | Brown | |
| 2018/0259167 | A1* | 9/2018 | Krieger | F21V 23/001 |
| 2019/0338935 | A1 | 11/2019 | Lax et al. | |
| 2020/0003403 | A1* | 1/2020 | Corkhill | H02J 50/70 |
| 2020/0400289 | A1 | 12/2020 | Krieger | |
| 2022/0235921 | A1 | 7/2022 | He | |
| 2023/0010234 | A1* | 1/2023 | Ring | F21V 21/40 |

FOREIGN PATENT DOCUMENTS

| | | | | |
|---|---|---|---|---|
| CN | 108662475 | A | 10/2018 | |
| EP | 2284438 | A1 * | 2/2011 | F21V 21/002 |
| EP | 2722589 | B1 | 2/2020 | |
| WO | 96/18210 | A1 | 6/1996 | |
| WO | 2004/023033 | A1 | 3/2004 | |

* cited by examiner

APPARATUS, METHOD, AND SYSTEM FOR HANGING LIGHTS ALONG A SUSPENSION WIRE OF A BRIDGE

CROSS-REFERENCE TO RELATED APPLICATIONS

This application is a continuation-in-part application claiming priority to and the benefit of the National Stage application with application Ser. No. 18/839,606 filed on Aug. 19, 2024, which in turn claims priority to and the benefit of International Patent Application No. PCT/US2023/080636, filed Nov. 21, 2023, which claims priority to, and the benefit of U.S. Provisional Patent Application No. 63/384,680, filed Nov. 22, 2022, each of which are hereby incorporated by reference in their entirety.

TECHNICAL FIELD

The disclosure generally relates to a system for hanging LED lights from a suspension wire or rope of a bridge. More specifically, the disclosure enables such a system that may be less prone to light outages, requires fewer strings of wires, or that includes a bracket for attaching the string of wires and LEDs to the suspension rope or wire.

BACKGROUND

It has become more common to light bridges or the like using LEDs or other types of lights for decorative purposes. In particular, such lights may be attached to the vertical and/or parabolic suspension wires or ropes of the bridge. If LEDs are employed, wires leading from the LEDS from the top to the bottom of the bridge may provide power and communication to the PCB boards that control the LEDs, allowing light shows and special effects, different colors etc. to be displayed.

Bridges are often located over the ocean near cities where a combination of smog and saltwater can deteriorate the LEDs, lens, wires, etc. leading to light outages (see 50 in FIG. 1) or discoloration, etc. Also, the extensive vertical height or length (e.g., 50 feet or more) of such strings of lights can strain the tensile strength of the wiring that supplies the power and communication to the individual LED modules from one end to another end (e.g., from the bottom to the top of a vertical suspension wire).

Consequently, multiple strings of wires need to be strung up or routed in parallel so that the entire length of the suspension wire is covered with LEDs. This may require multiple trips along the suspension wire during installation to provide enough LEDs, which can be time consuming. In some applications, it is desirable to have two sets of LEDs facing in different directions so that viewers on one side of the bridge can see one set of LEDs and viewers on the other side of the bridge can see the other set of LEDs. However, this too can increase installation time as two different sets of strings of lights may need to be routed. In some cases, the light emitted by the LEDS may cause glare or distraction to the motorists on the bridge, which is undesirable.

The art lacks a system for hanging lights that is efficiently installed, which emits light in multiple directions, which is durable enough to withstand corrosive environments, and that allows glare control as motorists pass over the bridge.

SUMMARY

An LED module according to an embodiment of the present disclosure may include a lens, a split housing, and a cradle. The cradle may define a central opening, and may include a plurality of upwardly extending flanges, a plurality downwardly extending flanges, and a pair of mounting ears.

A method of assembling an LED module according to an embodiment of the present disclosure may comprise attaching a lens to a cradle, attaching a PCB to the cradle, and inserting the cradle, the PCB and the lens into a housing member.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

The following drawings are illustrative of particular examples of the present disclosure and therefore do not limit the scope of the disclosure. The drawings are not necessarily to scale, though examples can include the scale illustrated, and are intended for use in conjunction with the explanations in the following detailed description wherein like reference characters denote like elements. Examples of the present disclosure will hereinafter be described in conjunction with the appended drawings.

FIG. 22 is sectioned along the lateral midplane.

DETAILED DESCRIPTION

Figure 1:
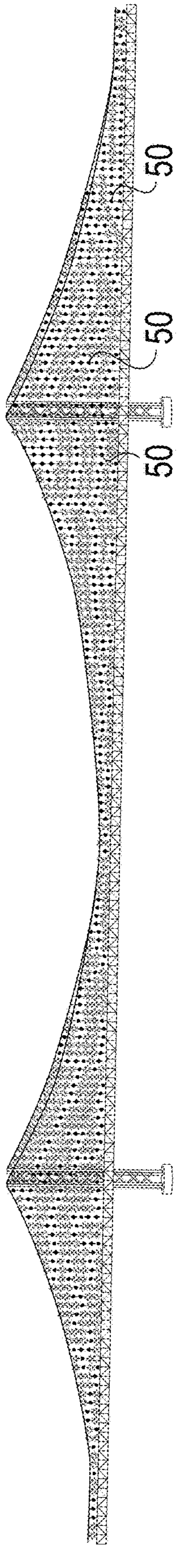
FIG. 1 (PRIOR ART)
FIG. 1 illustrates a prior art system for hanging LED lights along a vertical suspension wire of a bridge. Light outages are depicted.

The following detailed description is exemplary in nature and is not intended to limit the scope, applicability, or configuration of the techniques or systems described herein in any way. Rather, the following description provides some practical illustrations for implementing examples of the techniques or systems described herein. Those skilled in the art will recognize that many of the noted examples have a variety of suitable alternatives.

To further an understanding of the present disclosure, specific exemplary embodiments according to the present disclosure will be described in detail. Frequent mention will be made in this description to the drawings. Reference numbers will be used to indicate certain parts in the drawings. Unless otherwise stated, the same reference numbers will be used to indicate the same parts throughout the drawings. Further, similar reference numbers (e.g., 702, 802, 902, 1002, 1102) will be used to indicate similar parts or functionality between embodiments. Reference numbers followed by letters (e.g., 100, 100*a*) may denote the same or similar features that may be symmetrical to each other, etc.

Regarding terminology, terms such as "means", "devices", "elements", "parts", "portions", "structure", "components", and "members" may be used interchangeably herein, in the singular or plural, by way of convenience and not depart from aspects of the present disclosure, nor place limiting effects on aspects of the present disclosure unless explicitly stated otherwise.

Also, terms such as "having", "including", "with", etc. or forms thereof are to be interpreted as being open, not limiting the parts of a structure that may be added to that structure. The term "generally linear", "linear array" or forms thereof are to be interpreted to include arrays of items such as LEDs that follow a sweep path that is at least partially straight or is slightly curved so that a tangent at one end of the array forms an angle with a tangent at another end of the array that is less than 40 degrees.

Figure 2:
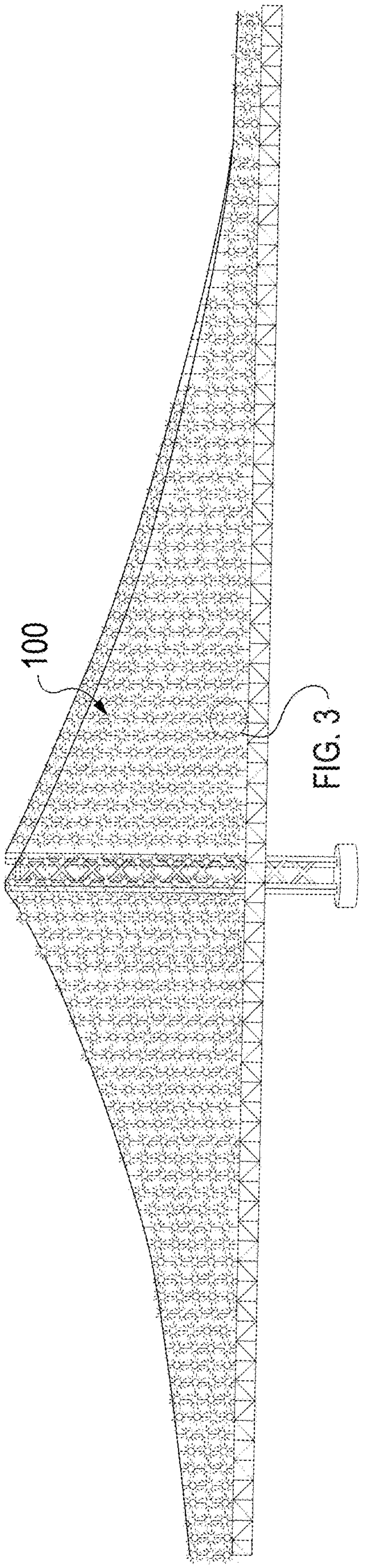
FIG. 2 shows a system for hanging LED lights along a suspension wire of a bridge that is configured according to various embodiments of the disclosure that may reduce the likelihood of light outages, discoloration as well as ease assembly and/or routing the string of lights.
Figure 3:
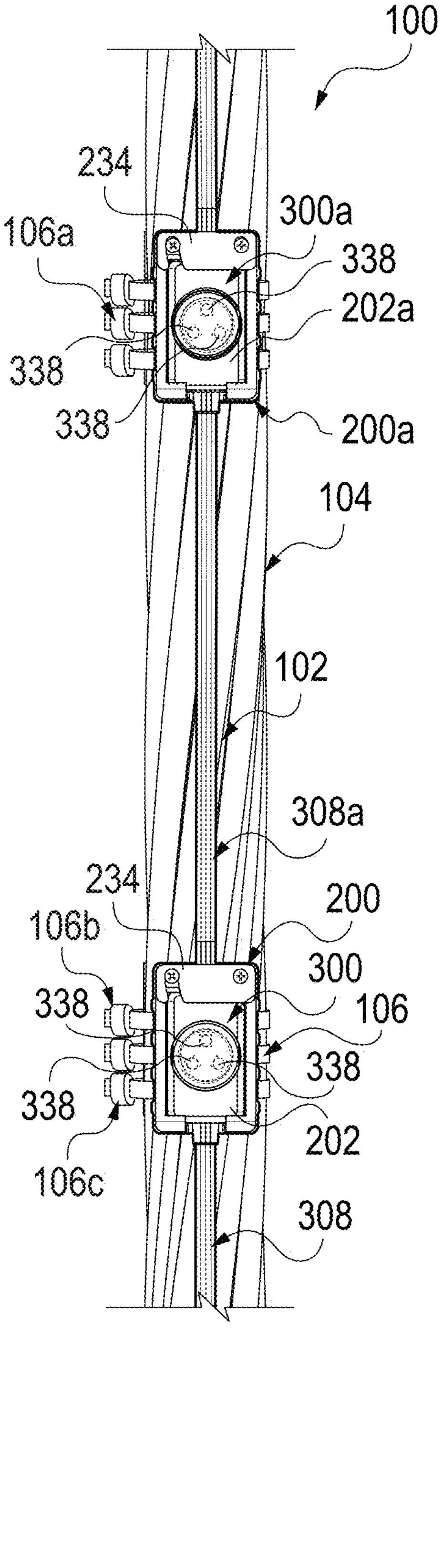
FIG. 3 is a detailed view taken from FIG. 2 zooming up on a portion of a vertical suspension wire with lights attached to it. A couple of LED modules with brackets holding the string of lights on the suspension wire can be seen.

Starting with FIGS. 2 and 3, an apparatus 100 for routing a string of lights (e.g., a string of LED lights 102 as shown, or a string of other lights such as incandescent lights, fluorescent lights, high intensity discharge lights, lasers, etc.) along a suspension member such as a suspension wire 104 or rope may be seen. For this example, the suspension wire, rope, or cable is vertical and is made of a plurality of steel wires that are wrapped into a bundle. However, the apparatus 100 may be used on solid or rigid suspension members such as girders or the like, etc. Also, the apparatus may be used on other structures other than bridges such as poles, buildings, etc.

Focusing on FIG. 3, the apparatus 100 may comprise a first attachment bracket 200 (may be referred to as a "bracket") that is configured to engage the suspension wire 104 in a manner that will be described in further detail later herein. The attachment bracket 200 may define a first LED module receiving aperture 202, a first LED module 300 that is disposed in the LED module receiving aperture 202, a second attachment bracket 200*a* that is configured to engage the suspension wire 104. The second attachment bracket 200*a* defines a second LED module receiving aperture 202*a*, and a second LED module 300*a* may be disposed in the second LED module receiving aperture 202*a*. A first fastener such as a first strap 106 may be employed that engages the first attachment bracket 200, while a second fastener such as second strap 106*a* may be used that engages the second attachment bracket 200*a*, and the suspension wire 104 to secure the lights to the suspension wire 104.

The first fastener or any other fastener may take various forms including a nut, and bolt combination, with or without a strap. As shown, one or more straps may be employed such as a cable tie, a zip tie, or a barb tie, etc. For example, a cable tie or barb tie such as TY27MX-A sold by Thomas & Betts Corporation® (now referred to as ABB Installation Products® may be used. Such a cable tie may be rated to have a tensile strength of 120 lbs, be 13 inches long and made from nylon 6/6. Other types of cable ties, zip fasteners, etc. may be employed.

Figure 11:
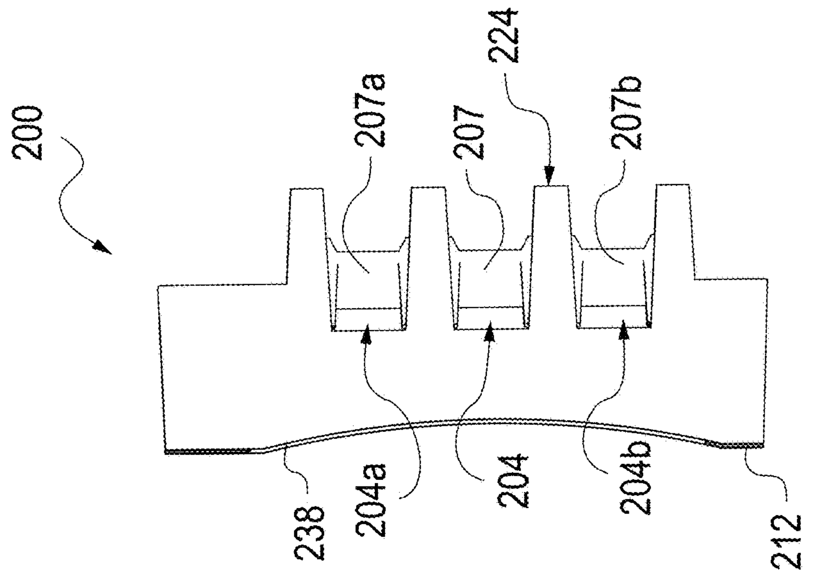
FIG. 11 is a side view of the bracket of FIG. 9.

As best understood by looking at FIGS. 3 and 11 together, the first attachment bracket 200 may define a first fastener receiving thru-slot 204, a second fastener receiving thru-slot 204*a*, a third fastener receiving thru-slot 204*b*, etc. The first strap 106 extends through the first fastener receiving thru-slot 204, while additional straps 106*b*, 106*c* extend through the second and third fastener receiving thru-slots 204*a*, 204*b*. Only a single fastener and associated thru-slot may be provided in some embodiments of the present disclosure, but in many applications a series or plurality of thru-slots and associated fasteners may be provided. The straps may engage arcuate or curved surfaces 207, 207*a*, 207*b* in the slots to hold the bracket to a suspension wire or the like.

Figure 12:
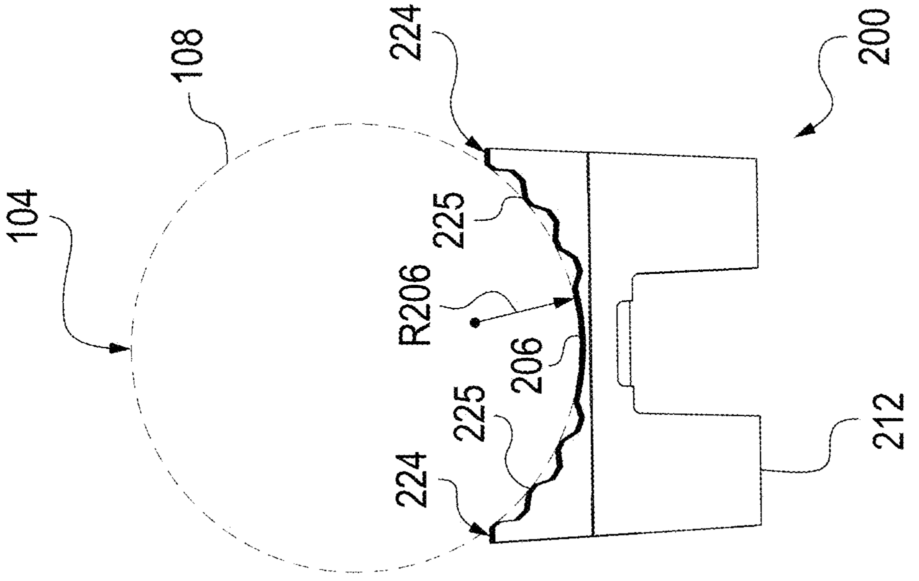
FIG. 12 is a top view of the bracket of FIG. 9.

Looking at FIGS. 3 and 12 together, the suspension wire 104 defines a round perimeter 108 (e.g., may be tangential to the strands that are wrapped or bundled to form the suspension wire), and the first attachment bracket 200 may define a first concave surface 206 that is configured to contact the round perimeter 108. Similar statements may be made about the second attachment bracket 200*a* defining a second concave surface that is configured to contact the round perimeter as well. For example, the first attachment bracket may be identically configured as the second attachment bracket or vice versa. That is to say, their dimensions are within a reasonable manufacturing tolerance such as +/−0.02 of an inch.

Figure 19:
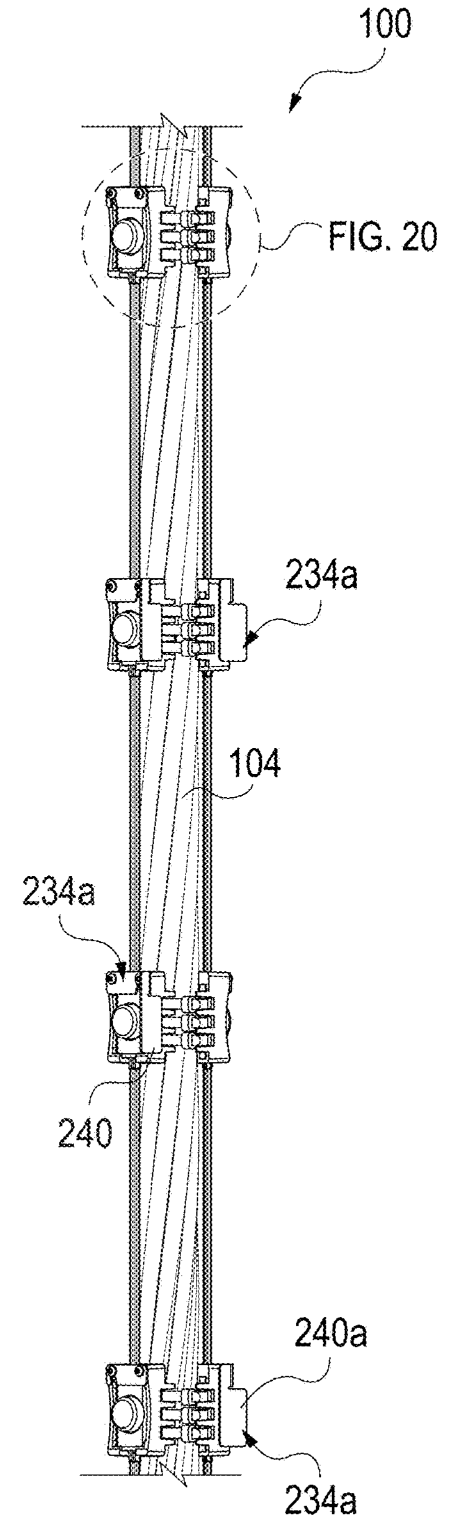
FIG. 19 is a perspective view of a pair of brackets and LED modules arranged as a circumferential array or angular array about a suspension wire or rope. The circumferential array may also be repeated as a linear or arcuate (e.g., parabolic) array along a suspension member as also shown. Some instances of the LED brackets have protrusions or visors to help prevent glare to passersby.
Figure 20:
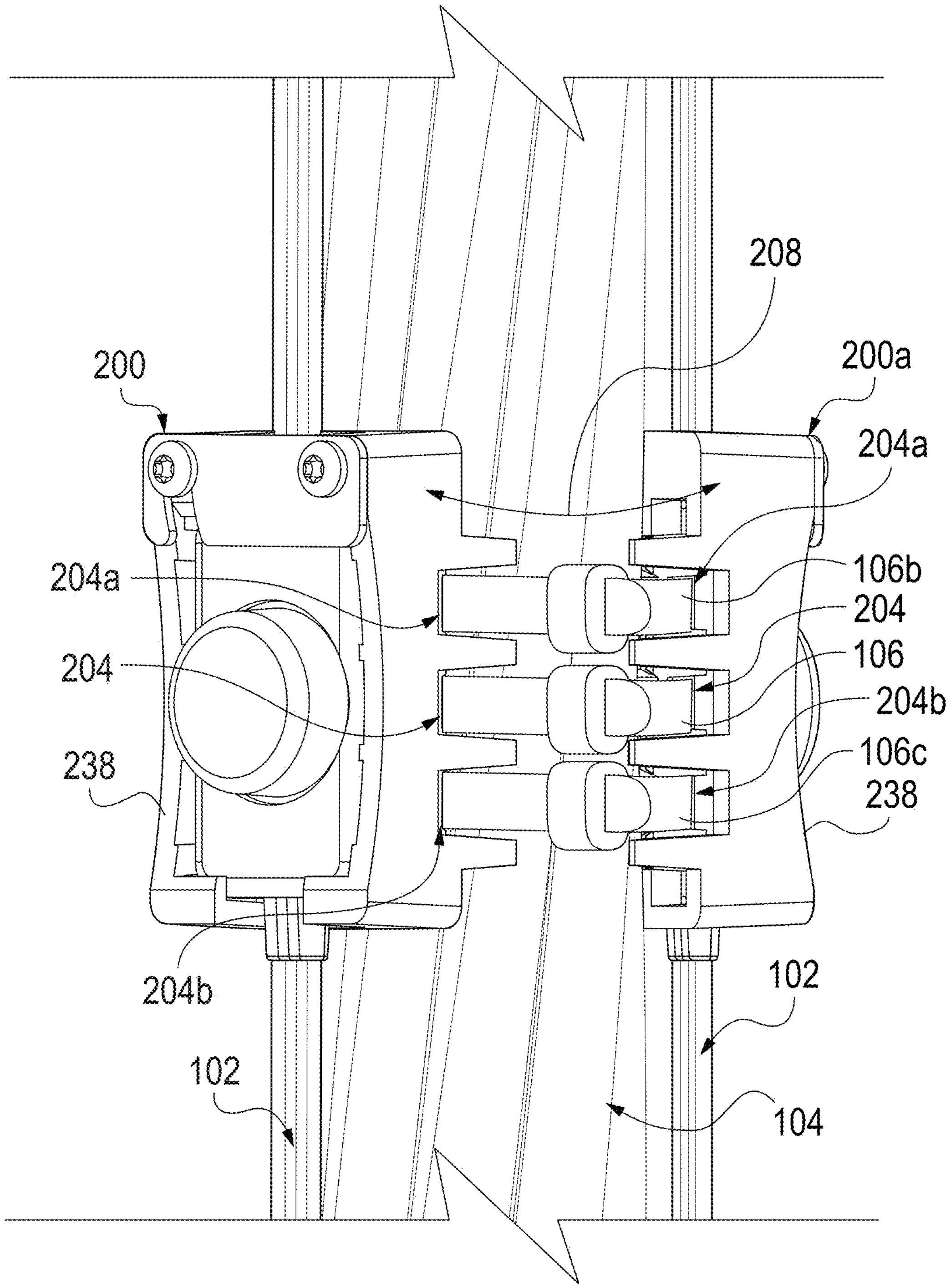
FIG. 20 is an enlarged detail view showing two of the brackets and LED modules of FIG. 19 in greater detail.

Referring to FIGS. 19 and 20, the first attachment bracket 200 may be angularly spaced away from the second attachment bracket 200*a* about the suspension wire 104 a predetermined angle 208 that ranges from greater than 90 degrees to less than 200 degrees. This may allow one set of lights to be seen from one side of the bridge, and the other set of lights to be seen from the other side of the bridge. As can be seen, the same straps 106, 106*b*, 106*c* may be used to attach both brackets. So, the fastener receiving thru-slots 204, 204*a*, 204*b* of one bracket may be aligned with the corresponding fastener receiving thru-slots of the other bracket.

Figure 5:
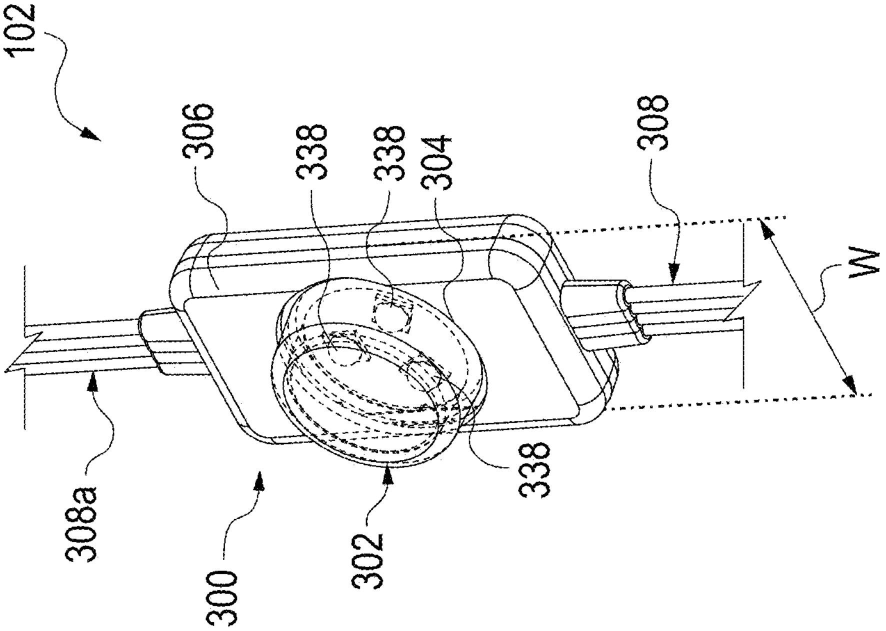
FIG. 5 is a perspective view of the light string with the LED module of FIG. 4 depicted without the bracket.

A string of LED lights 102 according to an embodiment of the present disclosure can be seen in FIG. 5 and may comprise at least a first LED module 300 including a lens 302, and a seal 304 contacting the lens 302 so as to help prevent the ingress of contaminants, moisture, etc. The first LED module 300 may further comprise a rectangular housing 306, and a first wire 308 (or set of wires, conductors, communication lines, etc.) extending from the rectangular housing 306.

Figure 6:
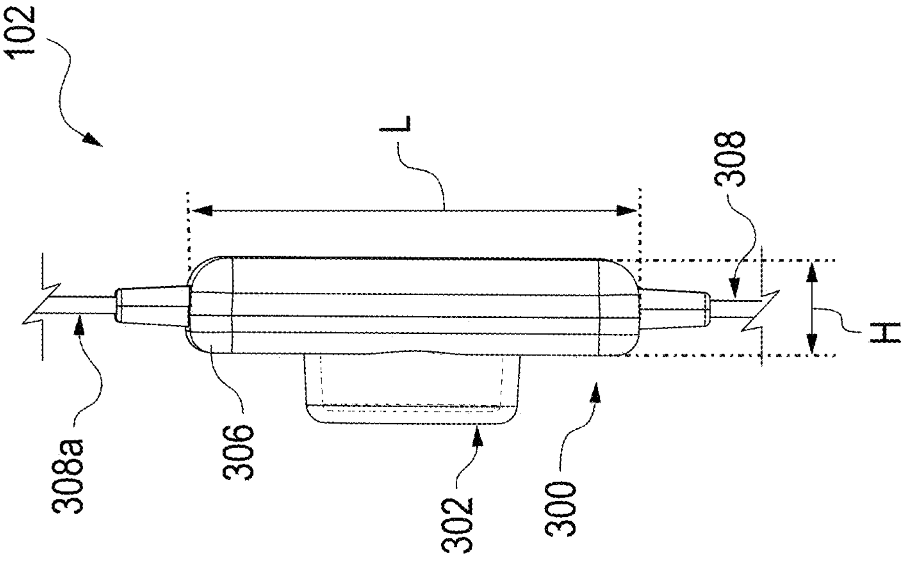
FIG. 6 is a side view of the light string and LED module of FIG. 5.

In FIGS. 5 and 6, the rectangular housing 306 may defines a length L, a width W, and a height H. The length may be oriented along the length of the first wire 308. A second wire 308*a* or set of wires may extend from the housing in a direction opposite of the first wire. The second wire may be similarly or identically configured as the first wire, being communication therewith via a printed circuit board (PCB) that is disposed in the housing as will be discussed in further detail later herein.

A first ratio of the length L to the width W may range from 1.44 to 2.07 in some embodiments of the present disclosure, while a second ratio of the width W to the height H may range from 2.30 to 3.30. In certain embodiments the length may range from 2.075 inches to 2.325 inches (e.g., a nominal value of 2.20 inches), the width may range from 1.135 inches to 1.385 inches (e.g., a nominal value of 1.26 inches), and the height may range from 0.345 of an inch to 0.595 of an inch (e.g., a nominal value of 0.47 of an inch). Other embodiments of the present disclosure may utilize different ratios and dimensional ranges. In certain embodiments, these ratios and/or dimensional ranges may provide a large enough envelope to contain the PCB with enough circuitry to provide the desired lighting and special effects as well as a robust interface between the LED module and the bracket.

For the embodiment shown in FIG. 5, the rectangular housing 306, and the seal 304 are unitary. For example, the housing and the seal may be formed by overmolding a printed circuit board (PCB) with a polyamide overmolding material or other rubber, or elastomer, etc. In other embodiments of the present disclosure, the rectangular housing, and the seal are integral or otherwise assembled. For example, the housing may be split into halves that are plastic injection molded. The PCB may be disposed in one half as well as the seal, then the other half may be attached via snaps, ultrasonic welding etc. to form the module. The lens may include a polyacrylic material, or other translucent or transparent material that allows the light from the light emitting diode (LED) to be seen. Polycarbonate material for the lens may be avoided due to discoloration caused over time by ultra-violet radiation.

Figure 7:
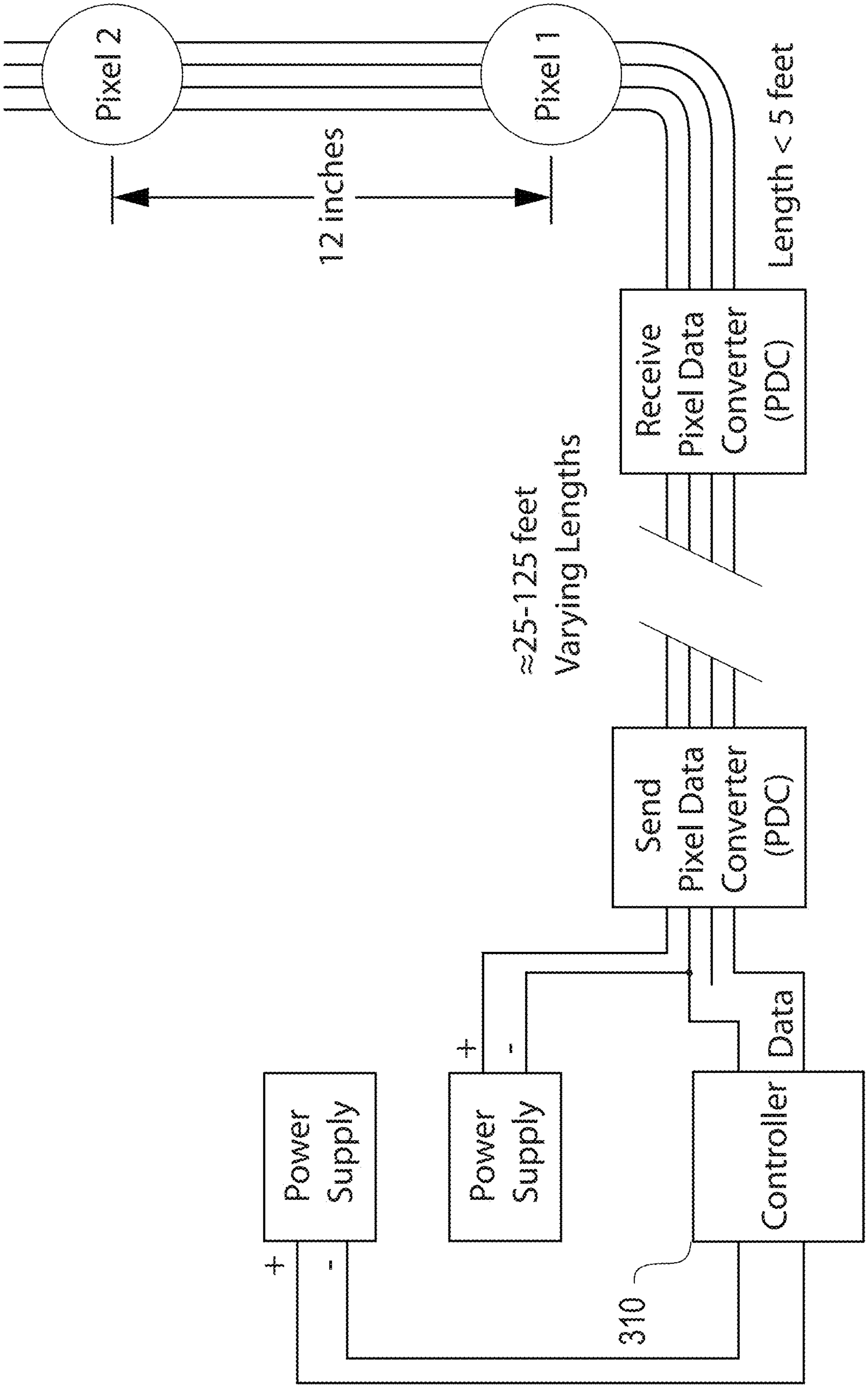
FIG. 7 is a diagram depicting a power supply, a controller sending data to a device that sends a pixel data converter to another device that receives the pixel data converter, that then relays the data to various pixels (or lights) along the light string.
Figure 8:
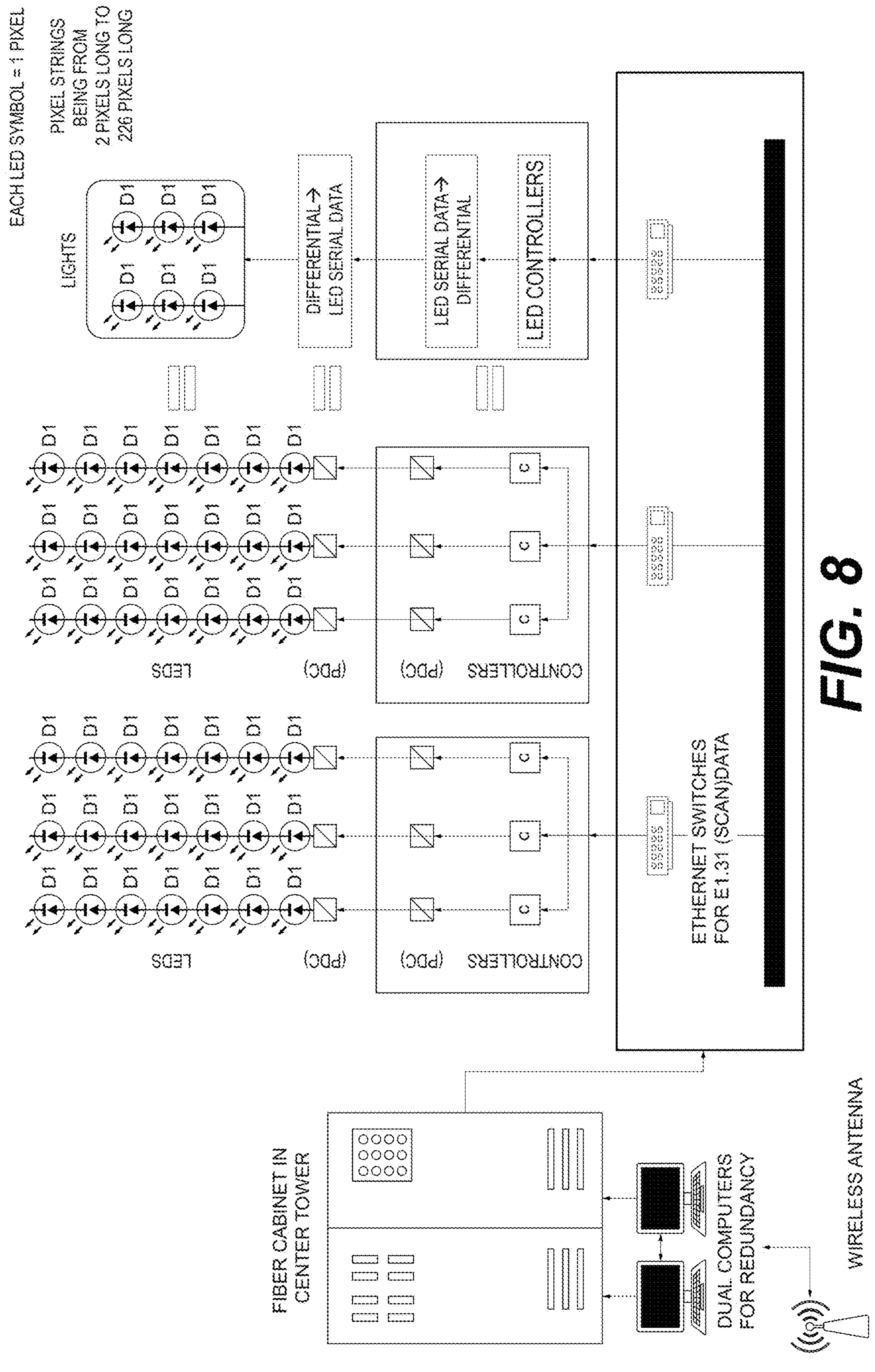
FIG. 8 is an overall system diagram utilizing multiple string of lights. While specific communication devices are shown such wireless, cables, it is contemplated that any type of communication devices known in the art such as fiber optic, copper, coaxial cable, etc. may be employed in various embodiments of the present disclosure.

As illustrated in FIG. 7, the first or second wire may terminate at one end of the string of lights at a dongle, a LED driver and/or a controller 310 that is in communication with the first or the second wire that is programmed with a GS8206b protocol. The efficient transfer of data provided using this protocol may allow a single strand or string of wires and lights to cover the entire length of suspension wire instead of using multiple strands or strands of wires and lights. To cover the entire length of the suspension wire or other suspension member, a second LED module 300*a* (see FIG. 3), a third, a fourth, etc. that is in communication with the second wire may be provided. A center-to-center distance between the light modules (or pixels) may be 12 inches but may range from 4 inches to 20 inches in various embodiments of the present disclosure.

Figure 4:
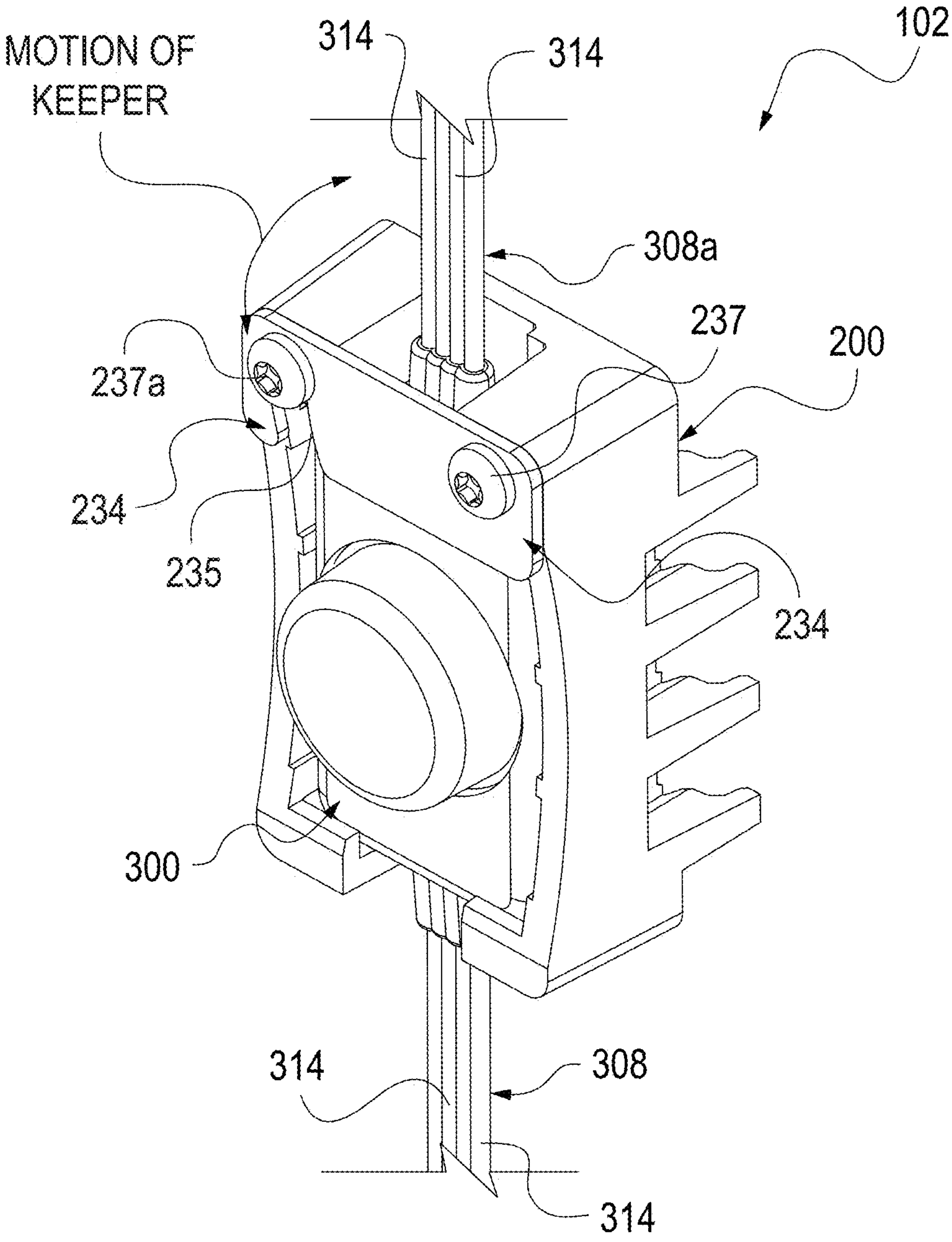
FIG. 4 is a perspective view of a single instance of a LED module in a bracket taken from FIG. 3 removed from the suspension wire.

As depicted in FIG. 4, the first wire and/or the second wire may include four conductors 314, two for power, one for communication, and one as a possible backup. Other arrangements of conductors are possible in other embodiments of the present disclosure. Conductors typically have a copper core, but communication lines such as fiber optic lines may also be employed.

In some embodiments of the present disclosure, the first LED module is identically configured as the second LED module. That is to say, their dimensions are within a reasonable manufacturing tolerance such as +/−0.02 of an inch. This may not be the case for other embodiments of the present disclosure.

Figure 22:
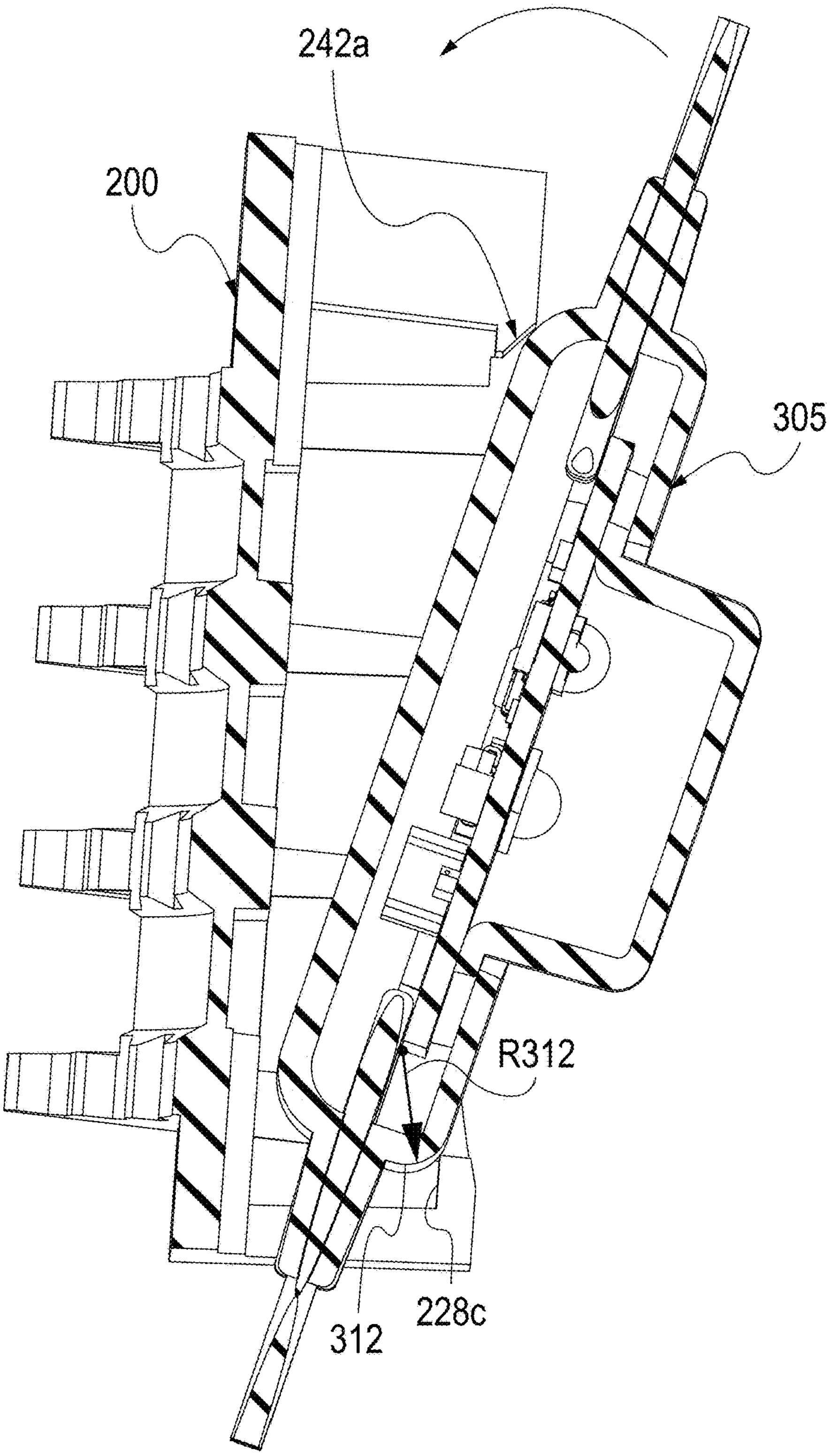
FIG. 22 depicts the inserting of a light module into a bracket as may occur during the method of assembly in FIG. 20.

As alluded to earlier herein, the rectangular housing 306 may be made from a rubber or an elastomer that is flexible that will allow it to be snapped into an attachment bracket underneath an undercut 228*b*, 228*c*, etc. A convex fillet 312 that extends along a housing perimeter may be provided that acts as a lead-in to a complementarily shaped feature of the bracket as shown in FIG. 22. This may not be the case for other embodiments of the present disclosure.

Focusing now FIGS. 9 thru 14, the first attachment bracket 200 may comprise a body defining a first light module receiving aperture (e.g., the first LED module receiving aperture 202 but may receive other types of lights as alluded to earlier herein), a first wire receiving slot 210 that is in communication with the light module receiving aperture, and a first fastener receiving slot (e.g., first fastener receiving thru-slot 204) that extends into or through the body. That is to say, the fastener receiving slot may simply be a hole that receives a bolt, a nut, or a cap screw, etc. The body may also define a front face 212, and the first LED module receiving aperture 202 may extend from the front face 212 to a rear wall 214 of the body. Also, the first wire receiving slot 210 may extend from the front face 212 toward the rear wall 214 of the body. As a result, the first LED module receiving aperture 202 forms an annular wall 216 of the body, and the first wire receiving slot 210 may extend through the annular wall 216.

Figure 10:
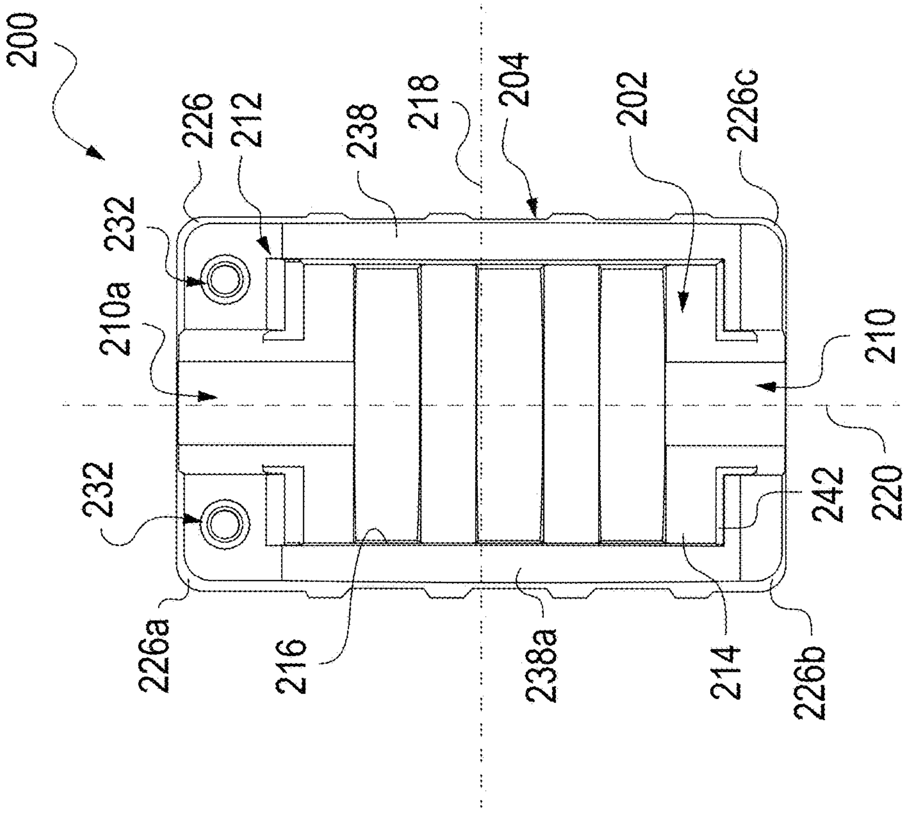
FIG. 10 is a front view of the bracket of FIG. 9.
Figure 13:
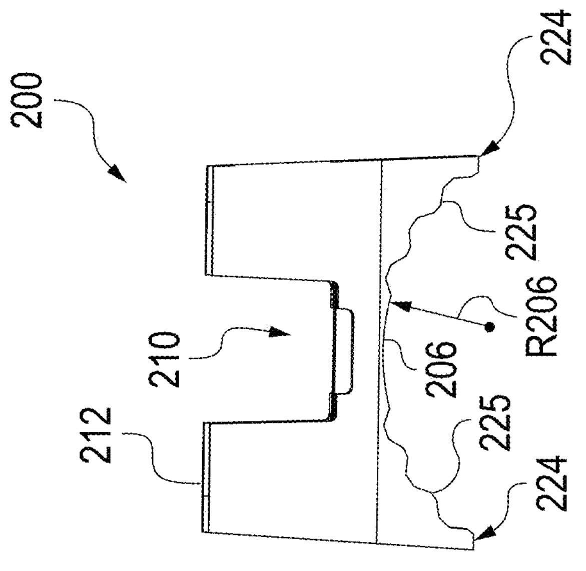
FIG. 13 is a bottom view of the bracket of FIG. 9.

Similarly, as seen in FIG. 10, a second wire receiving slot 210*a* may be provided that is in communication with the first LED module receiving aperture 202, and the second wire receiving slot 210 may extend through the annular wall 216. The second wire receiving slot 210*a* extends from the front face 212 toward the rear wall 214 of the body. These slots 210, 210*a* may be symmetrical about a longitudinal midplane 218, and about a lateral midplane 220 of the bracket but not necessarily so.

Figure 9:
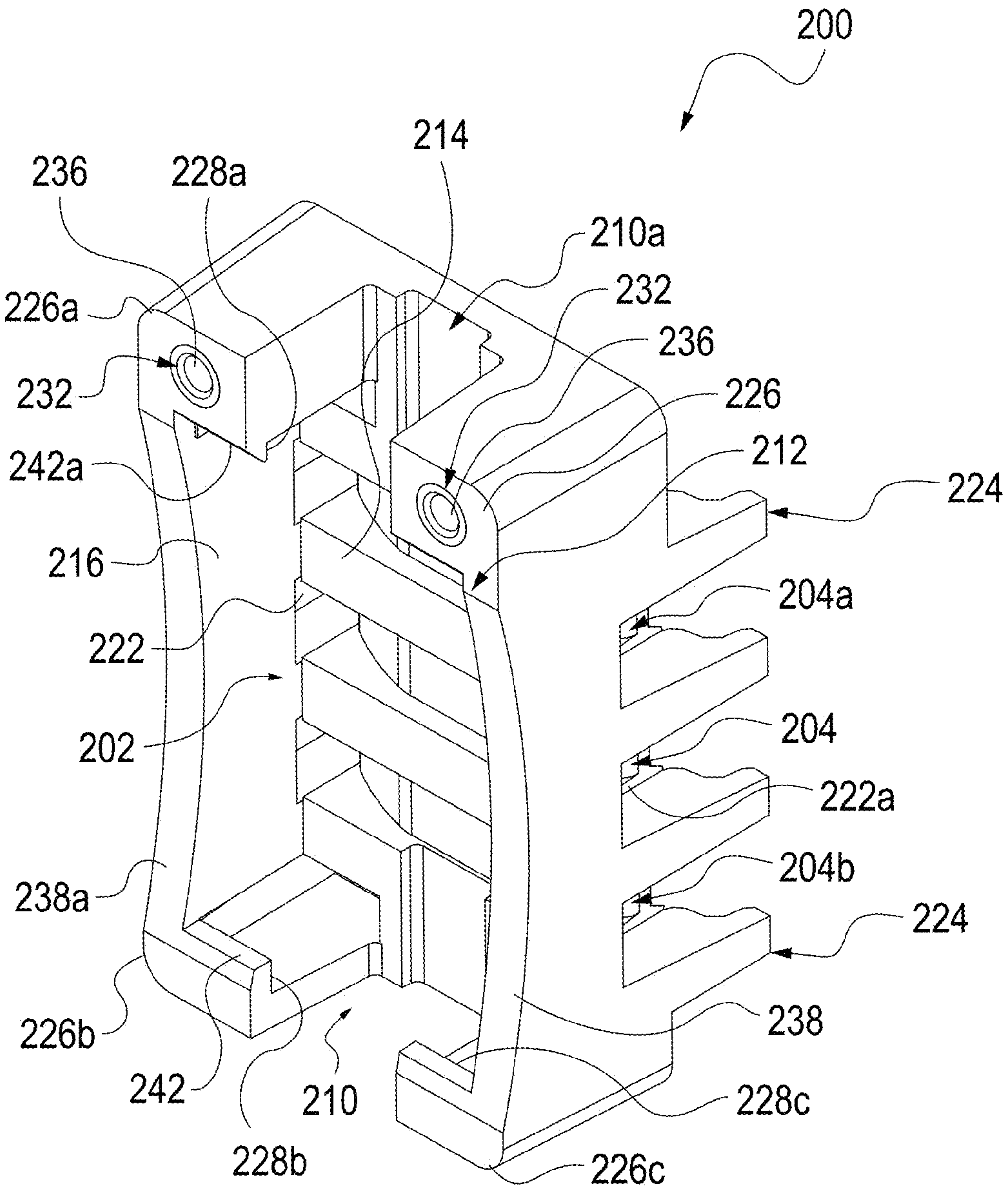
FIG. 9 is a perspective view of the bracket of FIG. 4 shown in isolation.
Figure 14:
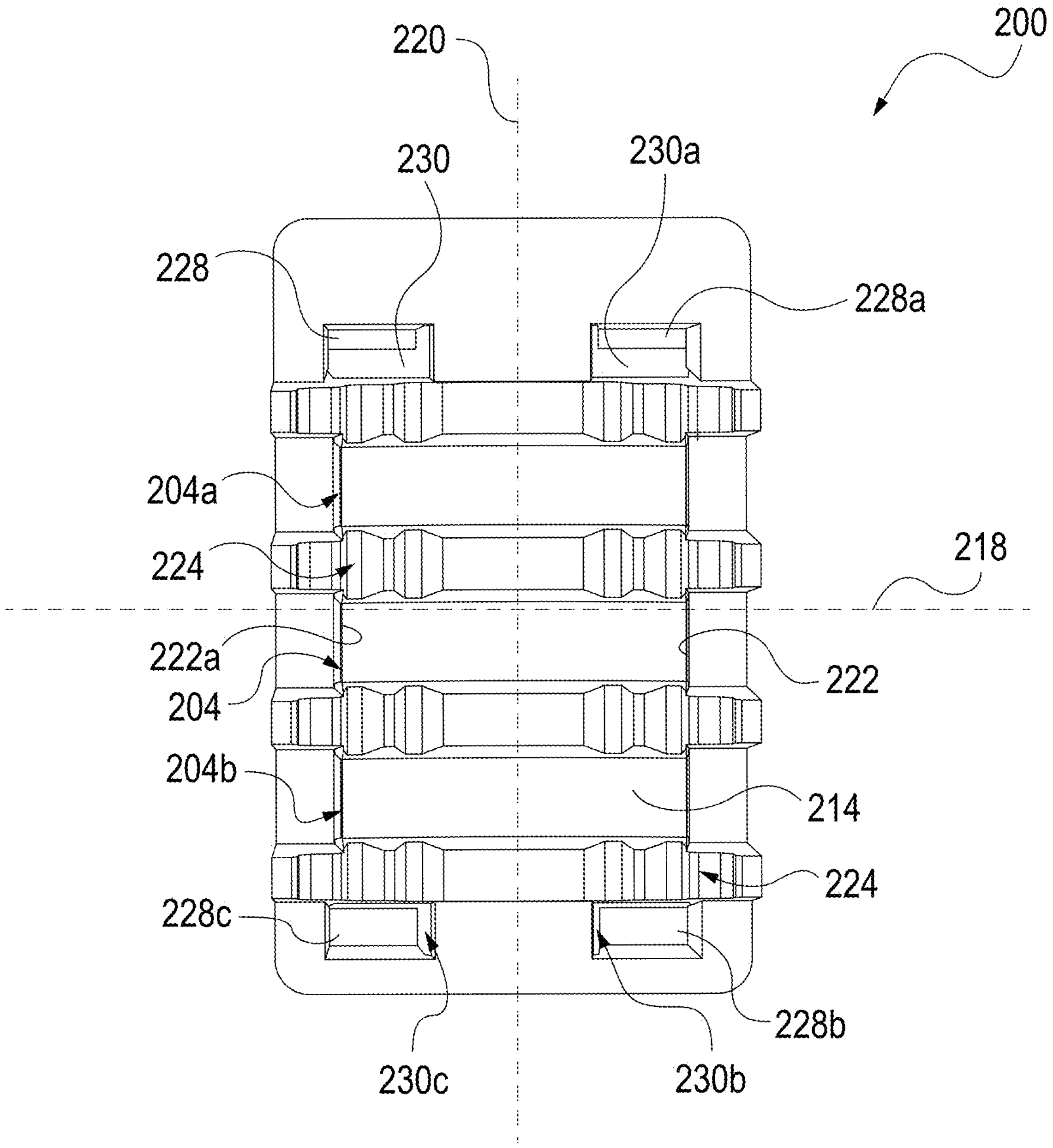
FIG. 14 is a rear view of the bracket of FIG. 9.

Looking at FIGS. 9 and 14, the first fastener receiving thru-slot 204 may extend through the annular wall 216 at a first location 222 and a second location 222*a* that is in linear alignment with the first location 222. This may not be the case in other embodiments of the present disclosure. Furthermore, the first fastener receiving slot may be disposed at a longitudinal midplane 218 of the bracket, but not necessarily so. The bracket may also have or define a second fastener receiving thru-slot 204*a*, and a third fastener receiving thru-slot 204*b* that straddle the first fastener receiving slot. The first fastener receiving slot, the second fastener receiving slot, and the third fastener receiving slot may be identically configured. That is to say, they may have similar dimensions that are within a reasonable manufacturing tolerance of +/−0.02 of an inch. The second and third slots may be symmetrical about the longitudinal midplane 218 as well, but not necessarily so.

Referring to FIGS. 9, and 11 thru 14, the body of the first attachment bracket may include a plurality of standoffs 224 that extend from the rear wall 214. One or more of these standoffs 224 may define a concave arcuate surface, or stepped profile 225 (see FIGS. 12 and 13) or teeth that is configured to grip the suspension member such as the suspension wire 104 or otherwise create friction. This may not be the case in other embodiments of the present disclosure. The first concave arcuate surface 206 (approximated by a tangent to the stepped profile 225) may define a concave radius of curvature R206 that ranges from 1.75 inches to 2.25 inches (e.g., may have a nominal value of 2.0 inches in certain embodiments of the present disclosure). Of course, this may be different in other embodiments of the present disclosure such as when the diameter of the suspension wire or rope is less or greater than those shown in the drawings, or if the bracket is attached to a flat surface of a girder or the like, etc.

In FIGS. 9 and 10, the light module receiving aperture 202 forms a front face 212, and an annular wall 216 of the body having a rectangular shape with a first corner 226, a second corner 226*a*, a third corner 226*b*, and a fourth corner 226*c*. As best seen in FIGS. 9 and 14, the first corner forms 226 a first undercut 228 disposed underneath the front face 212, the second corner 226*a* forms a second undercut 228*a* disposed underneath the front face 212, the third corner 226*b* forms a third undercut 228*b* disposed underneath the front face 212, the fourth corner 226*c* forms a fourth undercut 228*c* disposed underneath the front face 212.

The first and second undercuts may be symmetrical to each other about the lateral midplane 220, and the third and fourth undercuts may be symmetrical to each other about the lateral midplane 220. This may not be the case in other embodiments of the present disclosure. In some embodiments, only one undercut may be provided or none at all, etc.

In FIG. 14, the rear wall 214 may define a first thru-hole 230 (i.e., it extends completely through the rear wall 214) disposed underneath the first undercut 228, a second thru-hole 230*a* disposed underneath the second undercut 228*a*, a third thru-hole 230*b* disposed underneath the third undercut 228*b*, and a fourth thru-hole 230*c* disposed underneath the fourth undercut 228*c*. These thru-holes may allow mold cores to form the undercuts if the bracket is manufactured using an injection molding process. For example, the bracket may be molded using a glass filled material such as nylon 6/6 or a similar material. The material may be reinforced with a 10-20% filler such as glass, etc.

Referring now to FIGS. 9 and 10, the front face 212 defines a first insert receiving aperture (e.g., round hole 232) at the first corner 226 that is configured to receive a threaded insert such as sold by Penn Engineering and Manufacturing Corp.® (PEM) (model no. IBC-832-4 molded-in threaded insert). A keeper 234 may be fastened to such an insert 236, allowing the keeper to be swung from an open position (see FIG. 15) to a closed position (see FIG. 16). When in the closed position, the keeper 234 straddles the first wire receiving slot 210 or second wire receiving slot 210*a*, helping to keep the wire and the first LED module 300 in the bracket. The keeper may also partially cover the LED module (see FIG. 16) to help keep it in the bracket. Such a keeper may be omitted in some embodiments of the present disclosure.

In some applications, it may be desirable that some light be seen along a direction sideways from the LED or other light source. In such a case, the front face 212 defines a first front depression 238 on a first side of the light module receiving aperture as depicted in FIGS. 9 thru 16. In some cases, a second front depression 238*a* on a second side of the light module receiving aperture may be provided so that light can be seen from the other side. These depression(s) may be omitted in other embodiments of the present disclosure.

Figure 18:
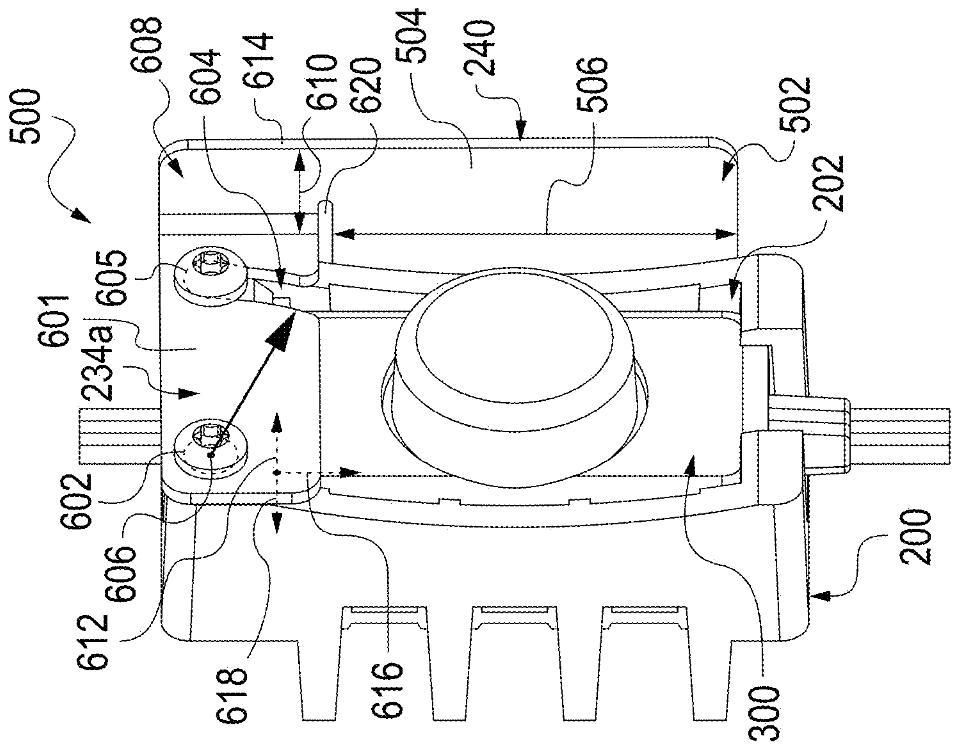
FIGS. 17 and 18 are perspective views of alternate embodiments of the bracket and the keeper with a visor formed as part of the keeper shown.
Figure 17:
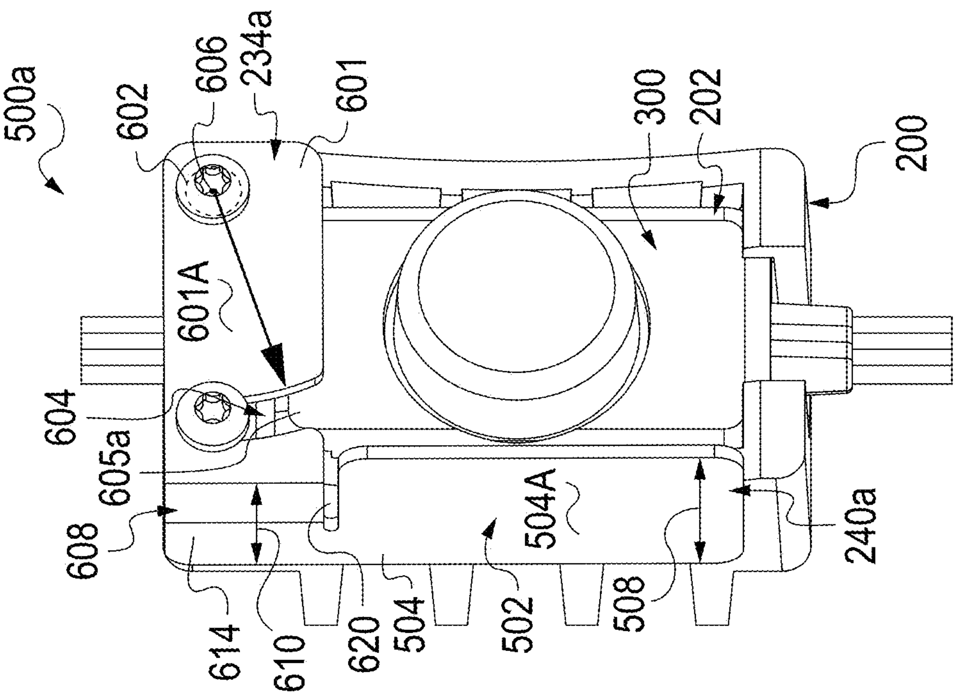

In other applications such as shown in FIGS. 17 and 18, it may be desirable that light is not seen sideways from the LED or other light source by passersby such as cars and pedestrians. In such a case, the bracket may include a first front glare shield protrusion 240 (may also be referred to as a visor). A second front glare shield protrusion 240*a* may also be provided in other embodiments on the other side of another bracket and LED or light source. These glare shields or visors may be molded as part of the bracket itself, or may be part of the keeper as shown in FIGS. 17 and 18, etc.

In such a case, the keeper 234*a* may be a stamped and folded sheet metal or aluminum member. In practice, these visors or glare shields may only be needed for approximately 10 to 30 feet above the road or walkway of a bridge since any glare above that height would not be perceived by a passersby. In some embodiments, such glare shields or visors may be omitted.

INDUSTRIAL APPLICABILITY

In practice, one or more of the following components, assemblies, or subassemblies may be provided initially at the first point of sale in an original equipment manufacturer (OEM) context, or as a replacement part or substitutable part in an aftermarket context: a bracket, a light module, a string of lights, a strap or other fastener, a keeper, a visor, a keeper, and bracket assembly, and/or a visor and bracket assembly.

Figure 21:
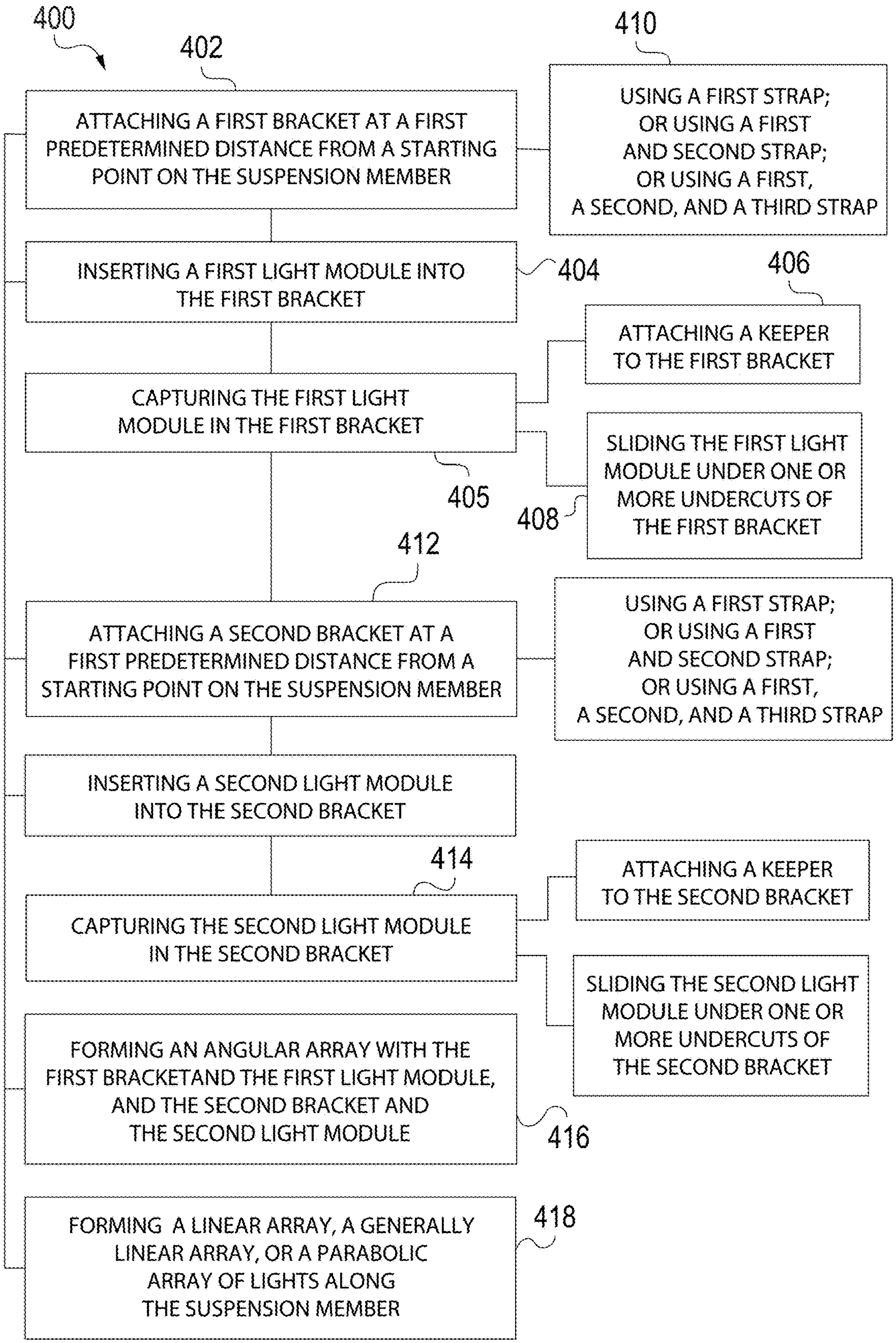
FIG. 21 is a flowchart containing a method of assembling an apparatus or system of lights according to an embodiment of the present disclosure.

Turning now to FIG. 21, a method is illustrated that discloses a method of assembling one or more of the embodiments previously discussed herein. Such a method 400 of assembling a string of lights on a suspension member may comprise attaching a first bracket at a first predetermined distance from a starting point on the suspension member 402 and inserting a first light module into the first bracket 404. Inserting may be accomplished before attaching. For example, a host of light modules may be inserted into a corresponding number of brackets. Then, the installer would not have to do this step while being lifted for each instance of a light module and bracket subassembly. In other cases, attaching would occur first.

The method may further comprise capturing the first light module in the first bracket 405 in various ways. For example, this capturing may be done by attaching a keeper to the first bracket 406 and/or sliding the first light module under one or more undercuts 408. This process of sliding the first light module under one or more undercuts of the first bracket is physically depicted in FIG. 22. This sliding or insertion of the first light module may be accomplished in other ways. During this insertion, the rubber molding if provided may be designed to compress until insertion is complete, at which time the rubber molding will rebound trapping the light module in the bracket. This may not occur in other embodiments of the present disclosure. Chamfers may be provided or other lead-in geometry (e.g., fillets, curved lead-in surface 242, chamfer 242*a* in FIGS. 9 and 22, etc.) may be provided on the bracket to facilitate compression of the overmolding of the LED module. This may not occur in other embodiments of the present disclosure.

Attaching the first bracket at the first predetermined distance from the starting point on the suspension member 402 may include using a first strap and/or a second strap, and/or a third strap that engages the first bracket and the suspension member 410. Fasteners, adhesives, etc. may be used to attach the bracket in other embodiments of the present disclosure.

Portions of the method may be repeated for each instance of a light module and/or bracket. For example, the method 400 may further comprise attaching a second bracket at the first predetermined distance from the starting point on the suspension member and inserting a second light module into the second bracket 412 and capturing the second light module in the second bracket 414. Capturing the second light module in the second bracket may occur before attaching the second bracket to the suspension member, or not.

Capturing the second light module in the second bracket may include the use of a keeper or undercut(s) as previously described herein with respect to capturing the first light module in the first bracket.

Figure 16:
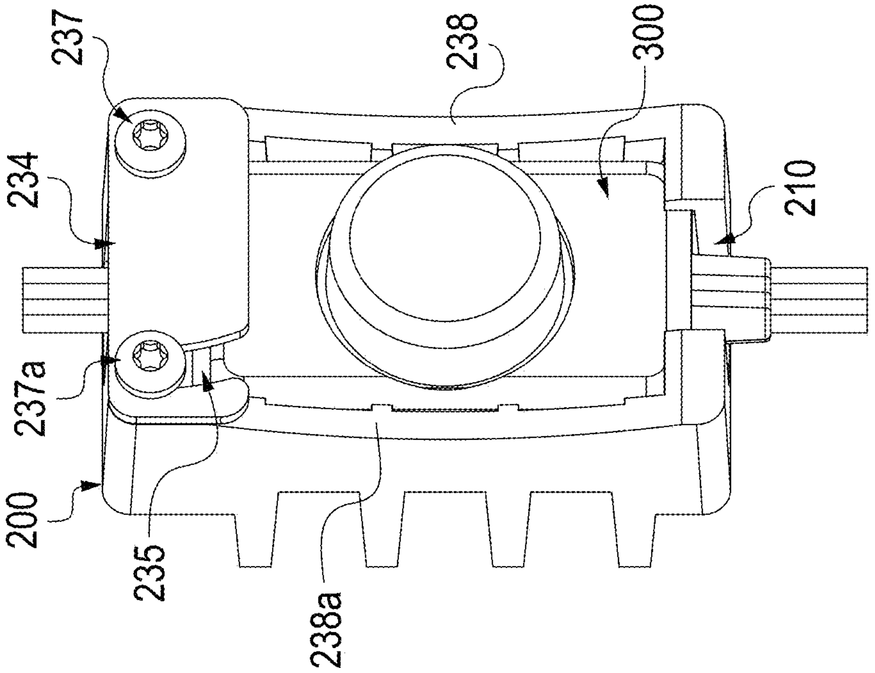
FIG. 16 illustrates the bracket and keeper of FIG. 15 with the keeper in a closed position.
Figure 15:
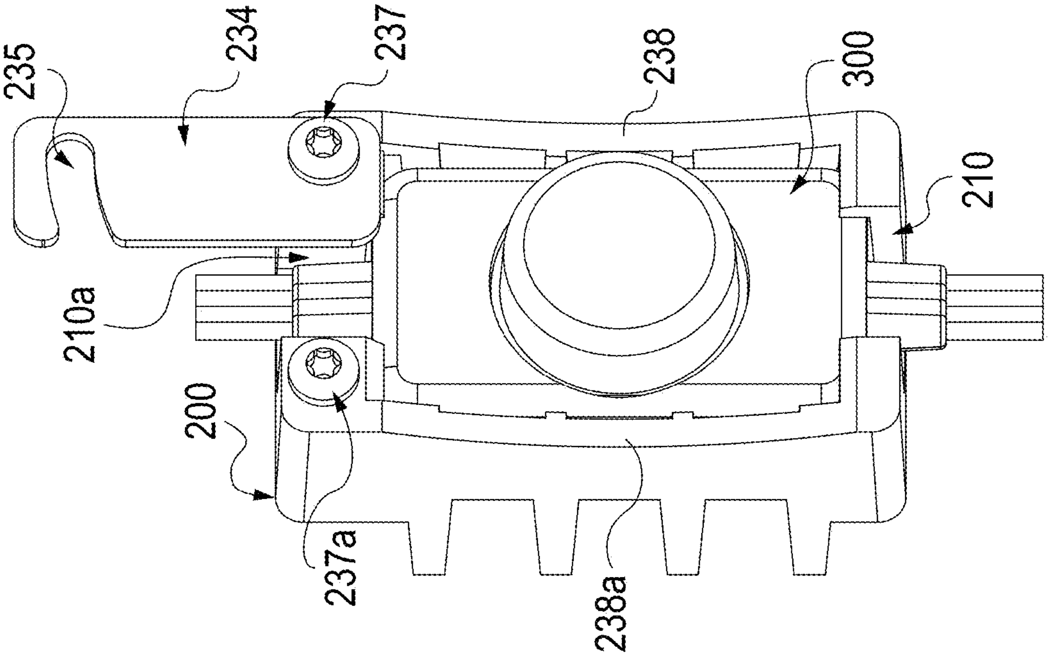
FIG. 15 is a perspective view of the bracket with a keeper fastened to the bracket. The keeper is shown in an open position allowing the insertion of the LED module and wires into the bracket.

Referring back to FIG. 10 as well as FIGS. 15 and 16, it is to be understood that the PEM inserts may be first inserted into the bracket, then a screw 237 may be inserted through the round aperture of the keeper until it engages the PEM insert and is finger tightened with slight clearance between the head of the screw and the keeper. This may create an axis about which the keeper may be free to rotate. When rotated up and out of the way, the keeper is no impediment to the insertion of the wire(s) of the LED module or the LED module itself. Another screw 237*a* may be finger tightened in the other PEM insert so that its head will not interfere with the downward rotation of the keeper. This downward rotation may result in the screw entering a slot 235 as the keeper now covers the wire slot or the LED module itself, helping keep the LED module in the bracket. Then, the screw(s) may be tightened to prevent the unwanted upward rotation of the keeper to an open configuration. PEM inserts may be omitted in other embodiments of the present disclosure such as when self-tapping screws are employed.

For the convenience of the user, various brackets and keepers or visors may be supplied in a pre-assembled state or pseudo preassembled state to allow for quicker installation.

For example, looking at FIGS. 17 and 18, a visor and bracket assembly 500, 500*a* may comprise a bracket (e.g., a first attachment bracket 200) defining a light receiving aperture (e.g., a first LED module receiving aperture 202), at least a first wire receiving slot 210. A visor 502 may be attached to the bracket that covers or is at least configured to cover the wire receiving slot (e.g., see keeper 234*a*), and may include a visor portion 504 that extends next to the light receiving aperture, but not over the light receiving aperture or the wire receiving slot.

The visor 502 may be a right-handed visor (see FIG. 18) with the visor portion 504 extending along a right side of the light receiving aperture, or the visor 502 may be a left-handed visor (see FIG. 17) with the visor portion extending along a left side of the light receiving aperture. Either configuration may be achieved by flipping the visor 502 180 degrees about the lateral midplane 220 (see FIG. 10). That is to say, the same visor may be used to form a right-handed visor or a left-handed visor. Differently configured visors may be used as right-handed or left-handed visors in other embodiments of the present disclosure.

Similarly, a keeper and bracket assembly 600 (see FIGS. 25 and 26) may be provided that includes a bracket 200 as just described, and a keeper 234, etc. that is attached to the bracket. The keeper 234 may be configured to cover the wire receiving slot using a pivot aperture 602. This pivot aperture may include a round hole for receiving a screw or the like as previously described herein. Also, the keeper may include a slot 235 (may be arcuately shape, but not necessarily so) for receiving another screw or the like as alluded to earlier herein.

These assemblies may be supplied with the screws 237, 237*a* lightly tightened so that the keeper and/or the visor may be stowed with the second screw disposed in the arcuate slot for shipping. Then, during installation the user can simply swing the keeper or visor out of the way so that the LED module and its wire(s) can be inserted into the corresponding slots of the bracket. Next, the keeper and/or visor can be swung until the second screw is within the arcuate slot allowing one or both screws to be tightened to lock the keeper and/or visor into place.

In some cases, the keeper 234, 234*a* may be provided as a retrofit or a replacement part in the field, etc. As seen in FIGS. 17 and 18, the keeper 234*a* may include an attachment plate portion 601 (may have a rectangular configuration, but not necessarily so) defining a pivot aperture 602, and an arcuate slot 604. More particularly, the pivot aperture may be cylindrical, and the arcuate slot 604 may define a center 606 of curvature that is disposed within the pivot aperture 602. As a result of this structure, pivoting the keeper about the pivot aperture 602 (and its associated fastener) will cause the arcuate slot 604 to receive another fastener in a smooth and continuous fashion until the closed end 605 (see also FIG. 24) of the arcuate slot contacts or nearly contacts the fastener.

In FIGS. 17 and 18, the flange portion 608 may extend away from the attachment plate portion proximate to the arcuate slot 604 a protrusion distance 610 along a first direction 612 that is perpendicular to the attachment plate portion 601 to a free end 614. In some embodiments, the protrusion distance 610 may range from 0.375 of an inch to 0.625 of an inch (e.g., a nominal value of 0.5 inch). Other ranges are possible in other embodiments of the present disclosure.

A visor plate portion (e.g., see visor portion 504) may extend from the flange portion 604 at the free end 614 along an orthogonal direction 616 to the first direction defining 612 a visor plate portion length 506, and along a direction 618 that is opposite of the first direction 612 defining a visor plate width 508. In certain embodiments of the present disclosure but not all, the visor plate portion length 506 ranges from 1.625 inches to 1.875 inches (e.g., a nominal value of 1.75 inches), and the visor plate width 508 ranges from 0.815 of an inch to 1.065 inches (e.g., a nominal value of 0.94 inches). Other dimensional ranges are possible in other embodiments of the present disclosure.

Any of the embodiments of features discussed herein may be scaled up or down depending on the application. Accordingly, in more general terms, a ratio of the visor portion length to a visor plate width may range from 1.55 to 2.25 in certain embodiments of the present disclosure. Other ratio ranges are possible in other embodiments of the present disclosure.

The keeper 234, 234*a* may be manufactured using a stamping process and/or a bending or folding process on a sheet of stainless steel, a 0.063 of an inch thick aluminum sheet, etc. For example, a progressive stamping die or other similar process may be employed to manufacture the keeper. A cutout 620 may be provided between the visor plate portion and the flange portion. This may allow the folding of the body of the keeper so that the visor portion can remain straight without risking a tear at this junction between the visor portion and the flange.

Likewise, a visor 502 may be provided as a retrofit or a replacement part in the field, etc. Still referring to FIGS. 17 and 18, the visor 502 may comprise a single visor planar portion (e.g., see visor portion 504), and an attachment plate portion (e.g., see 601) that extends perpendicularly to the single visor planar portion. As already alluded to earlier herein, a flange portion 608 may connect the single visor planar portion 505 to the attachment plate portion 601.

Both the single visor planar portion (e.g., see visor portion 504), and the attachment plate portion 601 have at least a partially rectangular configuration (i.e., they have three or four straight sides).

As can be by looking at FIG. 17, the single visor planar portion defines a single visor planar portion surface area 504A, and the attachment plate portion 601 defines an attachment plate portion surface area 601A that is less than the single visor planar portion surface area 505A. This may not be the case for other embodiments of the present disclosure. The arcuate slot 604 may have an open end 605A to allow further pivoting of the visor about the pivot aperture away from the wire receiving slot. This may not be the case in other embodiments of the present disclosure.

The visor may be stamped and folded in a manner described earlier herein with regard to the keeper, but not necessarily so. Other manufacturing techniques may be employed including assembling disparate components together, etc.

Looking again at FIG. 21, attaching the second bracket to the suspension member may include the use of one, two, or three straps similar to what has been described previously herein with regard to attaching the first bracket to the suspension member.

The method 400 may further comprise forming an angular array with the first bracket and the first light module, and the second bracket and the second light module 416. The angle between the modules and the brackets may be adjusted by sliding the brackets and/or modules along the strap(s).

Likewise, the method 400 may further include forming a linear array, a substantially linear array, or a parabolic array of lights along the suspension member 418. Forming a linear array, etc. may be done as well as forming an angular array in some embodiments of the present disclosure.

As alluded to earlier herein, the use of certain data transmission protocols may allow a single set or string of lights to be attached along long distances (50 feet or more) with a single pass instead of multiple passes as required previously.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

The LED driver or controller may be programmed to provide various theatrical and lighting effects. In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Figure 23:
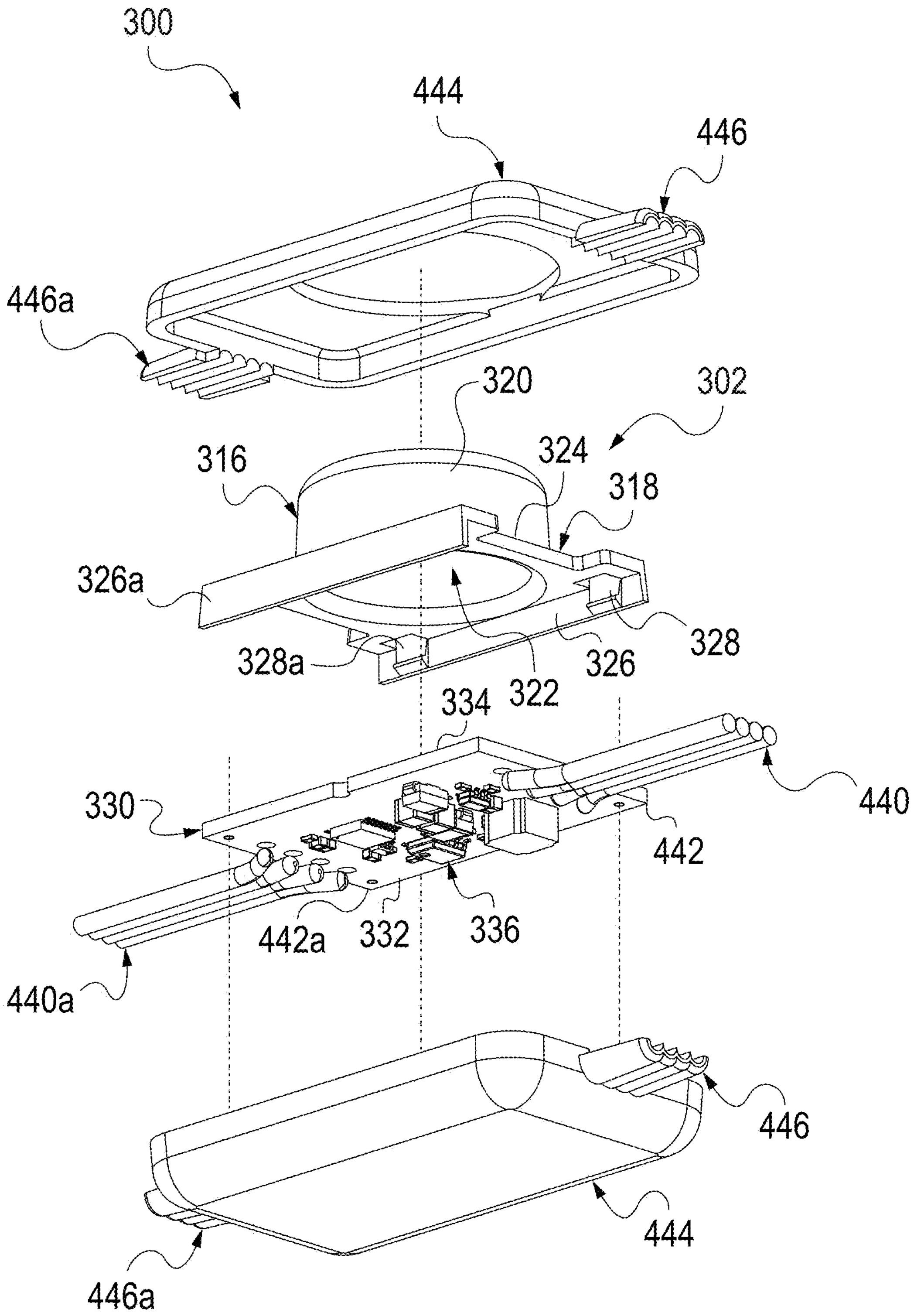
FIG. 23 contains an exploded assembly view of an LED light module according to an embodiment of the present disclosure.

FIG. 23 illustrates how a LED module or other type of light module may be manufactured and assembled. The lens 302 may be injection molded, and may include an exposed portion 316 once assembled, and an unexposed portion 318 once the module is manufactured or assembled. The exposed portion 316 may have an outer cylindrical or conical protrusion 320 depending on draft (may be hollow or have a shell configuration to allow a light or LED(s) to extend therein), and the unexposed portion 318 may include a U-shaped frame portion 322. As shown in FIGS. 3 and 5, red, green, and blue LEDs 338 may be used. Fewer or different LEDs may be employed in other embodiments of the present disclosure. In some embodiments, XML Cree chip LEDs manufactured by Cree LED® or modified versions of these type of LEDs may be employed.

Still referring to FIG. 23, this U-shaped frame portion 322 includes a top platform 324, a pair of side walls 326, **326*a* that extend downwardly from the top platform 324. Also, the outer cylindrical or conical protrusion 320 may extend upwardly from the top platform 324, while a pair of snaps 328, 328*a* extend downwardly from the top platform 324 that are configured to capture a PCB 330**.

In some embodiments, the lens 302 defines a first plane of symmetry (e.g., similar to or coincident with lateral midplane 220 referred to earlier herein when attached to the bracket), and a second plane of symmetry (e.g., similar to or coincident with the longitudinal midplane 218 referred to earlier herein when attached to the bracket).

The PCB 330 may include a bottom side 332, a top side 334, a plurality of circuitry components 336 attached to the bottom side, and a LED 338 (may be three LEDs, red, blue, green) attached to the top side 334 that is in electrical communication with the plurality of circuitry components 336.

Moreover, a first set of four conductors 440 may extend from a first end 442 of the rectangularly shaped PCB 330 being in electrical communication with the plurality of circuitry components 336, while a second set of four conductors **440*a* may extend from a second end 442*a* of the PCB 330 being in electrical communication with the plurality of circuitry components 336**.

Once the lens is snapped onto the PCB, and the conductors are soldered onto the PCB, then the PCB may be overmolded with a rubber or elastomer as previously described herein using a method similar to or identical to that disclosed by U.S. Pat. No. 8,756,801 B2. As a result, the overmolding 444 may cover a side of the lens or be in close proximity thereto, may cover the majority of the PCB, and a portion 446 of the first set of four conductors 440, and a portion 446*a* of the second set of four conductors 440*a*. While the overmolding is shown in split halves in FIG. 22, it is to be understood that it would be in fact one piece in some embodiments of the present disclosure due to the molding process.

Though not shown, a bottom bracket may also be provided that connects or snaps to its lens or U-shaped frame portion to form a complete housing or enclosure about the PCB before overmolding. This may help pass certain certification testing.

Figure 24:
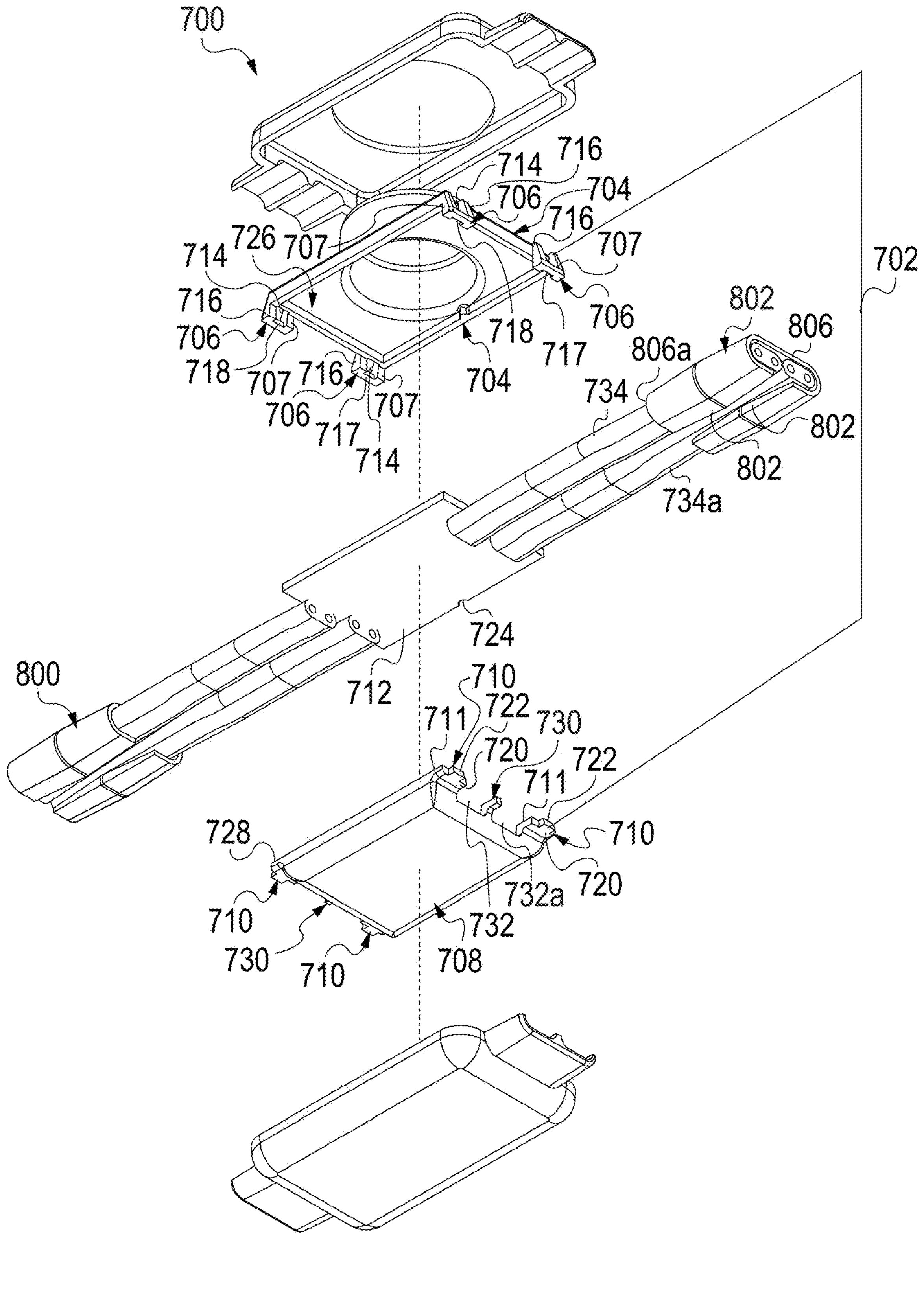
FIG. 24 contains an exploded assembly view of a LED light module according to another embodiment of the present disclosure.
Figure 25:
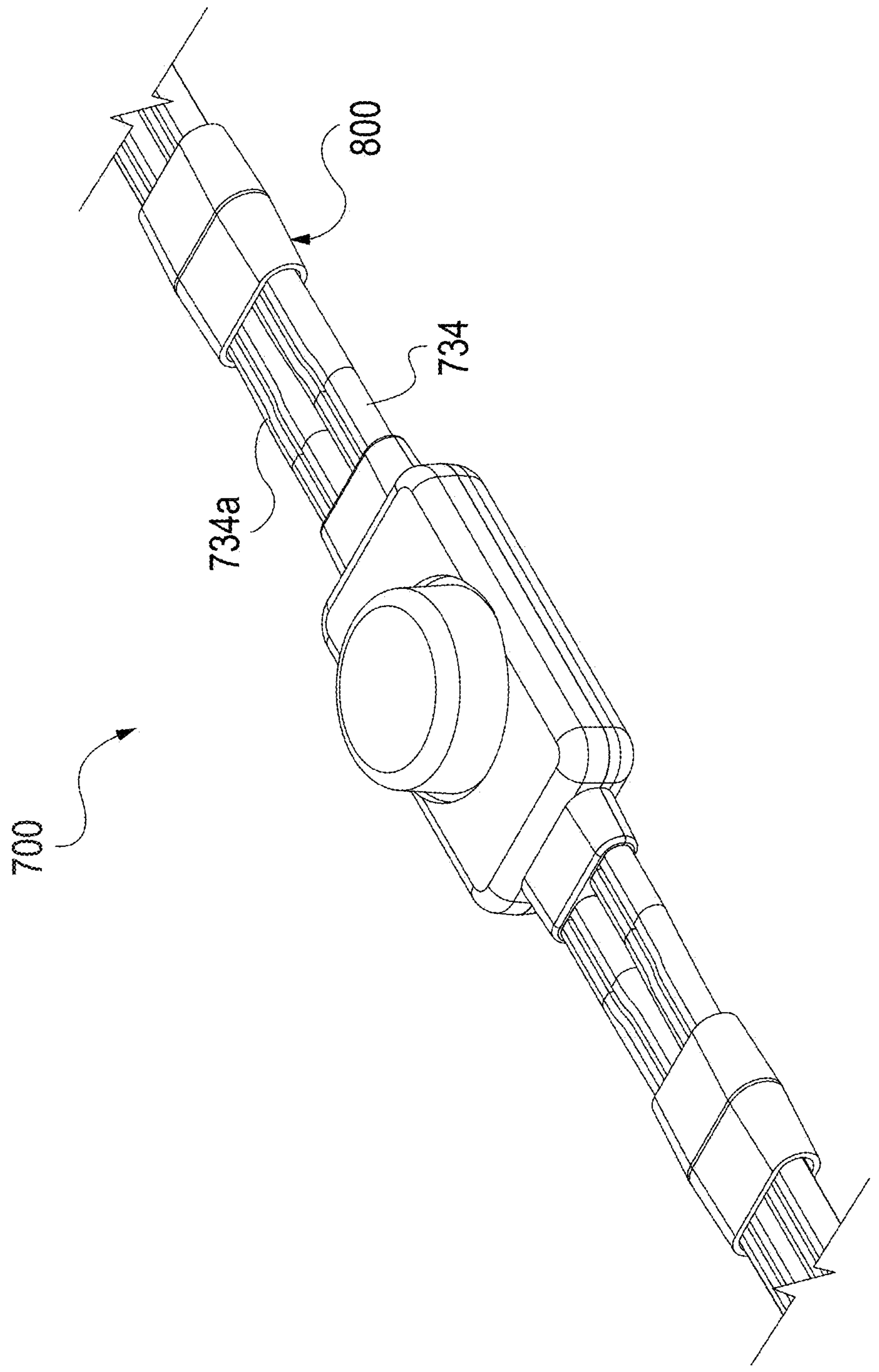
FIG. 25 shows the LED light module of FIG. 24 fully assembled.
Figure 27:
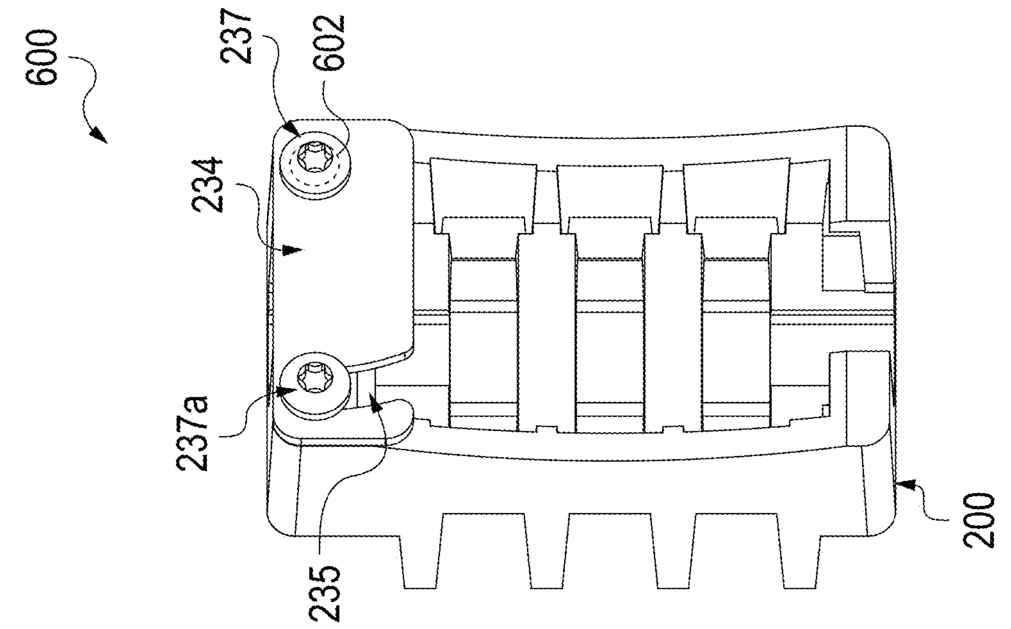
FIG. 27 illustrates the bracket and keeper assembly of FIG. 26 with the keeper positioned in a closed position, holding the LED light module in place in the bracket.
Figure 26:
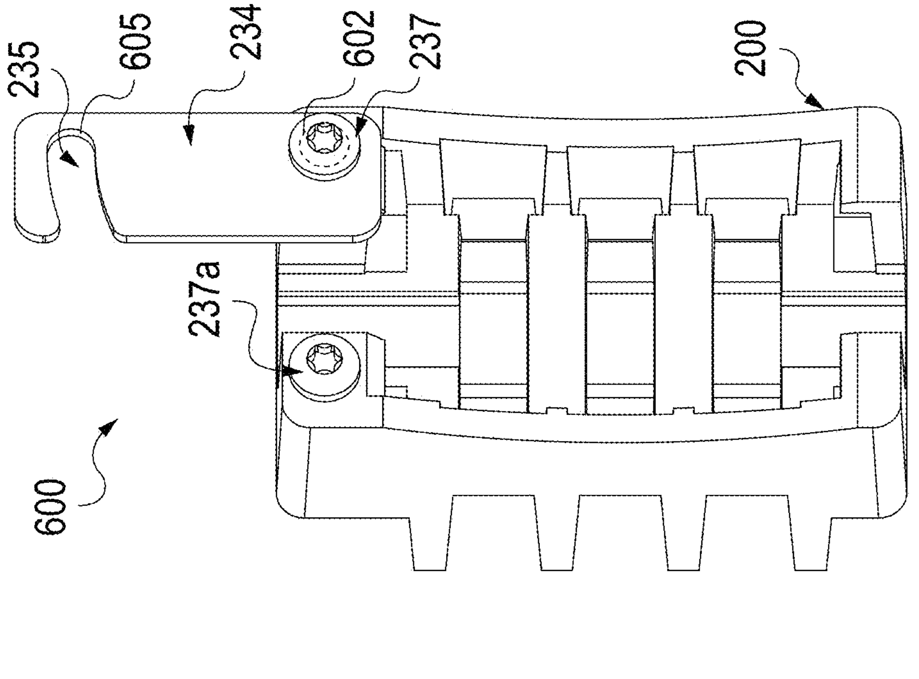
FIG. 26 is a perspective view of a bracket and keeper assembly with the keeper positioned in an open configuration, allowing a LED light module (may also be referred to as a pixel) to be placed into the bracket.
Figure 28:
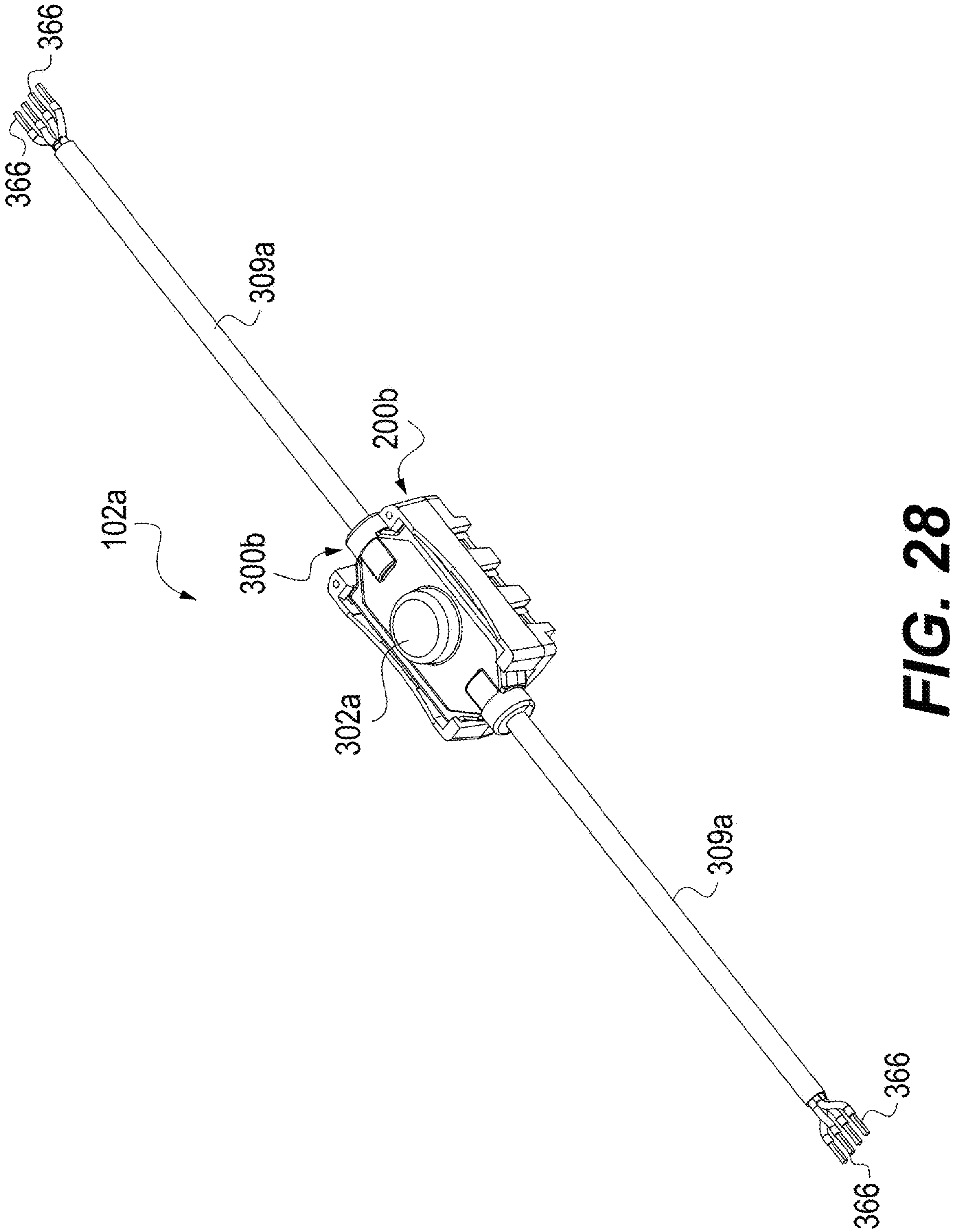
FIG. 28 is a perspective view of a single instance of a LED module in a bracket configured according to yet another embodiment of the present disclosure that employs a pair of single cords that encapsulate four wires on either side of the LED module.
Figure 29:
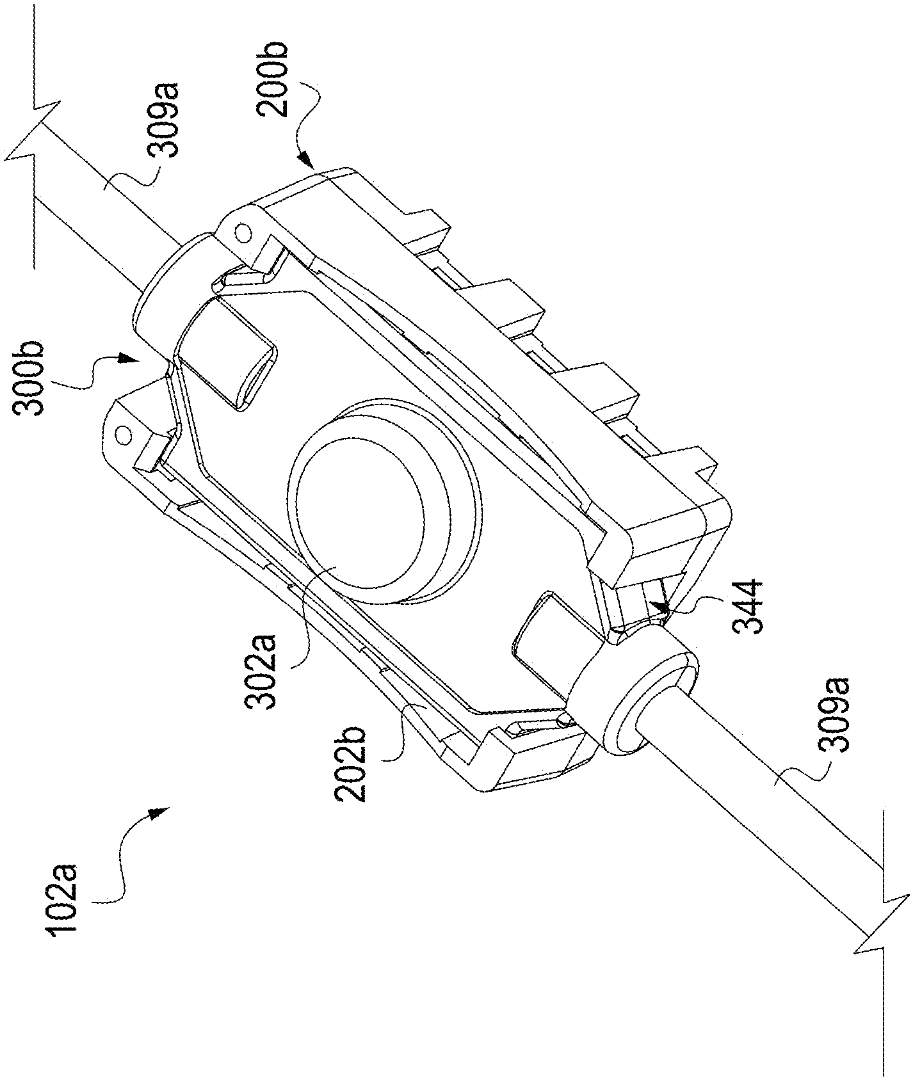
FIG. 29 is an enlarged view of the LED module, cords, bracket, etc. of FIG. 28.
Figure 30:
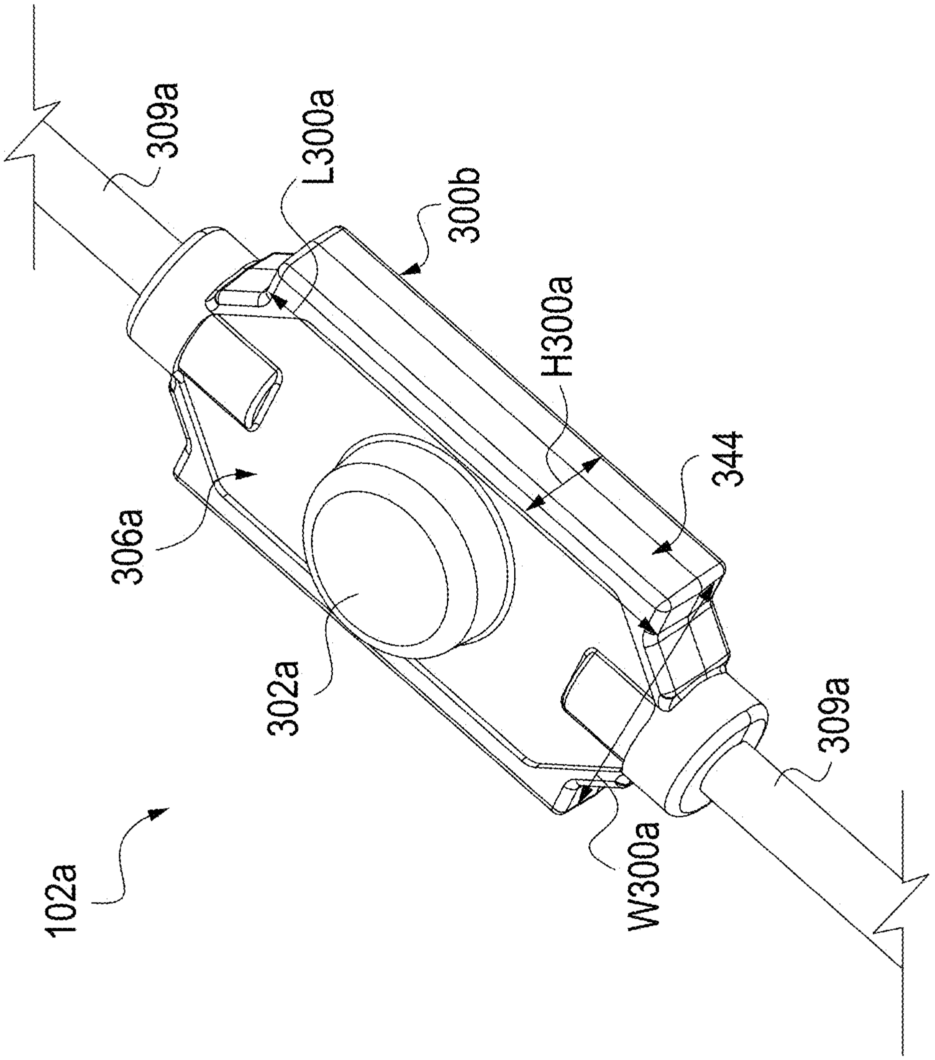
FIG. 30 illustrates the assembly of FIG. 29 with the bracket removed and the overall dimensions of the LED module shown similar to FIGS. 5 and 6.

For example, FIGS. 24 and 25 discloses such an embodiment that may be referred to as a pixel assembly. The pixel assembly 700 may be similarly or identically configured and similarly or identically manufactured, and/or used as the embodiment shown in FIG. 23, etc., except for the following differences.

Focusing on FIG. 24, an inner housing may be employed that may provide for a better flame rating when tested. Such an inner housing 702 may include a top member 704 that defines a plurality of top snap features 706, and a bottom member 708 that defines a plurality of bottom snap features 710. The top member 704 and bottom member 708 of the inner housing 702 are configured to surround the PCB 712 once the bottom member is snapped onto the top member, or vice versa. Though not shown, it is to be understood that circuitry and LEDs may be included with the PCB similar or identical to those show in FIG. 23.

In some embodiments, the plurality of top snap features 706 includes a plurality of top female snap features 707, while the plurality of bottom snap features 710 includes a plurality of bottom male snap features 711. In other embodiments, the male and female snap features may be reversed.

As depicted in FIG. 24, the plurality of top female snap features 707 may include a plurality of windows 714. In this case, the windows 714 are formed by downwardly extending gussets 716 that are connected by a horizontally extending ledge members 717. Consequently, each of the plurality of windows 714 includes a rectangular shape. This may not be the case for other embodiments of the present disclosure.

In addition, a plurality of downwardly extending lead-in surfaces 718 (inwardly facing chamfers in this instance) that lead downwardly from the plurality of windows 714. These lead-in surfaces 718 may engage the plurality of bottom male snap features 711, which in this case includes a plurality of tabs 720. In this case, the tabs 720 have a rectangular shape, and extend horizontally to tab free ends 722. The free ends will impinge on the lead-in surfaces 718, causing the gussets 716 to spread outwardly until the tabs 720 reach the windows and sit on the ledge members 717. Now, the inner housing is snapped around the PCB 712, protecting it from the environment.

With continued reference to FIG. 24, the PCB 712 defines a fool-proofing and/or positioning notch 724, and the top member includes 704 a nub that is configured to fit within the notch 724. The nub and the notch may be reversed in other embodiments of the present disclosure. Also, the top member 704 includes a pocket 726 that receives the PCB 712. Once the bottom member 708 is snapped onto the top member, the shelf surface 728 of the bottom member 708 presses onto the bottom of the PCB 712, holding it in place.

Furthermore, the bottom member 708 includes a middle partition portion 730, forming a first cord receiving slot 732 that is disposed between one of the plurality of tabs 720, and the middle partition portion 730, as well as a second cord receiving slot 732*a* disposed between the middle partition portion 730, and another of the plurality of tabs 720.

A first cord 734 may be attached to the PCB 712 that is configured to be disposed in the first cord receiving slot 732. A second cord 734*a* may also be attached to the PCB 712 that is also configured to be disposed in the second cord receiving slot 732*a*. These cords may be coated with an elastomer or flexible thermoplastic that is slightly compressed once the top and bottom members are snapped together, forming a seal between the cords and the inner housing to prevent the ingress of contaminants or water, etc. The cords may be made from SPT-2W conductor wire sold by Southwire® or a similar manufacturer, each having two conductors being stranded, parallel, and covered by a thermoplastic. One cord may have two conductors that are used for power, while the other cord may have another two conductors that are used for communications and a backup, etc.

Also, a clip 800 may be provided that is configured to be attached to the first cord 734 and the second cord 734*a*, keeping them spaced apart, and helping to prevent a banjoing effect. This may help prevent abrasions, etc. Typically, the clip will be placed half-way between the pixels. The clip may have an oval shape including curved inner ends 802 forming a seam 804 that allows the clip 800 to snap around the cords. Once installed, these curved inner ends 802 hold the cords apart. Longitudinal open ends 806, 806*a* allow the clip to slide up or down the cords as needed or desired.

In some embodiments, the clips may be attached to the cords during the manufacturing process such as before the cords and their conductors are soldered to the PCB.

Of course, cords and features of the pixel assembly may be symmetrical about longitudinal and lateral midplanes in a manner that has been alluded to earlier herein.

Any of the overmoldings discussed herein may be made using Technomelt® PA 6344 (polyamide overmolding material) sold by Henkel-Adhesives® or obtained from a similar source. The lens or top member may be manufactured using Plexiglas® V 825-HID Acrylic resin sold by Trinsco® or other similar manufacturer. The bottom member of the inner housing may be made from 20% fiberglass reinforced nylon, resin (e.g., may be a polyetherimide) #171-80296 sold by Enviroplas® or similar manufacturer.

Yet a further embodiment of the present disclosure may be seen in FIGS. 28 thru 42. This embodiment is similar or identical to that of those described earlier in and may have the same or some mixture of the same features as those described earlier herein. It may also have some differences which will now be described.

The cord has been changed to SJOOW wire in order to increase its outdoor rating. Also, 164 push wire connectors are employed to connect the wires to the PCB in a more robust and efficient manner for assembly. A gasket is disposed in a groove around the perimeter of the top and/or bottom housing to seal the circuitry of the PCB from the ingress of moisture or other contaminants. It is further contemplated that an O-ring or other seal may be disposed in the top and bottom housings or about the cable where the housings squeeze onto the cable to also provide a seal. Alternatively, a more complex grommet with multiple sealing beads may be employed to provide the seal between the housings and the cable(s). The gasket and/or grommet may be formed integral with the bottom or top housing using a two shot molding technique or may be manually inserted into either housing before the housings are assembled, etc.

In addition, the mounting bracket is bigger than the earlier embodiments to accommodate the pixel assembly that is also bigger than the previous embodiments. The top and bottom housing may be made from a polycarbonate while the overmoldings may be made from the same material(s) discussed earlier herein. A ridge may also be provided in the top and/or bottom housing to provide strain relief for the cables.

The assembly process for this embodiment may also be the same as discussed previously herein except that instead of soldering the wires of the cable to the PCB, they may be inserted into the push connectors. Also, the seals/grommets may be inserted into the housing(s) or molded into the housing(s) to provide a water-tight seal. The visors and/or keepers previously described herein may also be used with this embodiment of the present disclosure.

Looking specifically at FIGS. 28 thru 31, this embodiment of a string of LED lights 102*a* may comprise at least a one LED module 300*b* that includes a lens 302*a* with a rectangular housing 306*a* similar to that previously described herein except that it is larger and may have other features. Also, a larger cord 309*a* may extend from the housing. To accommodate the larger cord and the push-on connectors that will be discussed later herein, the housing 306*a* may that is different than previously described herein. For example, the LED module may define a length L300*a*, a width W300*a*, and a height H300*a* (see FIG. 30) with a first ratio of the length to the width ranging from 1.44 to 2.07, and a second ratio of the width to the height ranges from 2.30 to 3.30. Specifically, the dimensions may be greater. For example, the length for this embodiment may range from 2.750 inches to 3.250 inches, the width may range from 1.500 inches to 2.000 inches, and the height may range from 0.500 of an inch to 0.625 of an inch in some embodiments.

As best understood with reference to FIGS. 32 thru 35, and 38, the rectangular housing may be split into a top housing 348, and a bottom housing 350. Also, a longitudinal seal 352 (so called since it extends in predominately the longitudinal direction of the cord) may be provided that mates with the top housing and the bottom housing to help provide a seal therebetween. Similarly, a top grommet 354 (see FIG. 39) that mates with the top arcuate cord engaging portion 356 of the top housing, and a bottom grommet 358 (see FIG. 38) that mates with the bottom arcuate cord engaging portion 360 of the bottom housing may be provided.

Figure 38:
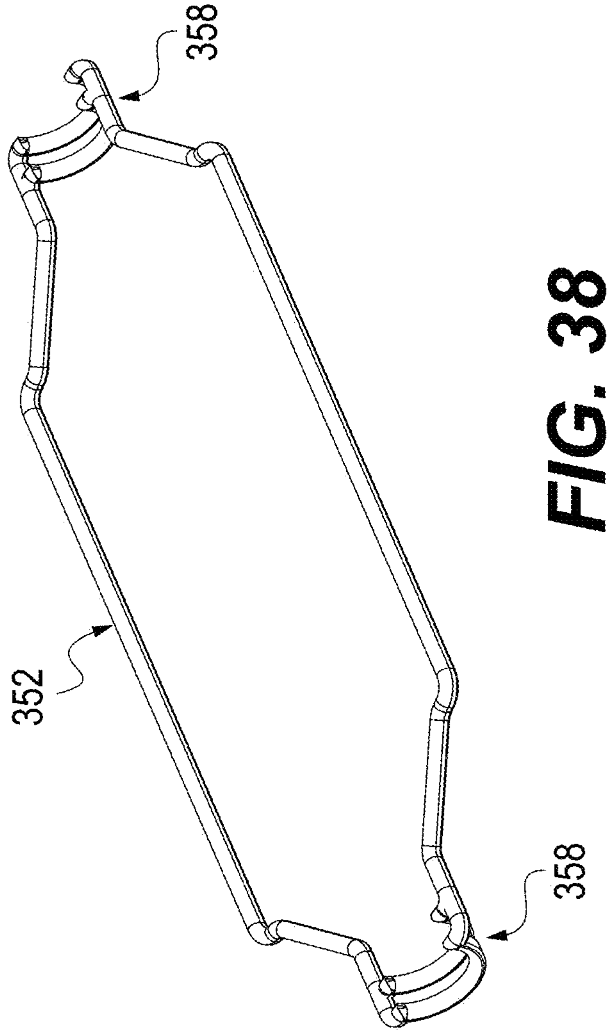
FIG. 38 is a perspective view of a gasket and end grommets formed as a unitary component that mates with the bottom housing of the LED module of FIG. 31 shown in isolation.
Figure 39:
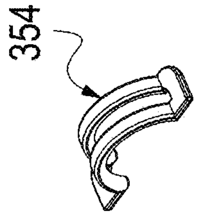
FIG. 39 is a perspective view of a pair of end grommets that are configured to mate with the top housing of the LED module of FIG. 31 shown in isolation.
Figure 39:
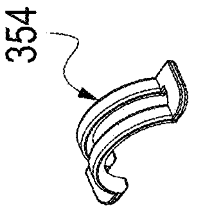

To ease assembly and manufacturing, the bottom grommet 358 may be unitary with the longitudinal seal 352 as shown in FIG. 38 and may be attached to the bottom housing 350 (e.g., via a two shot molding technique) to avoid pinching it during assembly. Conversely, the top grommet 354 may be attached to the top housing 348 similarly, and the top housing may define a seal receiving groove 362 (see FIG. 33) into which the longitudinal seal 352 seats to create the seal.

Figure 31:
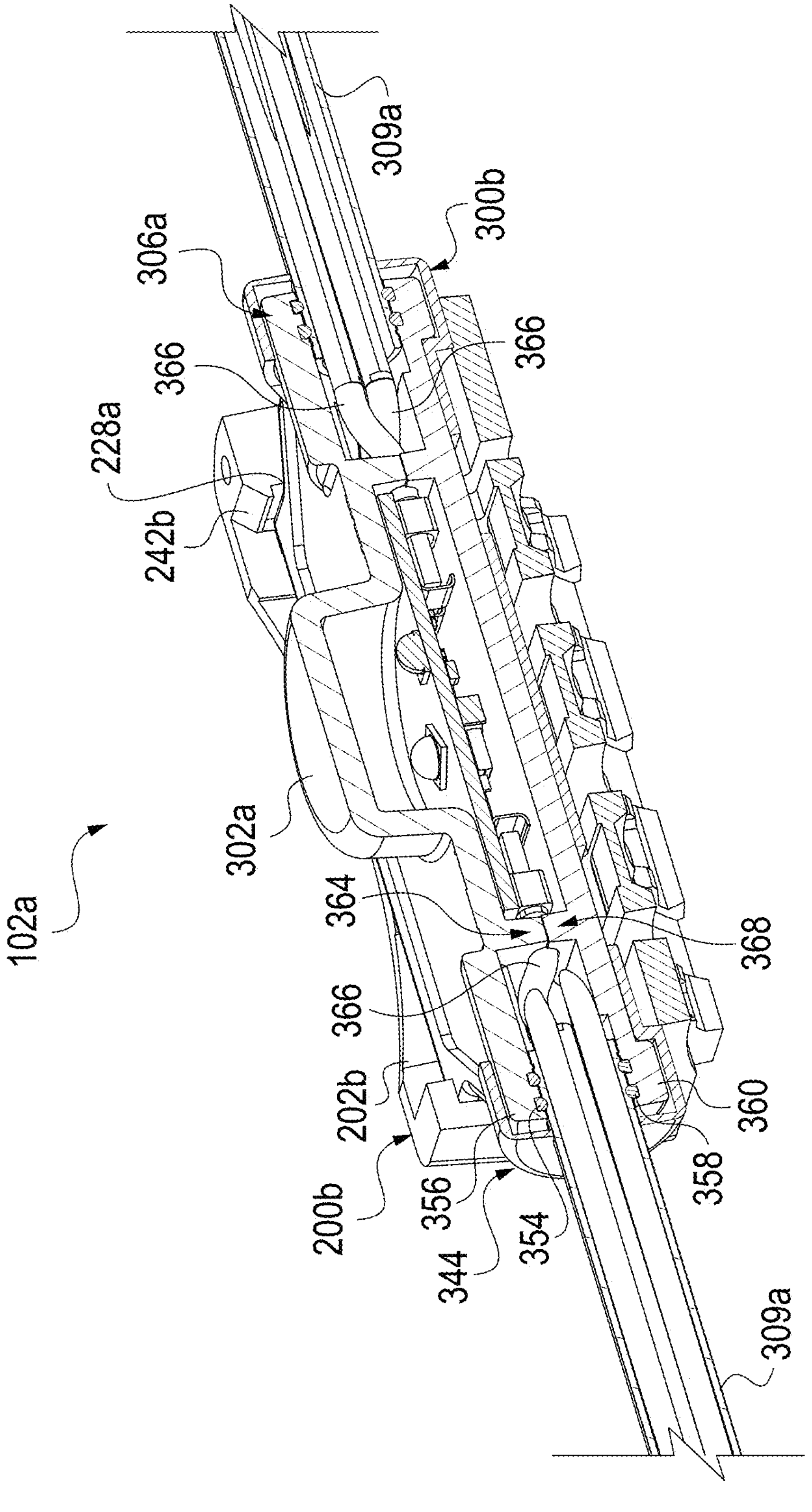
FIG. 31 is a side cross-sectional view of the LED module, cords, bracket, etc. of FIG. 29 taken along lines 31-31 thereof.
Figure 41:
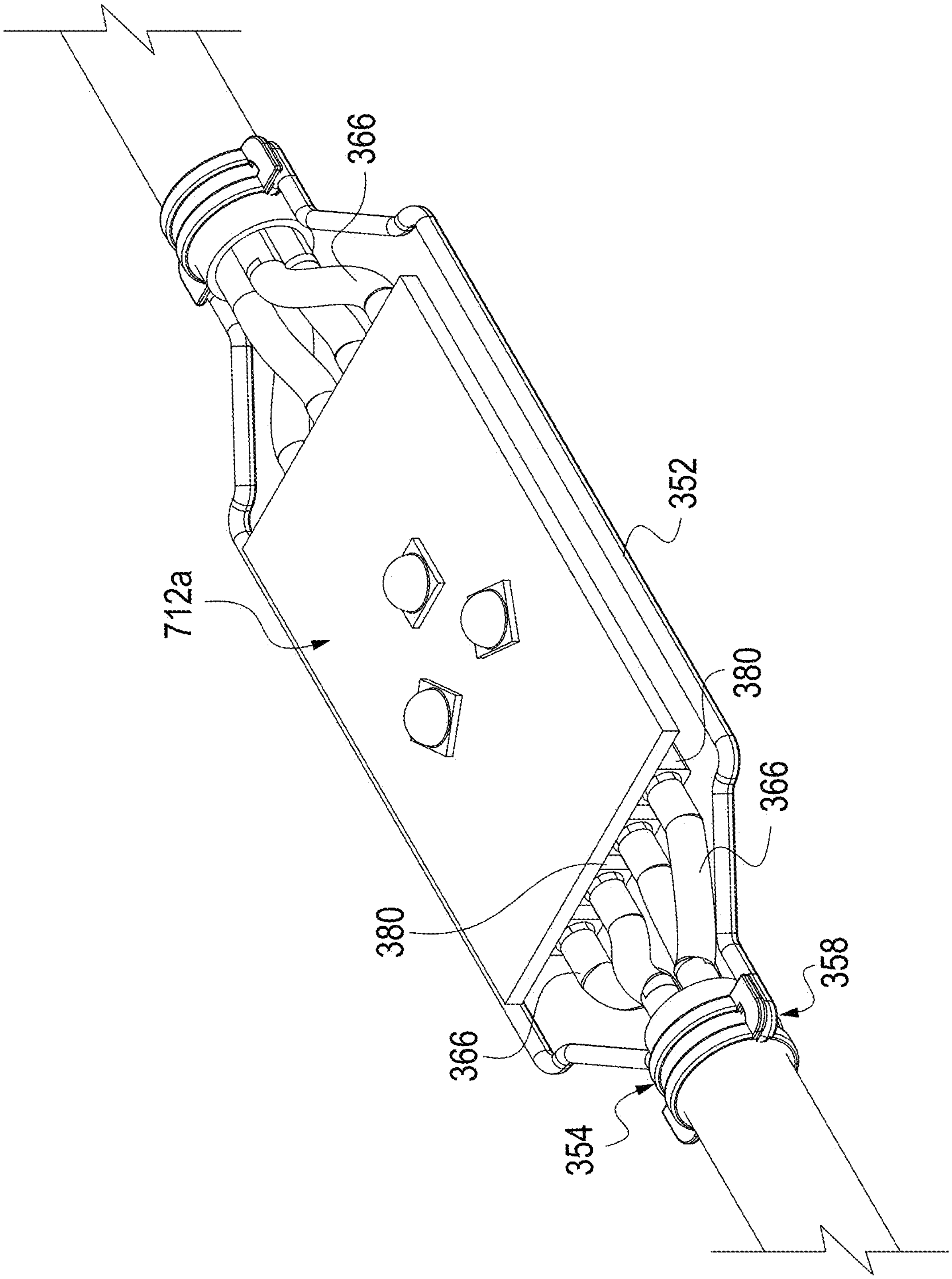
FIG. 41 shows the assembly of FIG. 30 with the overmolding(s), the top housing, and the bottom housing removed, revealing the LEDs on the PCB.

During assembly, the top arcuate cord engaging portion 356 and its grommet 354, and the bottom arcuate engaging portion 360 and its grommet 358 contact each other and the cord 309 to form the seal (see FIGS. 31 and 41). At about the same time, a top strain relief ridge 364 (see FIGS. 31 and 33) that is disposed longitudinally inwardly from the top arcuate cord engaging portion may contact the wires 366, while a bottom strain relief ridge 368 disposed longitudinally inwardly from the bottom arcuate cord engaging portion may also contact the wires 366 to help prevent pullout of the wires from the housing and the PCB.

Figure 32:
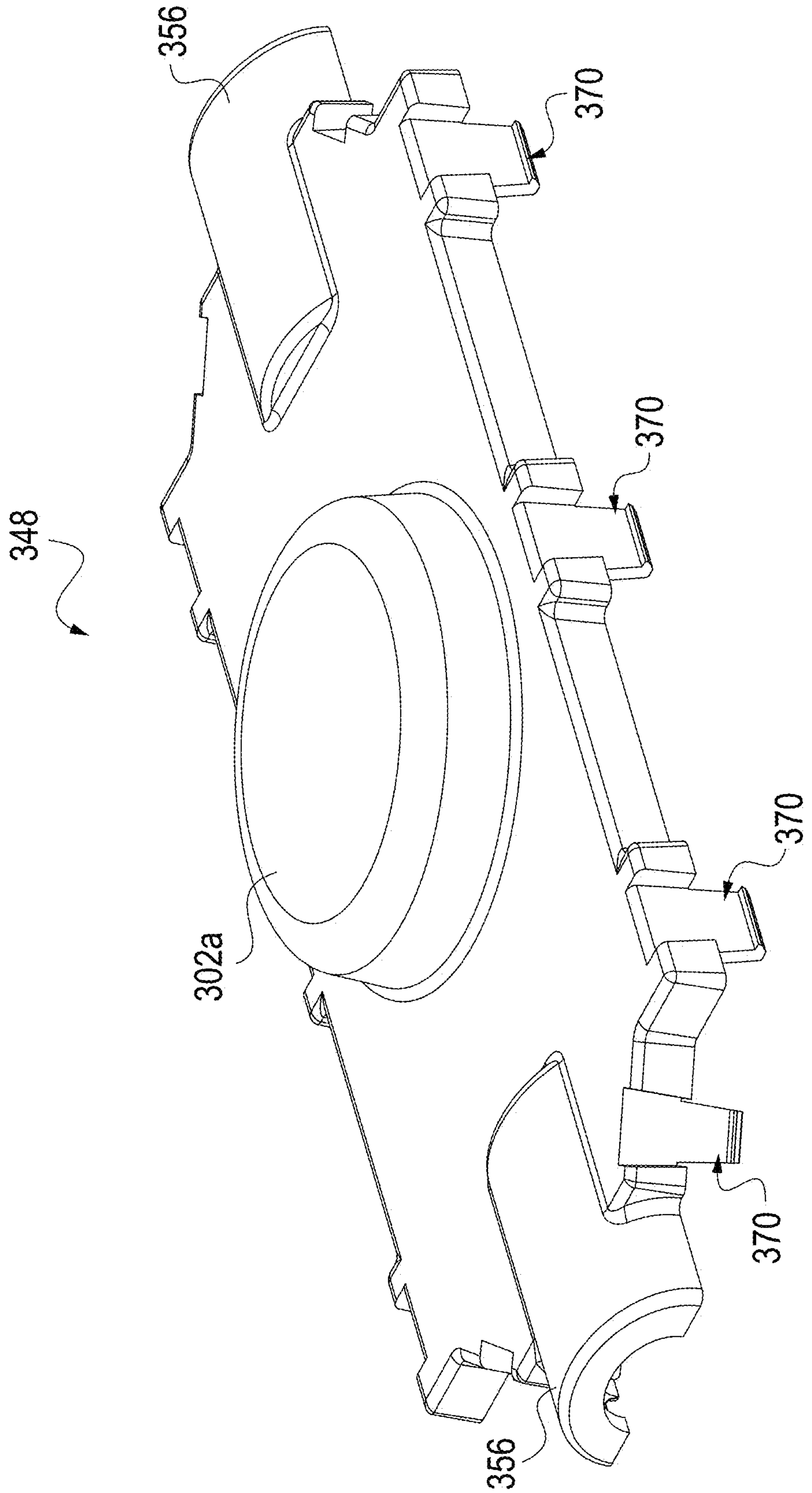
FIG. 32 is a top oriented perspective view of the top housing of the LED module of FIGS. 29 and 30 shown in isolation.
Figure 33:
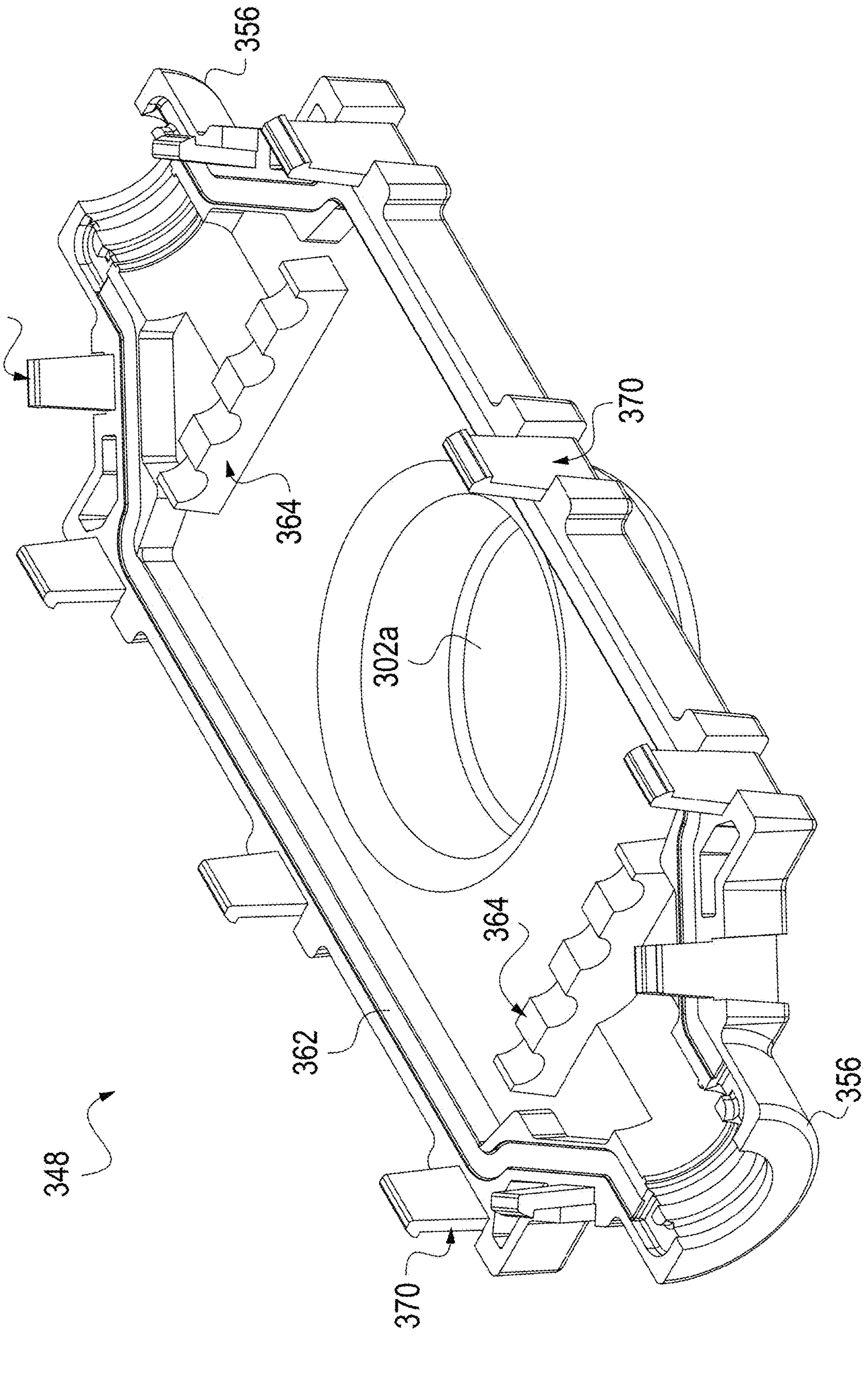
FIG. 33 is a bottom oriented perspective view of the top housing of FIG. 32.
Figure 34:
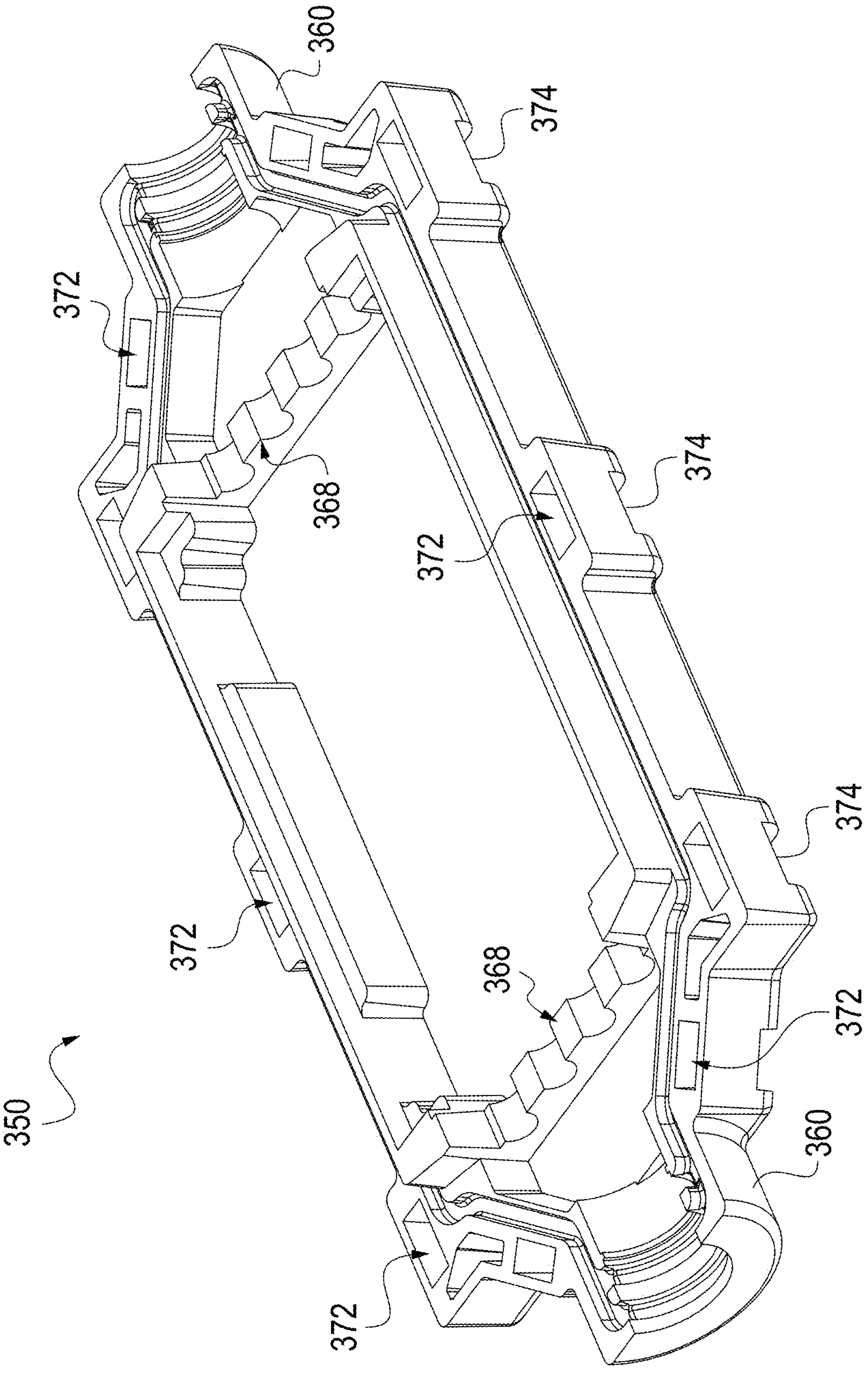
FIG. 34 is a top oriented perspective view of the bottom housing of the LED module of FIGS. 29 and 30 shown in isolation.
Figure 35:
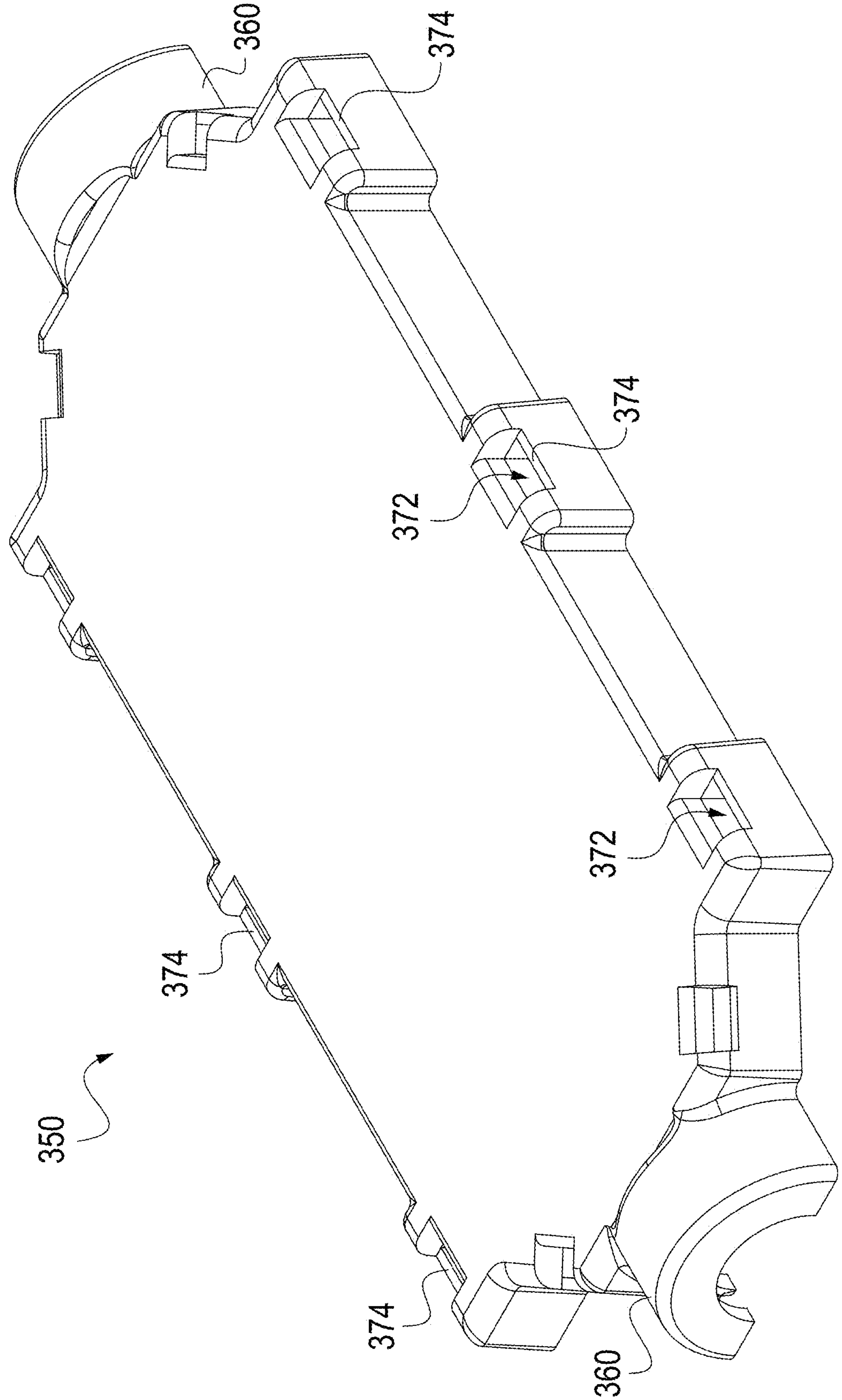
FIG. 35 is a bottom oriented perspective view of the bottom housing of FIG. 34.

As seen in FIGS. 32 and 33, the top housing 348 may include a plurality of downwardly extending snap features (e.g., may take the form of cantilevered snaps 370). As seen in FIGS. 34 and 35, the bottom housing 350 may include a plurality of downwardly extending snap receiving windows 372 and may define a plurality of snap receiving ledges 374 disposed underneath the plurality of downwardly extending snap receiving windows. The snaps engage the ledges to hold the upper and the lower housings together.

Figure 40:
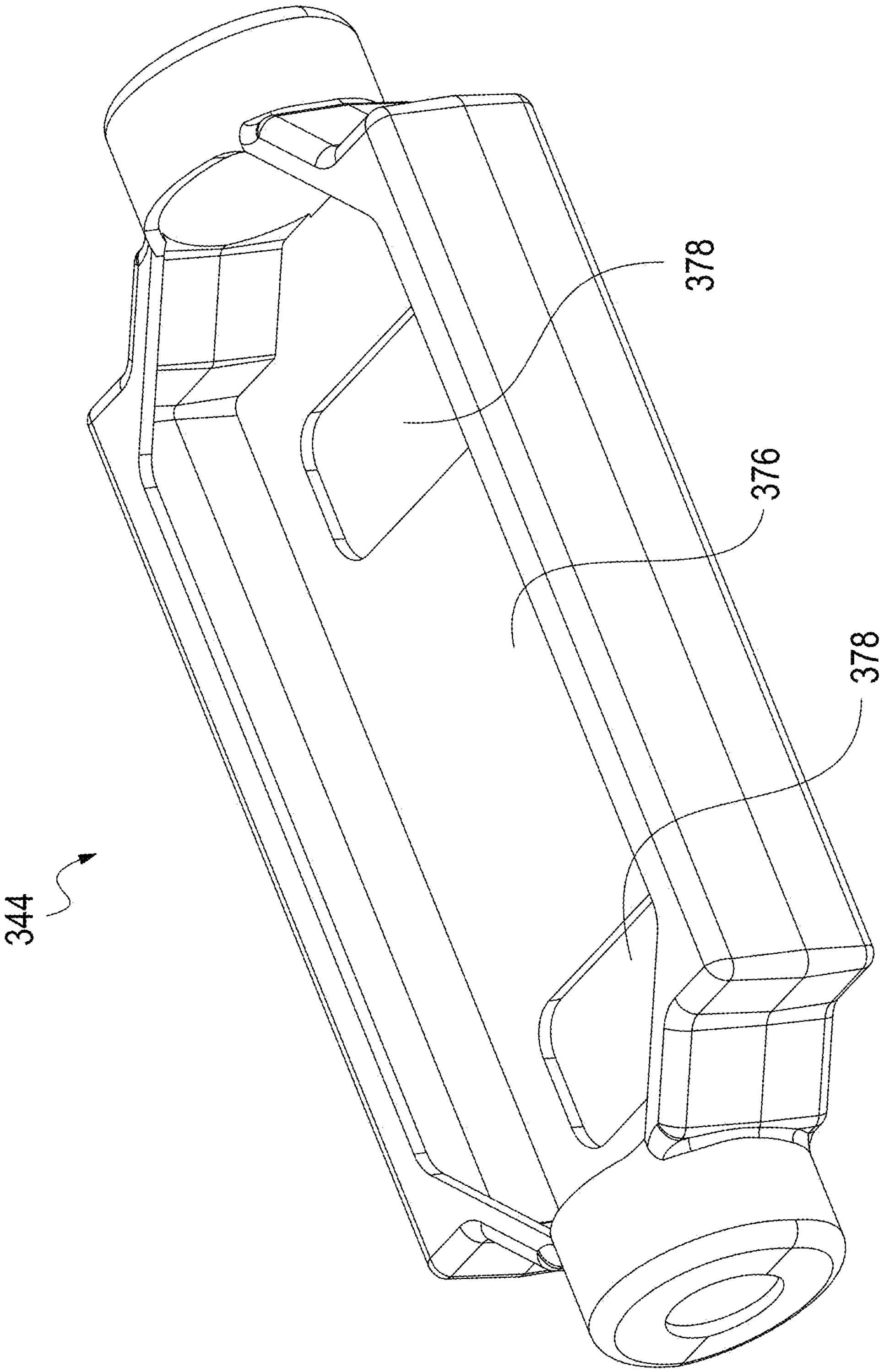
FIG. 40 is a top perspective view of the overmolding(s) applied to the housings of the LED module of FIGS. 29 and 30 shown in isolation.

Turning now to FIG. 40, an overmolding 344 that is at least partially complementarily shaped to the top housing and the bottom housing, defining an opening 376 (see also FIGS. 30 and 31) that is spaced away from the lens 302*a*. In addition, the overmolding defines at least one bottom aperture 378 to allow access to the bottom of the housing.

Figure 42:
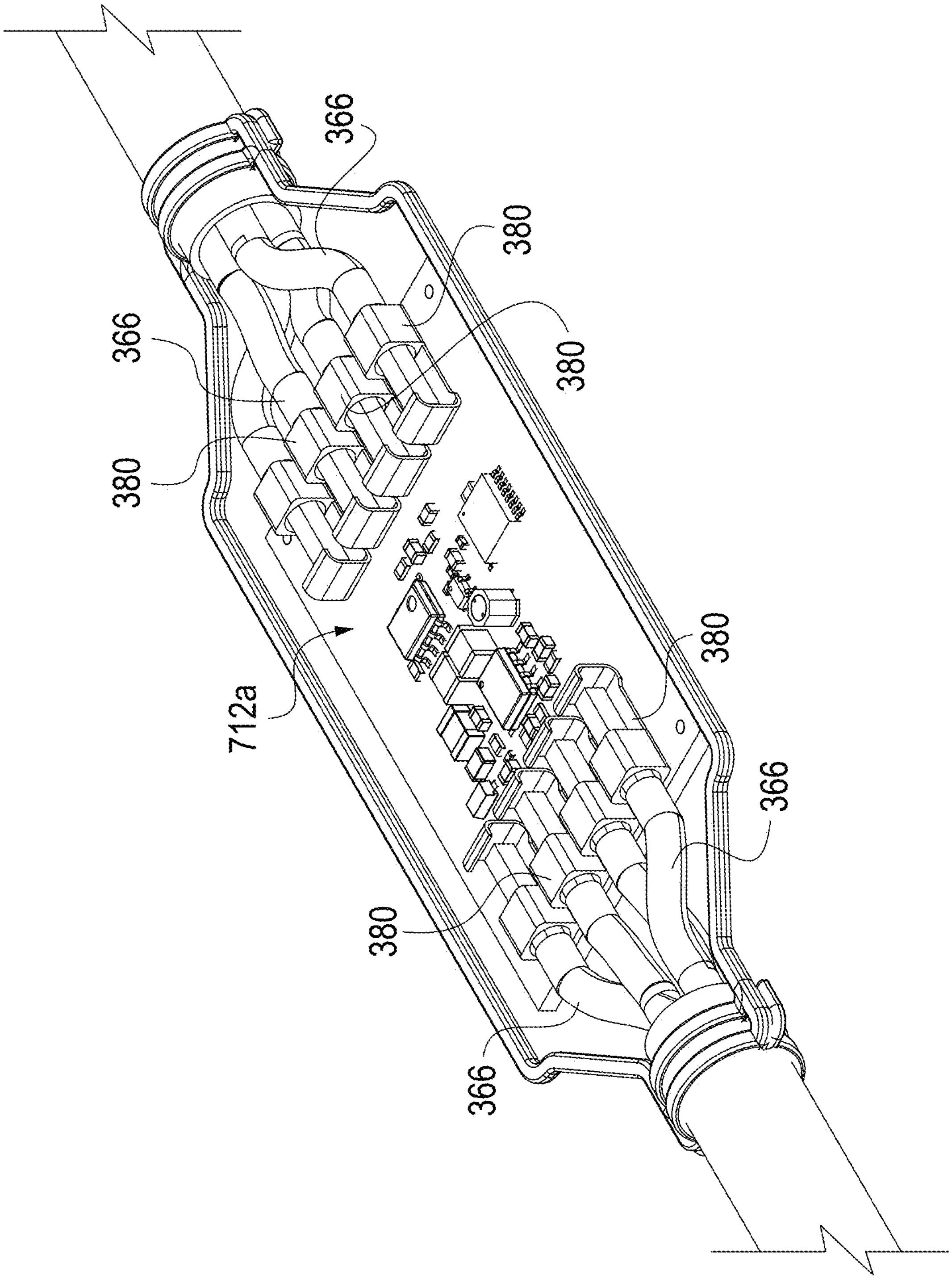
FIG. 42 shows the bottom of the assembly of FIG. 41, revealing the wires of the cords inserted into the push connectors that are in electrical communication with the circuitry on the bottom of the PCB.

Looking at FIGS. 41 and 42, a PCB 712 is also provided with a plurality of LEDs on a first side of the PCB (see FIG. 41), and circuity on a second side of the PCB (see FIG. 42) in a manner similar to what has been previously described herein. However, a plurality of push-on connectors 380 are also provided that are configured to mate with a plurality of wires 366 that extend from the first cord 309*a* to ease assembly and provide for a more robust connection.

Figure 36:
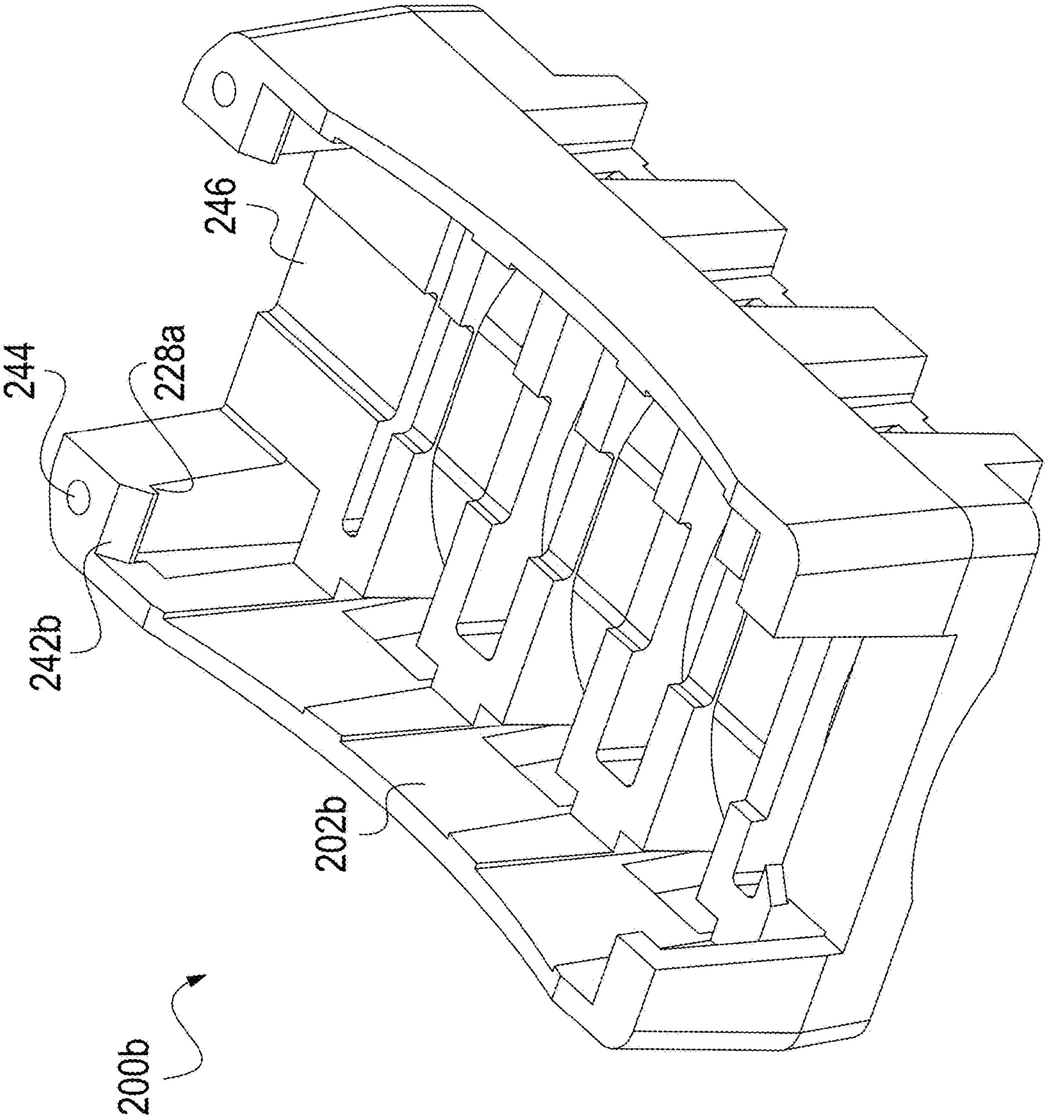
FIG. 36 is a top oriented perspective view of the bracket of FIG. 29 shown in isolation.
Figure 37:
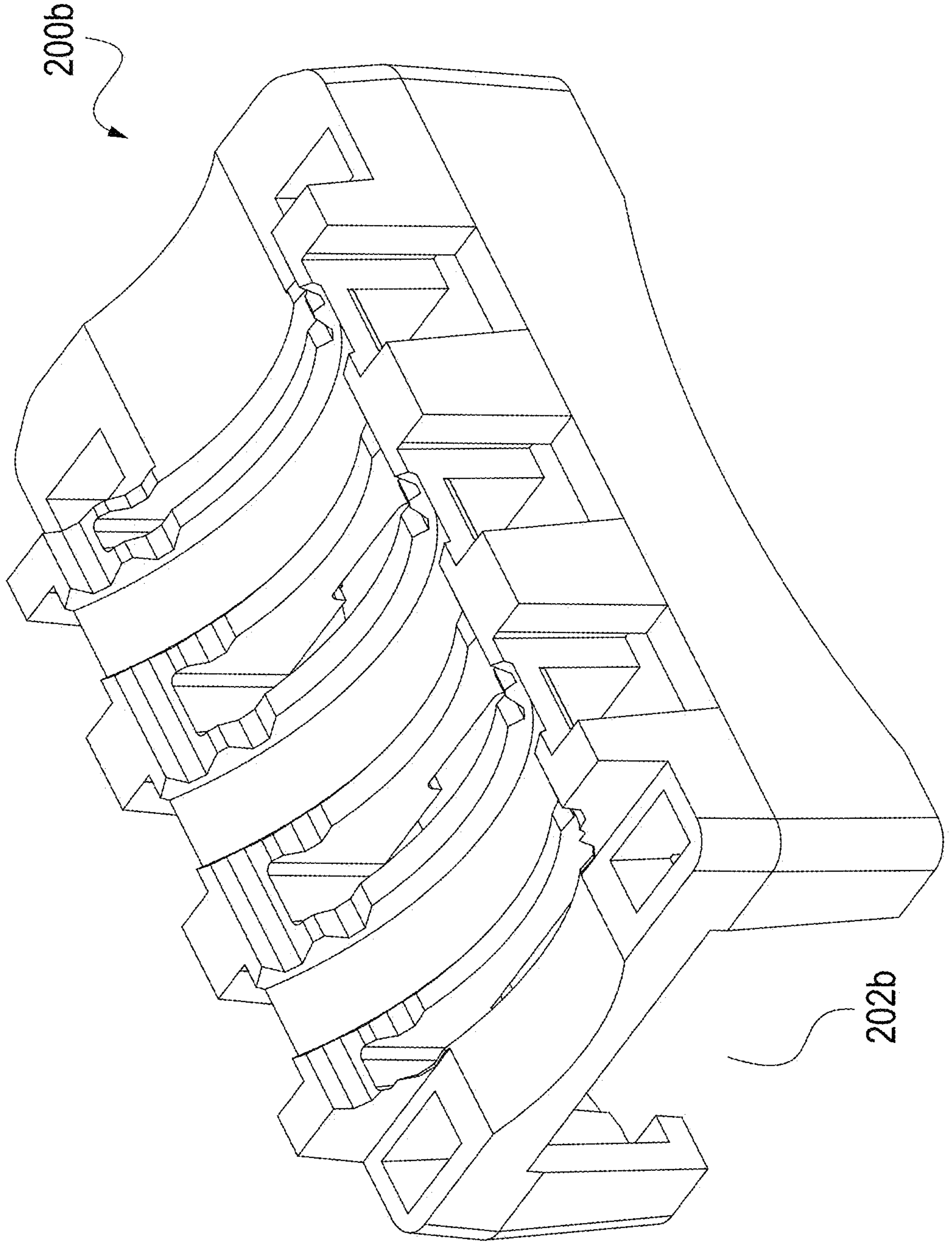
FIG. 37 is a bottom oriented perspective view of the bracket of FIG. 36.

In FIGS. 36 and 37, it can be seen that the bracket 200*b* that is larger than that previously described herein is employed that has a first fastener receiving aperture at the first corner instead of using a PEM insert The bracket 200*b* the rear wall defines a pry slot 246 that is in communication with the light module receiving aperture 202*b*. Furthermore, its front face defines a front lead-in surface 242*b* disposed above the first undercut 228*a* to help compress the overmolding during insertion of the light module into the bracket.

Turning now to FIGS. 43 thru 52, another embodiment of an LED module 900 and associated method of assembly will now be discussed. The construction of the PCB 712 and its connection to the wires are similar or identical to that just described with respect to FIGS. 29 thru 42. Moreover, this LED module may be used with the bracket(s), keeper(s), and visor(s), etc. as well as various methods as previously described herein.

Figure 43:
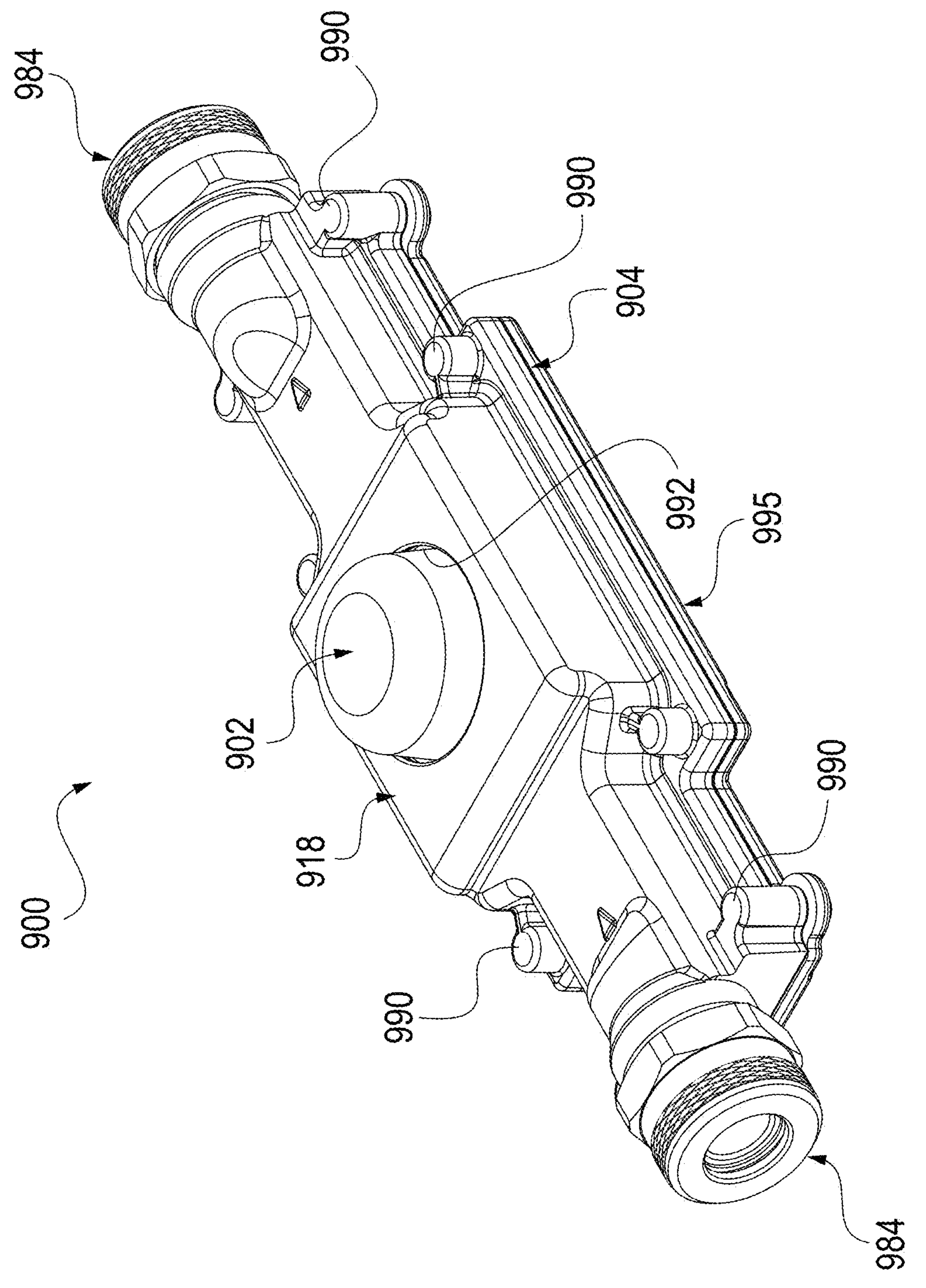
FIG. 43 is a perspective view of an embodiment of an LED module (may also be referred to as a pixel) employing a split aluminum housing and a cradle configured to retain a PCB and a lens.
Figure 44:
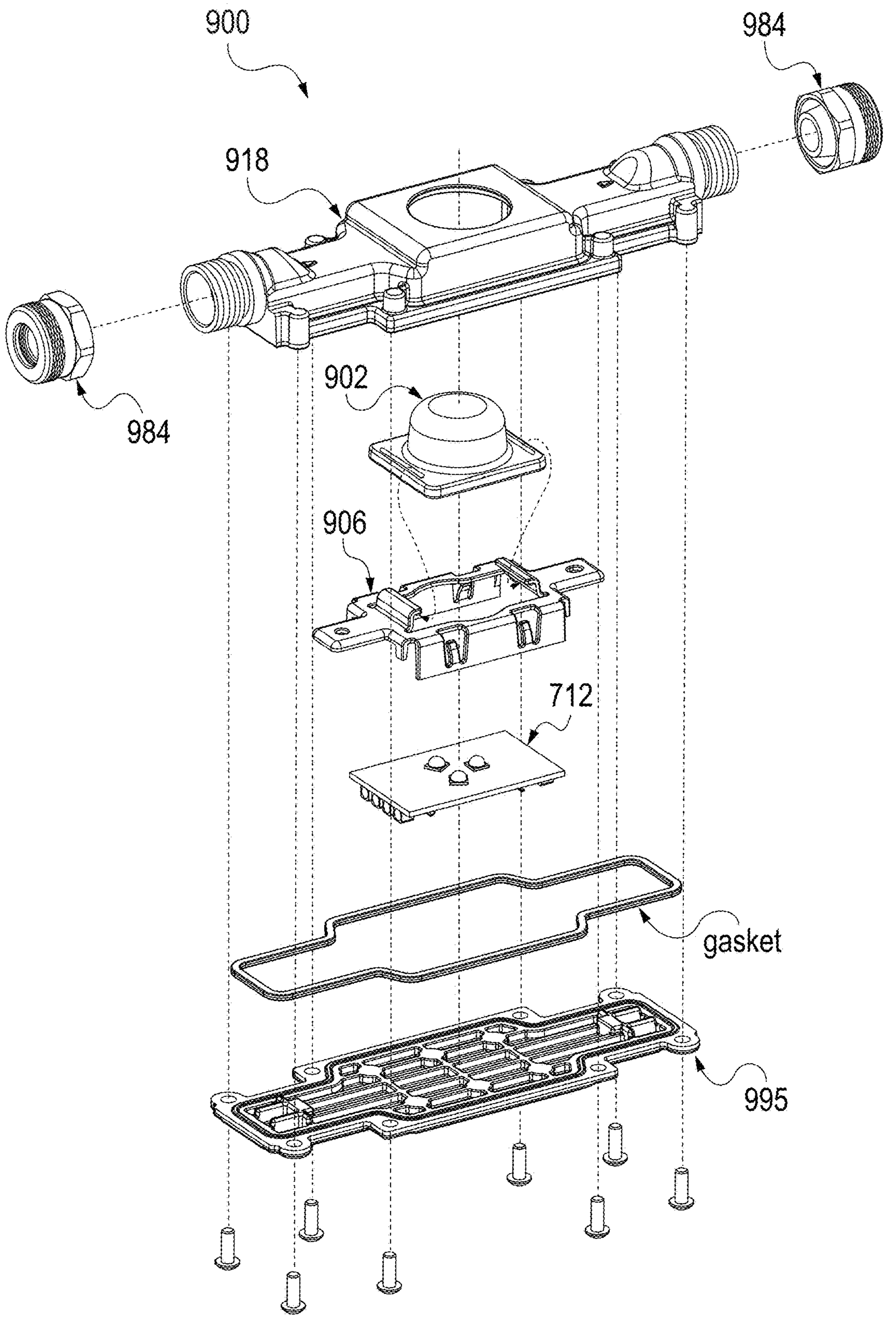
FIG. 44 is an exploded assembly view of the LED module of FIG. 43.

Starting with FIGS. 43 and 44, this LED module 900 may comprise a lens 902, a split housing 904, and a cradle 906 that is configured to retain the lens 902 (or lens 903) and the PCB 712. More specifically as best seen in FIGS. 49 and 50, the cradle 906 may define a central opening 907 for allowing the light from the LEDs to reach the lens 902 (or lens 903), and may include a plurality of upwardly extending flanges 908 for retaining the lens 902 (or lens 903), a plurality downwardly extending flanges 910 for retaining the PCB 712, and a pair of mounting ears 912 for orienting these components in the split housing 904.

As best understood by referring to FIGS. 44, 45, 49, 50 and 51, each of the pair of mounting cars 912 of the cradle 906 are positioned adjacent to the central opening 907 and define a cradle locating feature 914 such as a hole 916 (or may be a male feature such as a boss) that is configured to mate with a member of the split housing 904. In this case, the split housing 904 includes a top housing member 918 that includes a boss 920 that is configured to pass through the hole 916. Of course, these locating features could be reversed.

Figure 49:
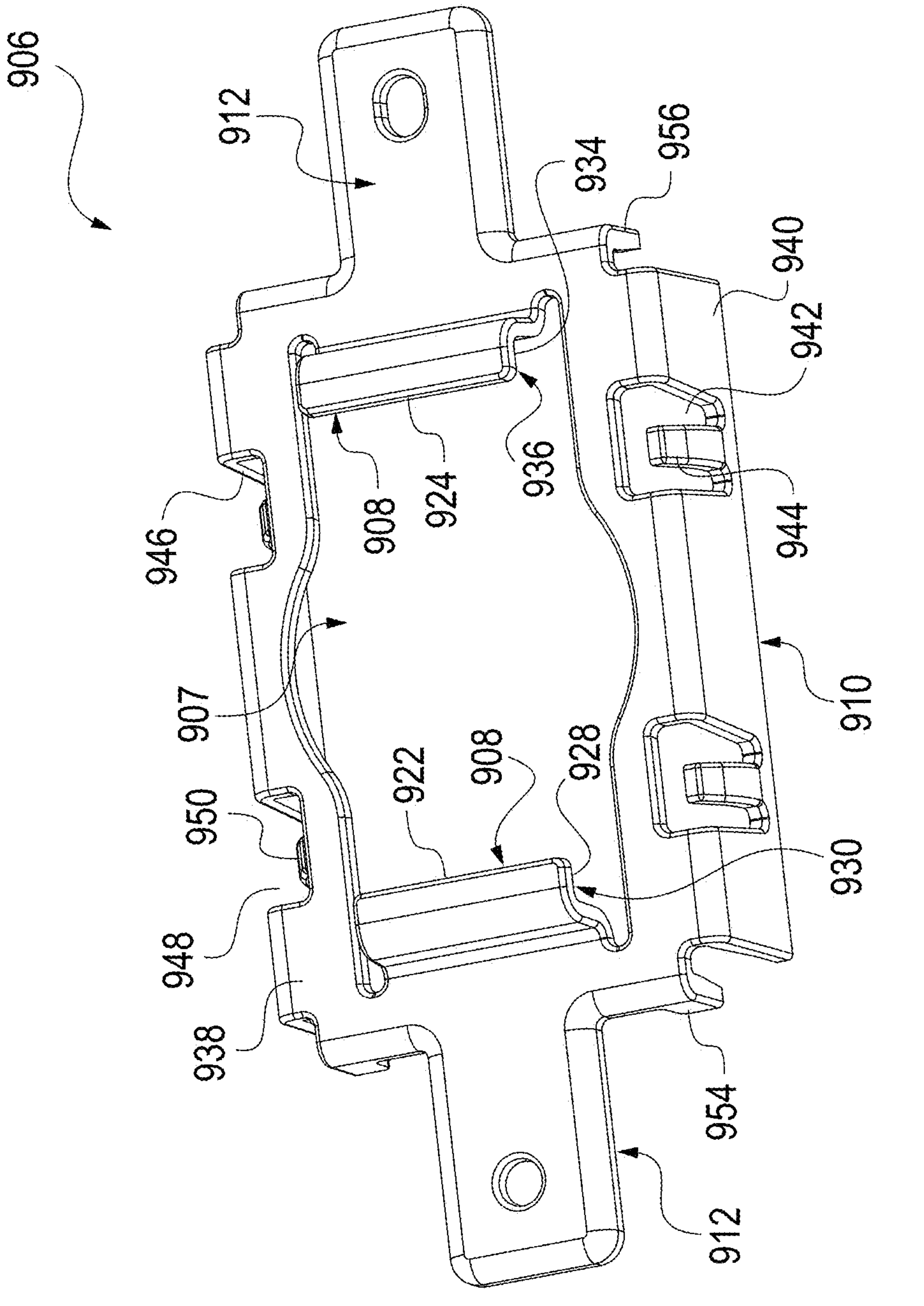
FIG. 49 is a top oriented perspective view of the cradle of FIGS. 43 and 44 shown in isolation.
Figure 50:
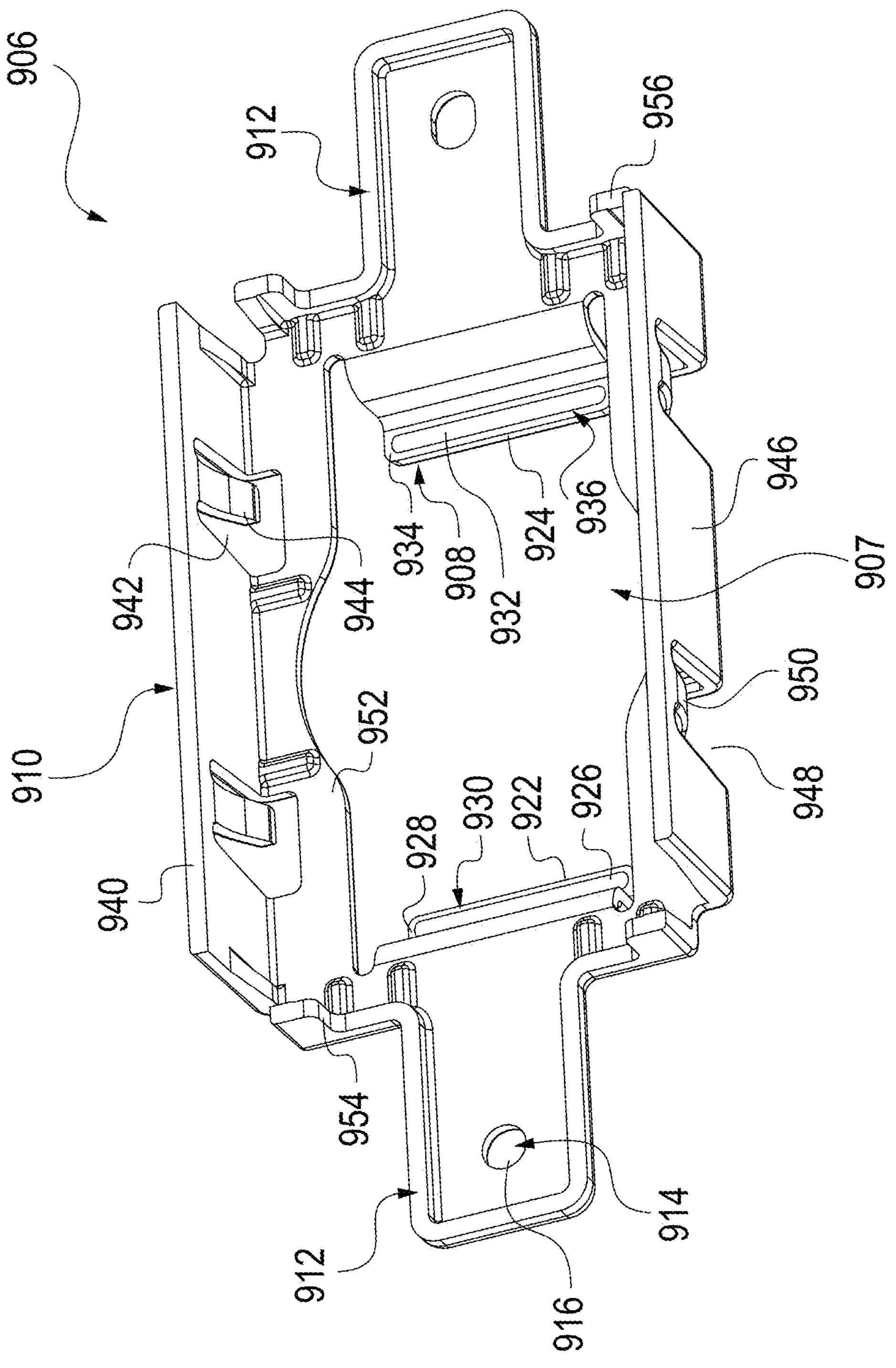
FIG. 50 is a bottom oriented perspective view of the cradle of FIG. 49.
Figure 51:
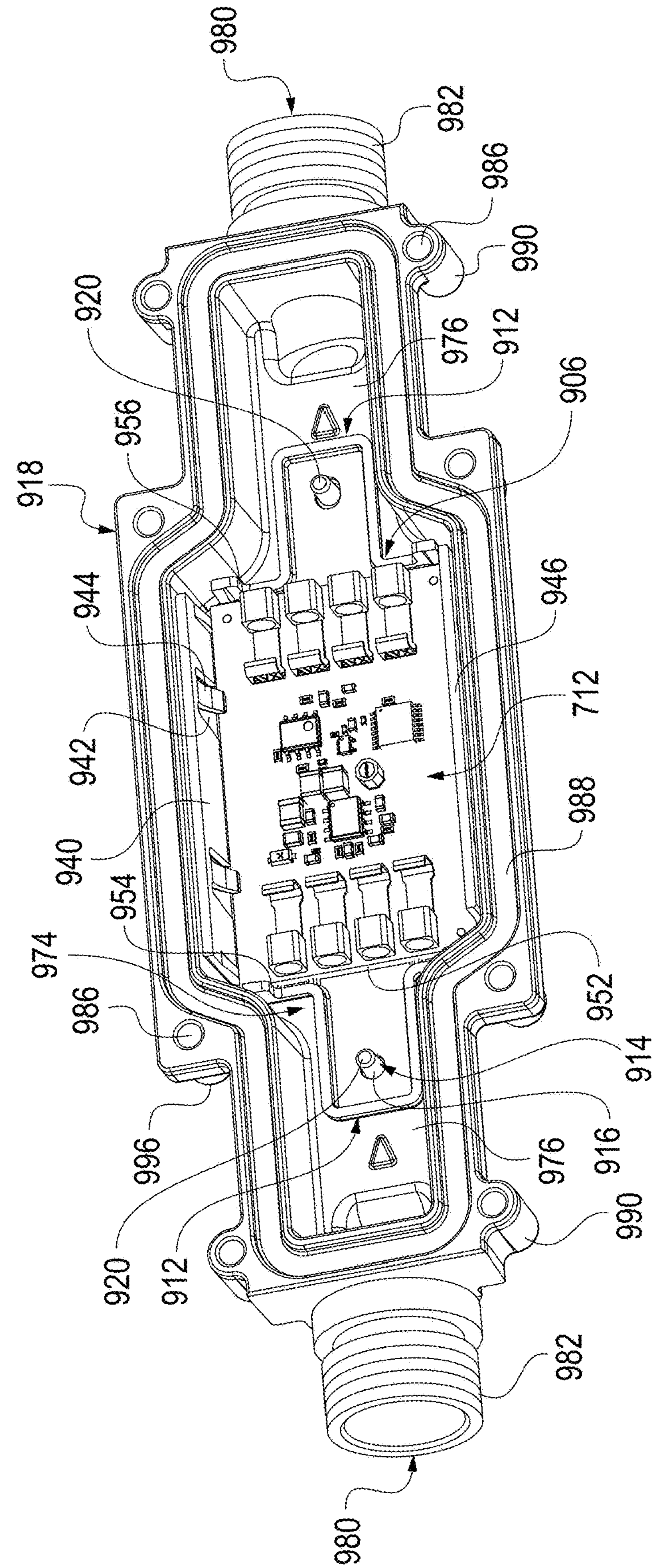
FIG. 51 is a bottom oriented perspective view of the cradle, PCB, and top housing member of FIG. 44 assembled together.
Figure 52:
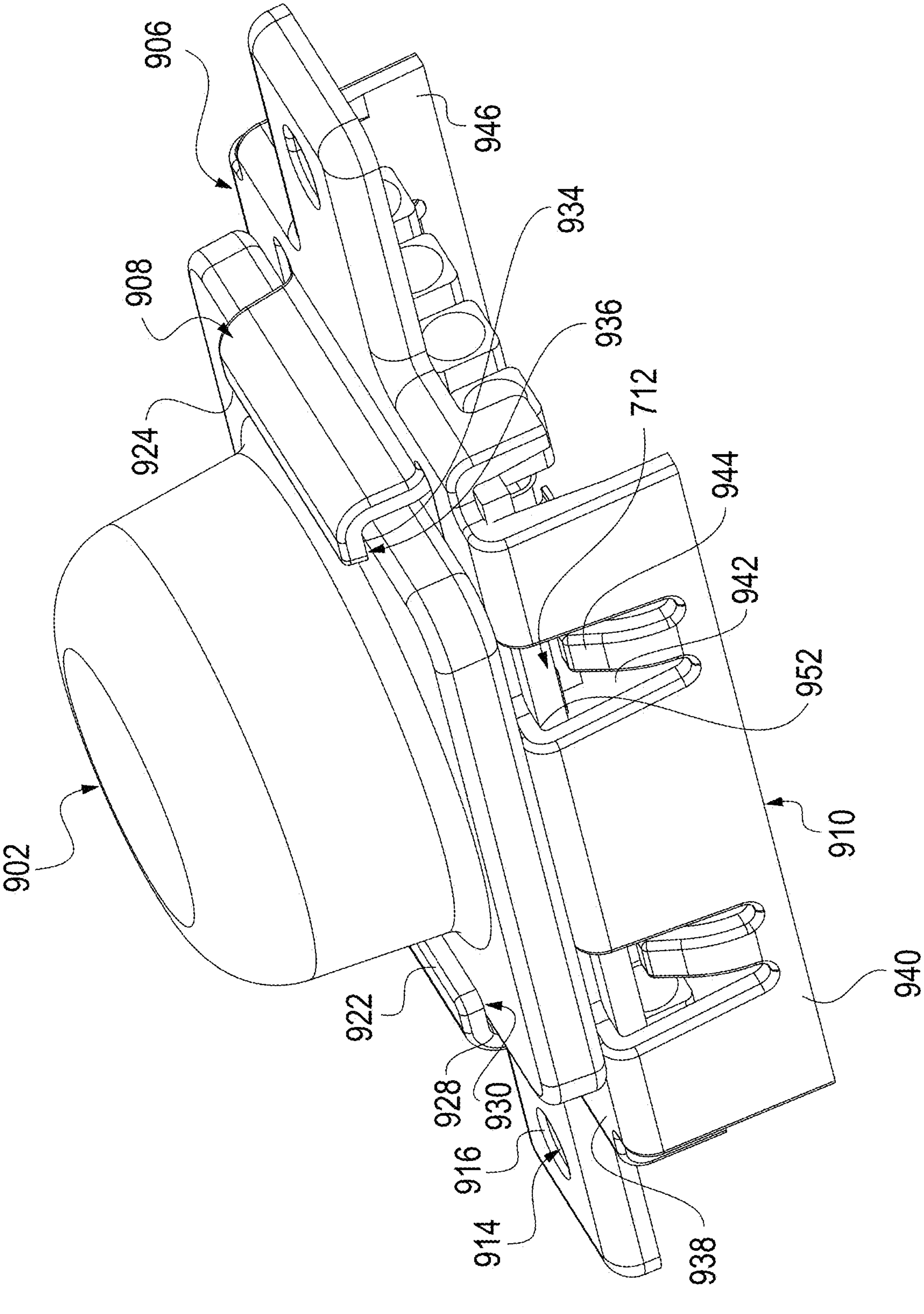
FIG. 52 is a top oriented perspective view of the cradle, PCB, and a lens of FIG. 44 assembled together.
Figure 53:
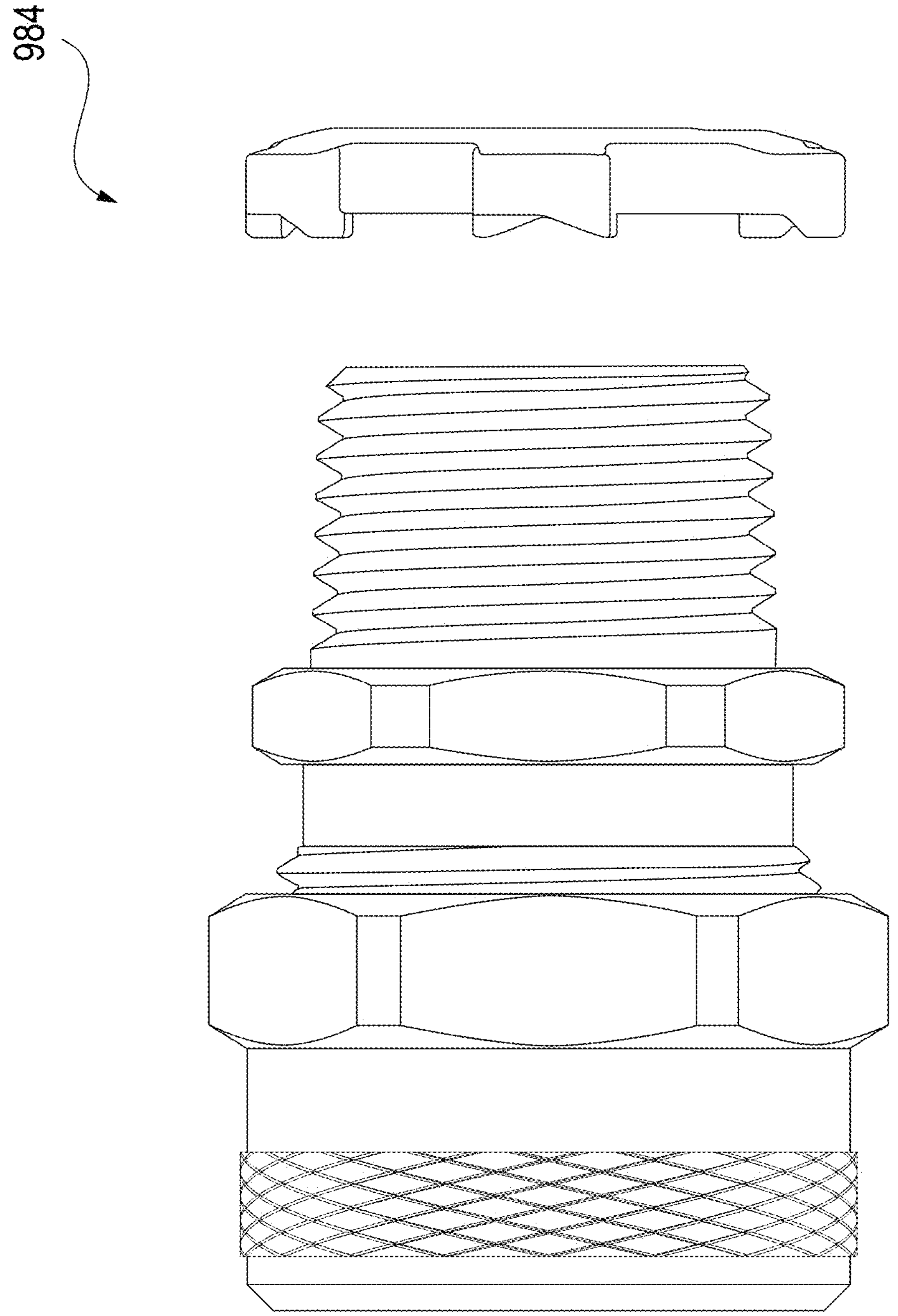
FIG. 53 is a front view of a cord grip that can provide a seal between a cable and a threaded end of the housing of the LED module of FIGS. 43 and 44.

Focusing on FIGS. 49 and 50, the plurality of upwardly extending flanges 908 may include a first top flange 922 extending upwardly from adjacent to the central opening 907 and a second top flange 924 extending upwardly from adjacent to the central opening 907. The first top flange 922 may include a first protrusion 926 on a first bottom surface 928 of a first lens retaining ledge 930 while the second top flange 924 may include a second protrusion 932 on a second bottom surface 934 of a second lens retaining ledge 936 that are configured to engage the lens for holding the lens in place as will be discussed in further detail later herein. These protrusions may be omitted in other embodiments of the present disclosure. The cradle 906 may further define a top lens support surface 938 that at least partially defines the central opening 907.

In addition, the plurality of downwardly extending flanges 910 may include a first side flange 940 that defines a first side opening 942 and a first PCB retaining finger 944 and a second side flange 946 that defines a second side opening 948 and a second PCB retaining finger 950. Four such fingers may be provided but not necessarily so. The cradle 906 may further define a bottom PCB stop surface 952 disposed above the first PCB retaining finger 944 and the second PCB retaining finger 950. This construction allows the PCB 712 to be trapped between the retaining fingers and the bottom PCB stop surface 952 (see FIGS. 51 and 52).

Moreover, the plurality of downwardly extending flanges 910 may include a first flange portion 954 extending from one of the pair of mounting cars 912 and a second flange portion 956 extending from the other of the pair of mounting ears 912. The various downwardly extending flanges may provide separation between the PCB and the walls of the split housing that may be made from a metallic material (e.g., cast aluminum) to help prevent short circuits, arcing, and the like. The cradle may be plastic injection molded from Polycarbonate material. Other materials and manufacturing processes may be employed in other embodiments of the present disclosure.

Figure 47:
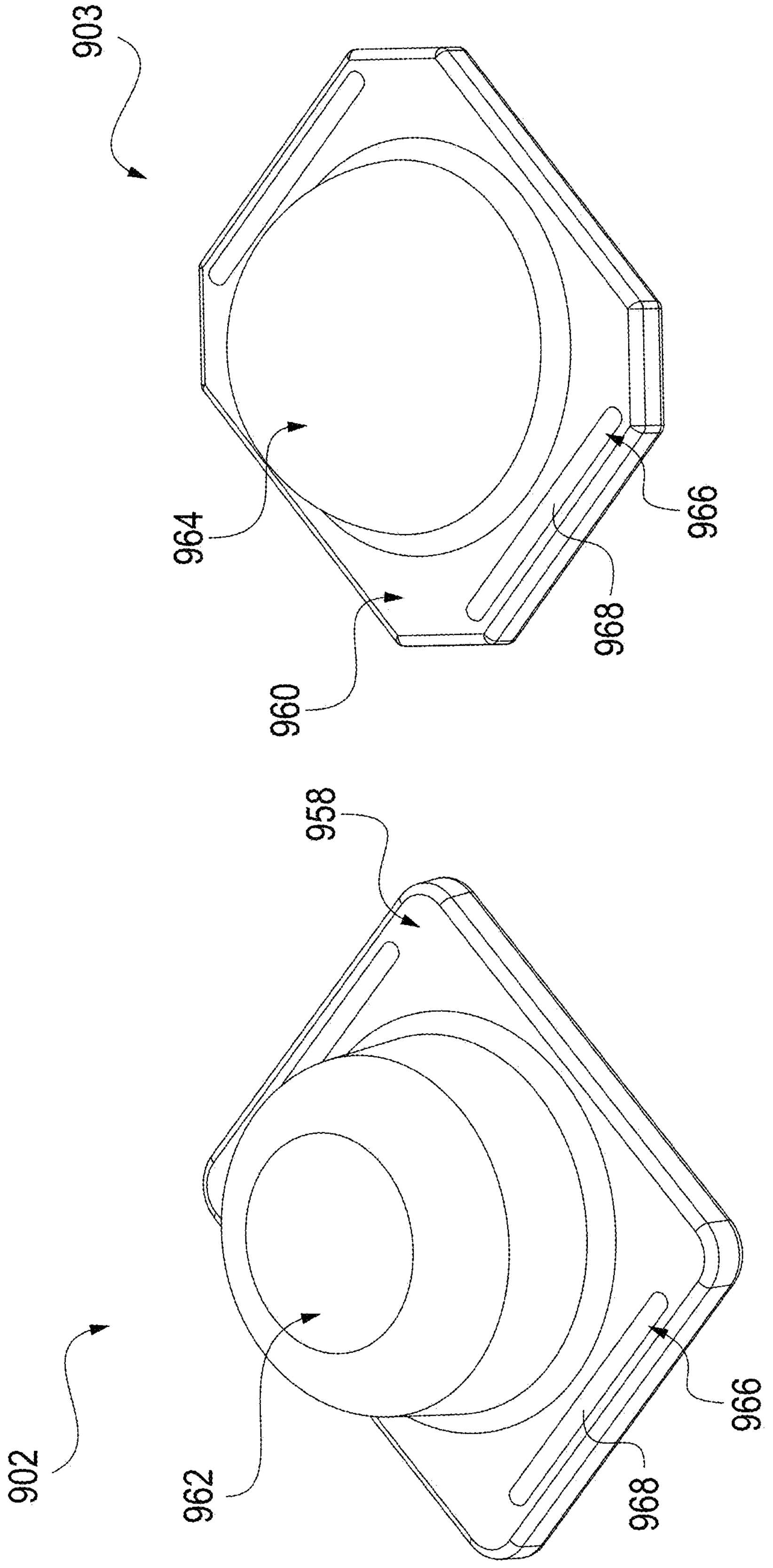
FIG. 47 is a top oriented perspective view of two embodiments of a lens that can be used with the LED module of FIGS. 43 and 44 shown in isolation. One lens has a cylindrical configuration while the other has a spherical configuration.
Figure 48:
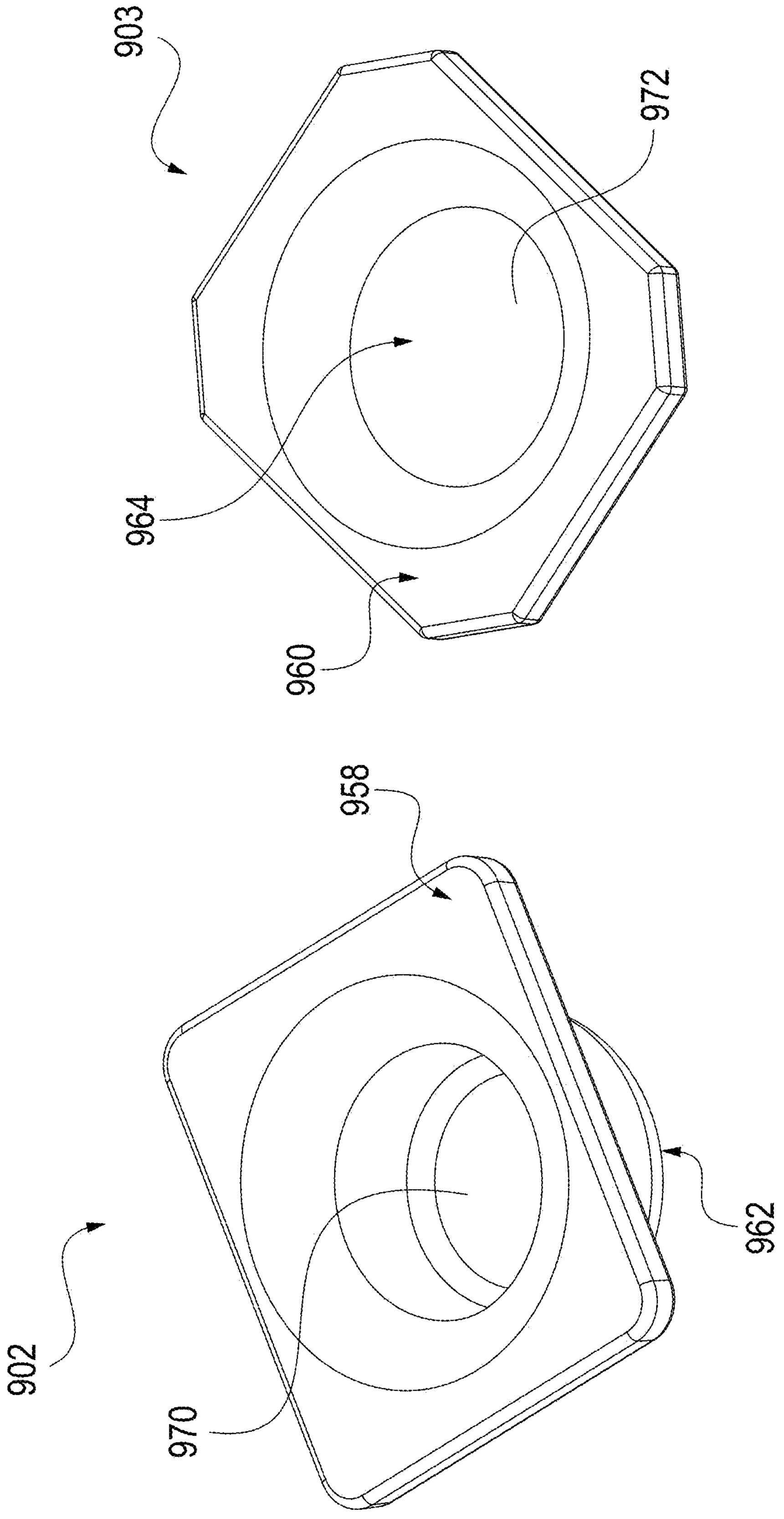
FIG. 48 is a bottom oriented perspective view of the lenses of FIG. 47.

Looking at FIGS. 47 and 48, the lens 902 or lens 903 may include a flat mounting portion 958 or flat mounting portion 960 as well as a light emitting portion 962 or light emitting portion 964. The flat mounting portion 958 or the flat mounting portion 960 may include a lens locating feature 966 that is configured to engage one of the pair of the upwardly extending flanges 908. The lens locating feature 966 may take the form of a depression 968 that is configured to mate with the protrusions (see 926 and 932 in FIG. 50) of the upwardly extending flanges 908 of the cradle 906 to help retain the lens in the proper position. These features may be omitted in other embodiments of the present disclosure. Also, the light emitting portion 964 may have a hemispherical shape or the light emitting portion 962 may have a cylindrical shape. Both lenses may also define an LED light receiving cavity 970 or an LED light receiving cavity 972 on their bottom surfaces.

Figure 45:
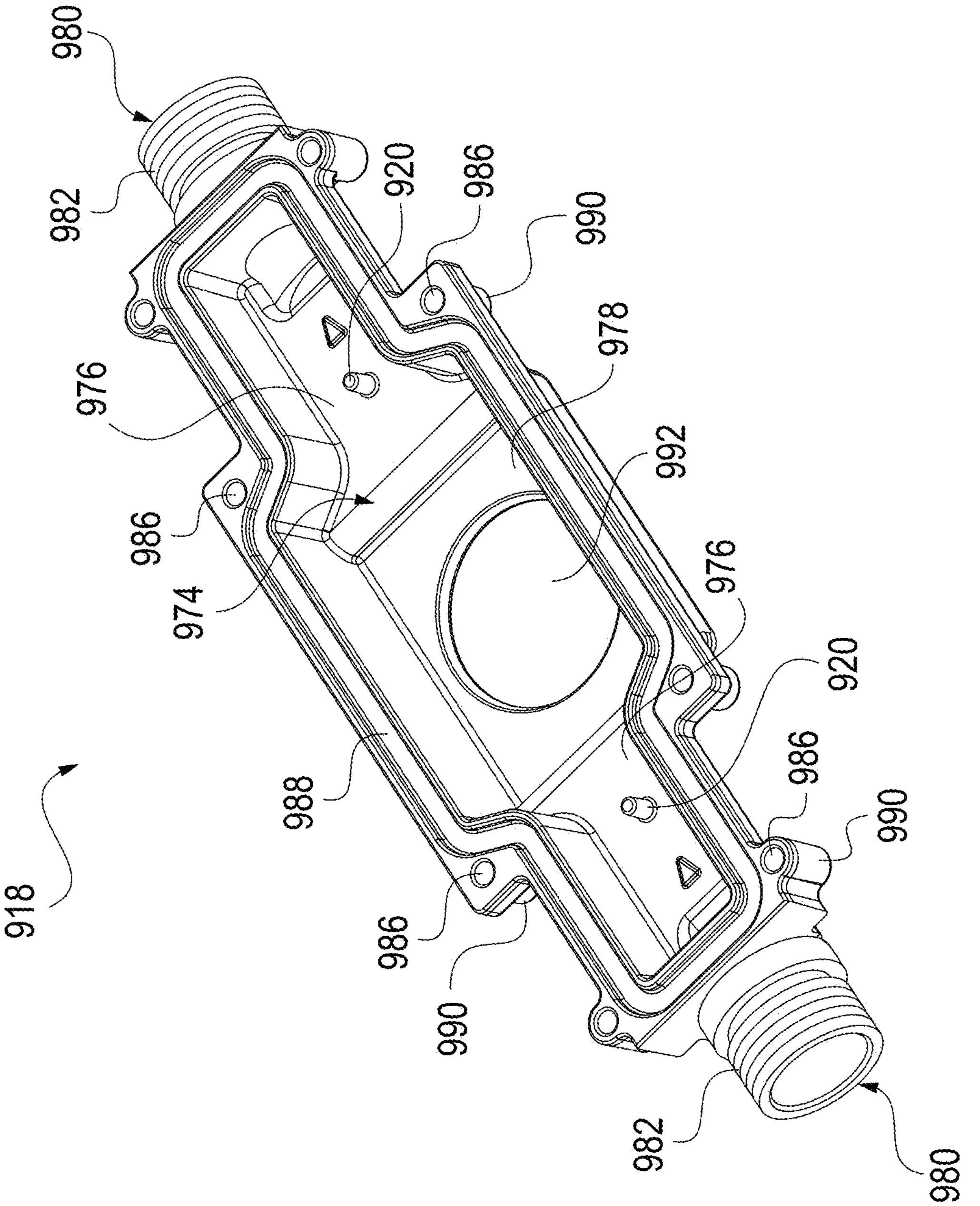
FIG. 45 is a bottom oriented perspective view of the top housing member of the split aluminum housing of FIGS. 43 and 44 shown in isolation.

Looking again at FIG. 45, the top housing member 918 may define a stepped cavity 974 including a pair of shallow portions 976 and a deep portion 978 disposed between the pair of shallow portions 976. The shallow portions 976 may be configured to receive the pair of mounting ears 912 of the cradle 906 (see FIG. 51), and the deeper portion 978 may be configured to receive the lens 902 (or lens 903 depending on which type of configuration of lens is desired) and the upwardly extending flanges 908 of the cradle 906.

Furthermore, the top housing member 918 may include a pair of cable receiving tube portions 980 that are in communication with the shallow portions 976 of the stepped cavity 974 of the top housing member 918 that allow the cable and its wires to pass through to be connected to the PCB 712. The pair of cable receiving tube portions 980 may define threads 982 that are configured to connect to a cord grip 984 (see FIG. 43) for providing a seal between the cable and the housing to help prevent the ingress of water and debris, etc. Still looking at FIG. 45, a plurality of fastener receiving apertures 986 may be provided as well as a top seal interface in form of a seal receiving groove 988. The seal may be formed in the groove using an insert molding process or placed therein manually during assembly.

The plurality of fastener receiving apertures 986 may be defined by a plurality of fastener defining bosses 990. The top housing member 918 may also define a lens receiving thru aperture 992 and a seal ring forming groove that surrounds this aperture so that a sealant such as silicone may fill it and create a seal between the lens and the top housing member to help prevent the ingress of water and debris, etc. This groove may be omitted in other embodiments of the present disclosure.

Figure 46:
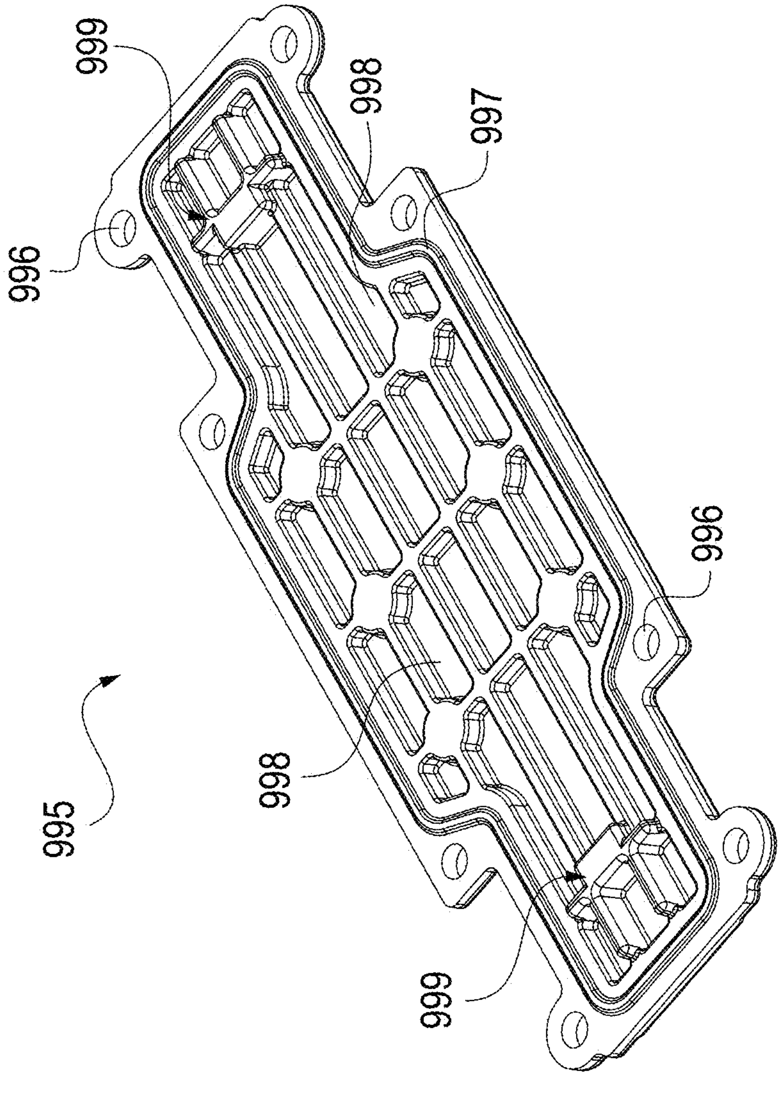
FIG. 46 is a top oriented perspective view of the bottom housing member of FIG. 45.

In FIG. 46, it can be seen that the bottom housing member 995 defines a plurality of bottom fastener receiving apertures 996, a bottom seal interface in the form of a seal engaging bead 997, and a plurality of ribs forming a series of core out cavities 998. Also, a pair of alignment projections 999 are provided to help the bottom and top housing members align with each other during assembly by fitting within the stepped cavity of the top housing member. The bead and the seal may be switched between the top housing member and the bottom housing member in other embodiments of the present disclosure.

Figure 54:
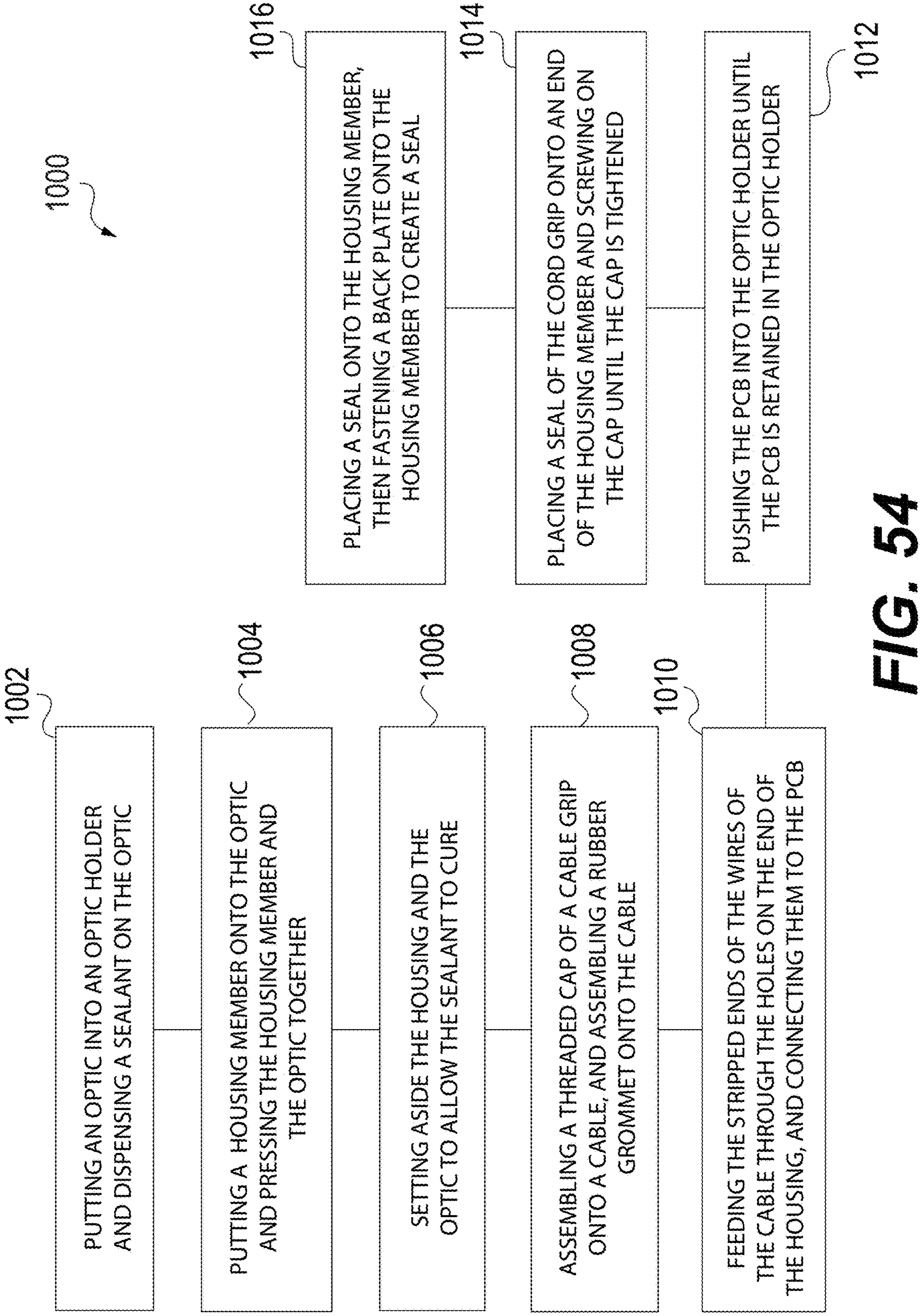
FIG. 54 contains a flowchart illustrating a method of assembling the LED module of FIGS. 43 and 44.

FIG. 54 depicts a method 1000 for assembling an LED module such as just described according to an embodiment of the present disclosure.

In some cases, the method 1000 may involve putting an optic (e.g., a lens) into an optic holder (e.g., a cradle) and dispensing a sealant (e.g., silicone) on the optic (see 1002) to create a seal between the optic and the housing. This seal may be formed by putting a housing member onto the optic and pressing the housing member and the optic together (see 1004). Then, the housing and the optic may be set aside to allow the sealant to cure (see 1006).

The threaded cap of a cable grip may be assembled onto the cable, then a washer may be placed onto the cable, and then the rubber grommet may be assembled onto the cable (see 1008). This may be repeated for the other cable.

The method may further include feeding the stripped ends of the wires through the holes on the ends of the housing, and connecting them to the PCB (see 1010). After, all the wires have been connected to each side of PCB, then the PCB may be pushed down into the optic holder until the PCB is retained in the optic holder (see 1012). For example, the PCB may be trapped under the fingers of the cradle.

A seal (e.g., a rubber gasket) of the cord grip may be placed onto the ends of the housing member and screw on the cap until the cap is tightened (see 1014). Also, a seal (e.g., a gasket) may be placed onto the housing member and a back plate may be fastened onto the housing member to create a seal (see 1016).

Wires may be attached to the PCB before the PCB is attached to the cradle in other embodiments of the present disclosure. A seal may be formed between the cables and the housing by using commercially available cord grips as alluded to earlier herein. For example, an RSR-106 core grip sold by Remke Industries may be employed, etc. It is further contemplated that any of the RSR-100 series core grips may be used since they accommodate a wide range of sealing diameters (e.g., from about 0.125 of an inch to 0.625 of an inch).

Various examples of the disclosure have been described. Any combination of the described systems, operations, or functions is contemplated. These and other examples are within the scope of the following claims.

What is claimed is:

1. An LED module comprising:

a PCB provided with one or more LEDs;

a lens;

a split housing; and a cradle;

wherein the cradle defines a central opening, and includes a plurality of upwardly extending flanges retaining the lens, a plurality of downwardly extending flanges retaining the PCB, and a pair of mounting ears orienting the cradle inside the split housing.

2. The LED module of claim 1, wherein each of the pair of mounting ears of the cradle are adjacent to the central opening and define a cradle locating feature.

3. The LED module of claim 2, wherein the cradle locating feature is a hole and the split housing includes a top housing member that includes a boss that is configured to pass through the hole.

4. The LED module of claim 1, wherein the plurality of upwardly extending flanges includes a first top flange extending upwardly from adjacent to the central opening and the second top flange extending upwardly from adjacent to the central opening.

5. The LED module of claim 4, wherein the cradle further defines a top lens support surface.

6. The LED module of claim 1, wherein the plurality of downwardly extending flanges includes a first side flange that defines a first side opening and a first PCB retaining finger and a second side flange that defines a second side opening and a second PCB retaining finger.

7. The LED module of claim 6, wherein the cradle further defines a bottom PCB stop surface disposed above the first PCB retaining finger and the second PCB retaining finger.

8. The LED module of claim 1, wherein the plurality of downwardly extending flanges includes a first flange portion extending from one of the pair of mounting ears and a second flange portion extending from the other of the pair of mounting ears.

9. The LED module of claim 1, wherein the lens includes a flat mounting portion and a light emitting portion.

10. The LED module of claim 9, wherein the light emitting portion has an at least partially hemispherical configuration or an at least partially cylindrical configuration.

11. The LED module of claim 1, further comprising a pair of cord grips attached to the split housing of the LED module.

12. The LED module of claim 9, wherein the light emitting portion defines a LED light receiving cavity.

13. The LED module of claim 1, wherein the split housing includes a top housing member that defines a stepped cavity including a pair of shallow portions and a deep portion disposed between the pair of shallow portions.

14. The LED module of claim 13, wherein the shallow portions are configured to receive the pair of mounting ears of the cradle and the deeper portion is configured to receive the lens and the upwardly extending flanges of the cradle.

15. The LED module of claim 13, wherein the top housing member includes a pair of cable receiving tube portions that are in communication with the shallow portions of the top housing member.

16. The LED module of claim 13, wherein the top housing further comprises a plurality of fastener receiving apertures, and a top seal interface.

17. The LED module of claim 16, wherein the plurality of fastener receiving apertures is defined by a plurality of fastener defining bosses, and the top seal interface is a seal receiving groove.

18. The LED module of claim 13, wherein the top housing member defines a lens receiving thru aperture and a seal ring forming groove.

19. The LED module of claim 1, wherein the split housing includes a bottom housing member defines a plurality of bottom fastener receiving apertures, a bottom seal interface, and a plurality of ribs forming a series of core out cavities.

20. The LED module of claim 19, further comprising a pair of alignment projections, and wherein the bottom seal interface is a seal engaging bead.

21. The LED module of claim 15, wherein the pair of cable receiving tube portions define threads configured to connect to a cord grip.

* * * * *